United States Patent
Kamioka et al.

(10) Patent No.: US 9,682,474 B2
(45) Date of Patent: Jun. 20, 2017

(54) CONTROL DEVICE FOR MOBILE BODY

(71) Applicant: HONDA MOTOR CO., LTD., Tokyo (JP)

(72) Inventors: Takumi Kamioka, Saitama (JP); Hiroyuki Kaneko, Saitama (JP); Chiaki Tanaka, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 59 days.

(21) Appl. No.: 14/832,096

(22) Filed: Aug. 21, 2015

(65) Prior Publication Data
US 2016/0089785 A1    Mar. 31, 2016

(30) Foreign Application Priority Data

Sep. 29, 2014    (JP) .................................. 2014-199474

(51) Int. Cl.
| | | |
|---|---|---|
| *G06F 19/00* | (2011.01) | |
| *B25J 9/16* | (2006.01) | |
| *B62D 57/032* | (2006.01) | |

(52) U.S. Cl.
CPC .......... *B25J 9/1605* (2013.01); *B62D 57/032* (2013.01); *Y10S 901/01* (2013.01)

(58) Field of Classification Search
CPC ..... B25J 9/1605; B62D 57/032; Y10S 901/01
USPC ........................................................ 700/245
See application file for complete search history.

(56) References Cited

U.S. PATENT DOCUMENTS

| | | | | |
|---|---|---|---|---|
| 8,060,253 B2* | 11/2011 | Goswami | ............. | B62D 57/032 |
| | | | | 318/568.23 |
| 9,352,470 B1* | 5/2016 | da Silva | ................ | B25J 13/088 |
| 2003/0144763 A1* | 7/2003 | Mori | .................... | B62D 57/032 |
| | | | | 700/245 |
| 2005/0110448 A1* | 5/2005 | Takenaka | ............. | B62D 57/032 |
| | | | | 318/568.12 |
| 2005/0240307 A1* | 10/2005 | Kuroki | ................... | B25J 13/085 |
| | | | | 700/245 |
| 2011/0231050 A1* | 9/2011 | Goulding | ............. | B62D 57/024 |
| | | | | 701/26 |

(Continued)

FOREIGN PATENT DOCUMENTS

| | | |
|---|---|---|
| JP | 2011-073119 | 4/2011 |
| JP | 5232120 | 3/2013 |

*Primary Examiner* — Harry Oh
(74) *Attorney, Agent, or Firm* — Rankin, Hill & Clark, LLP

(57) ABSTRACT

A control device for a mobile body enabling a smooth transition operation between a first mode and a second mode is provided. A change amount of a center of gravity component at a prescribed time is expressed by using an inertial force-dependent manipulated variable component, which changes in accordance with an instantaneous value ($d^2Zb/dt^2(t1)$ to $d^2Zb/dt^2(t13)$) of desired inertial force at the prescribed time (t1 to t13) in the time series of the desired inertial force ($d^2Zb/dt^2(t)$) defined by an up-and-down direction motion parameter, and a displacement-dependent manipulated variable component, which changes in accordance with an instantaneous value ($Zb(t1)$ to $Zb(t13)$) of desired displacement at the prescribed time (t1 to t13) in the time series of the desired displacement ($Zb(t)$) defined by the up-and-down direction motion parameter.

5 Claims, 27 Drawing Sheets

(56) References Cited

U.S. PATENT DOCUMENTS

2012/0316684 A1* 12/2012 Lee .................. G06N 3/008
                                                                                      700/261

\* cited by examiner

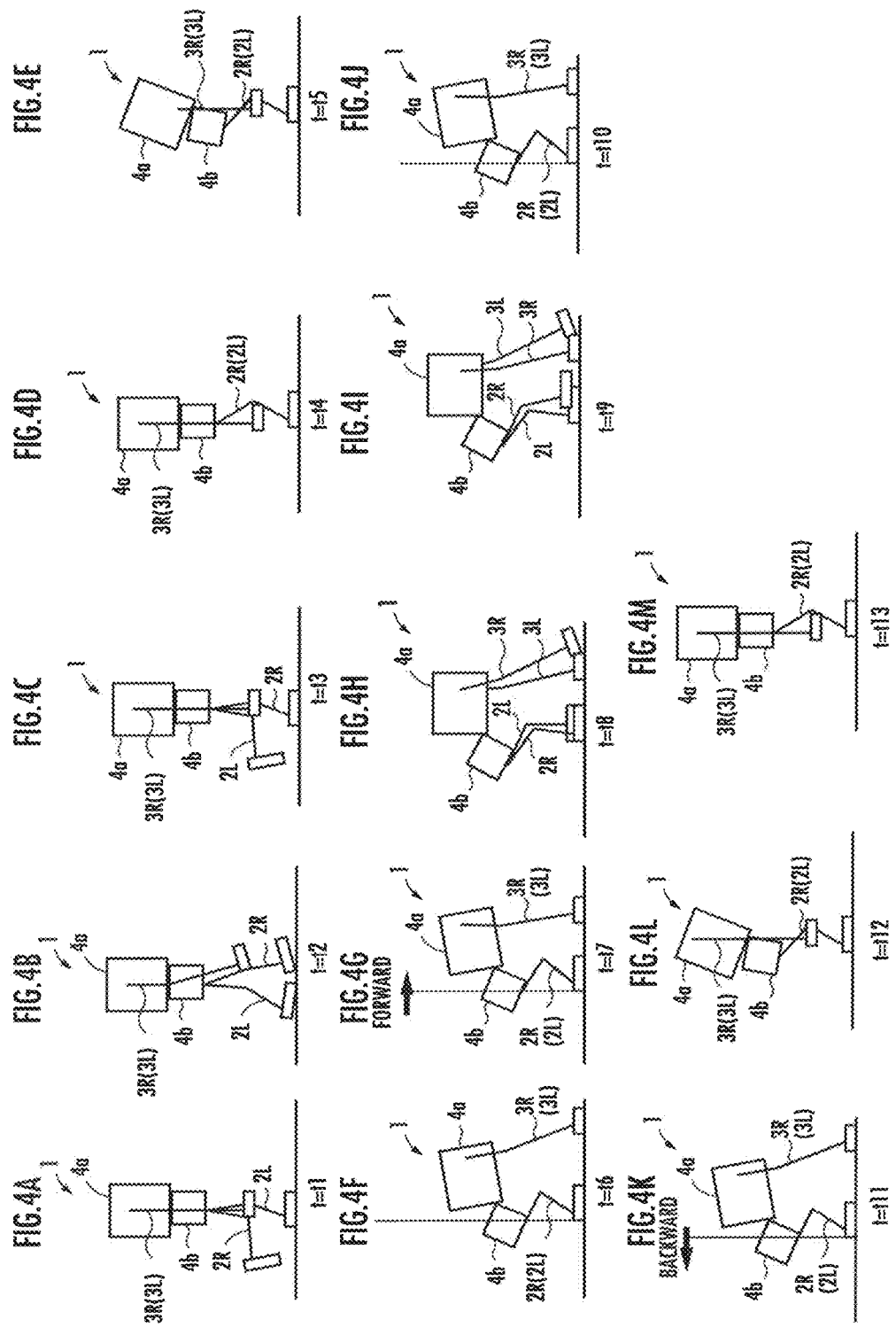

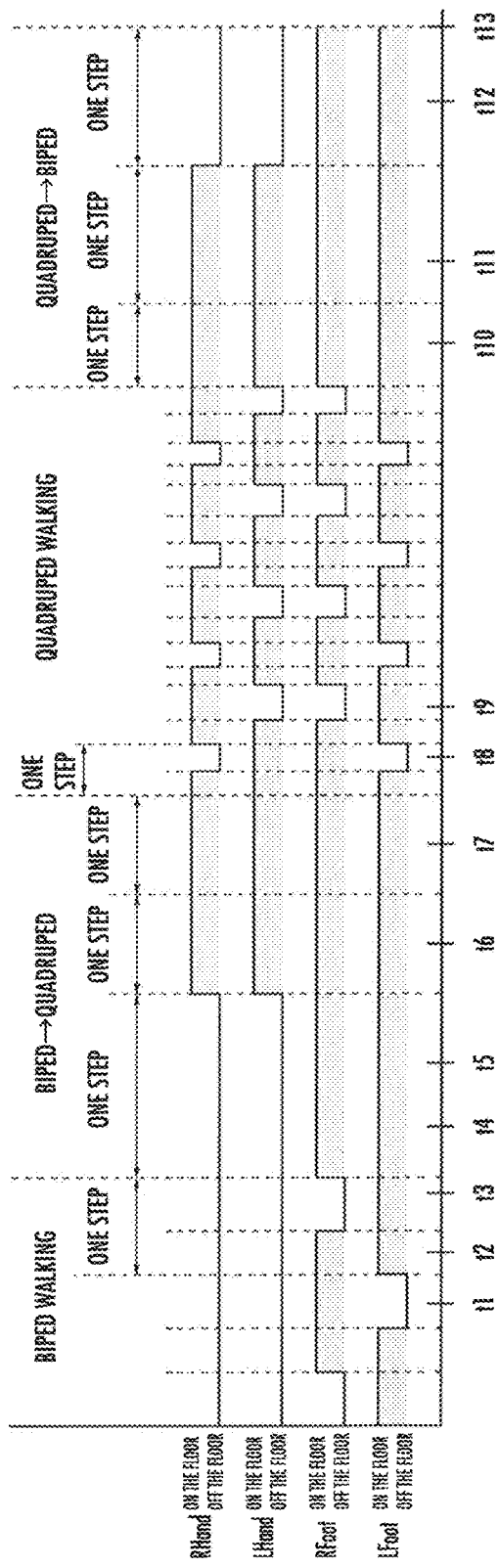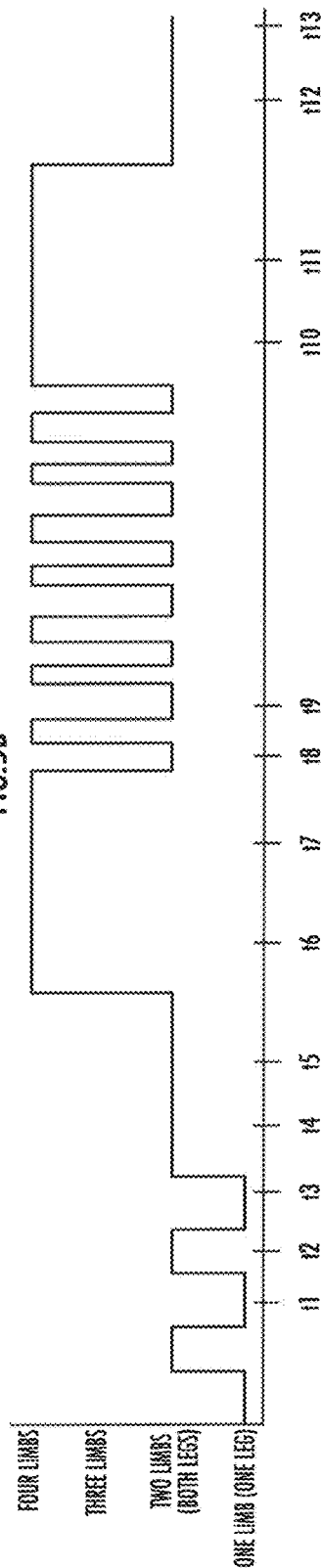

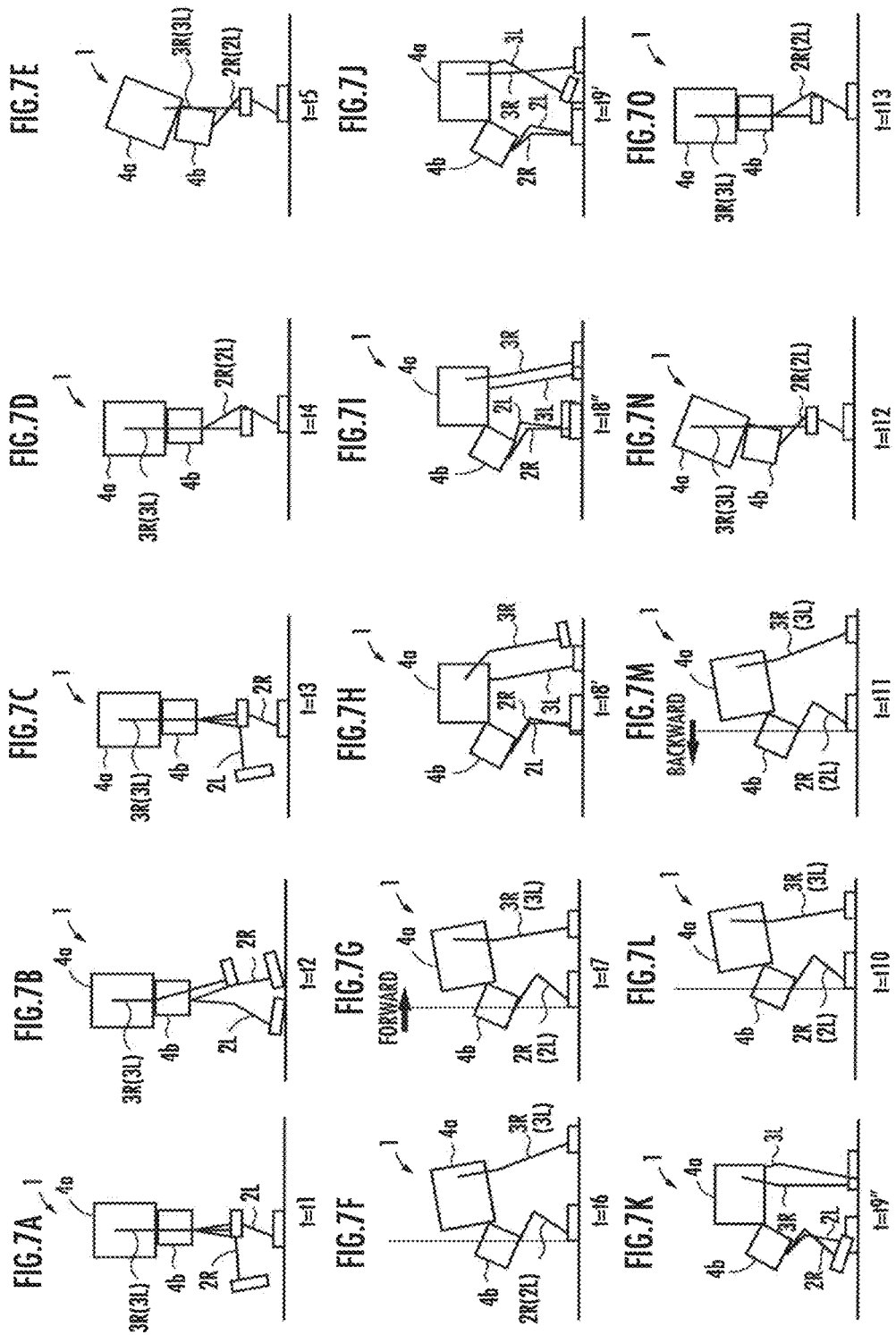

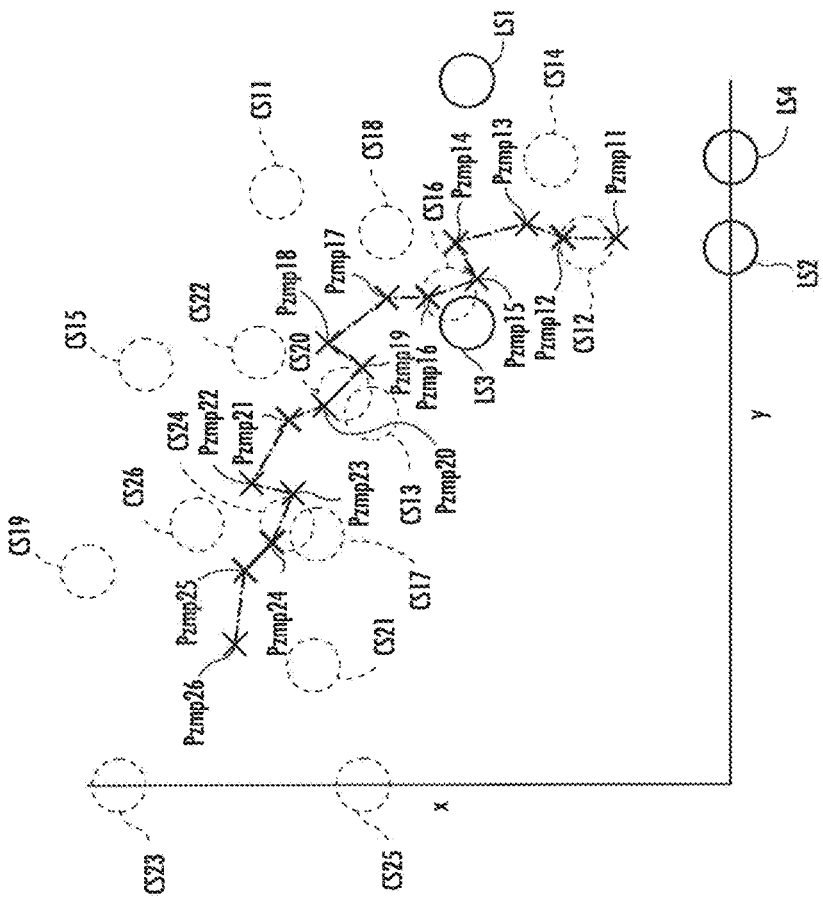
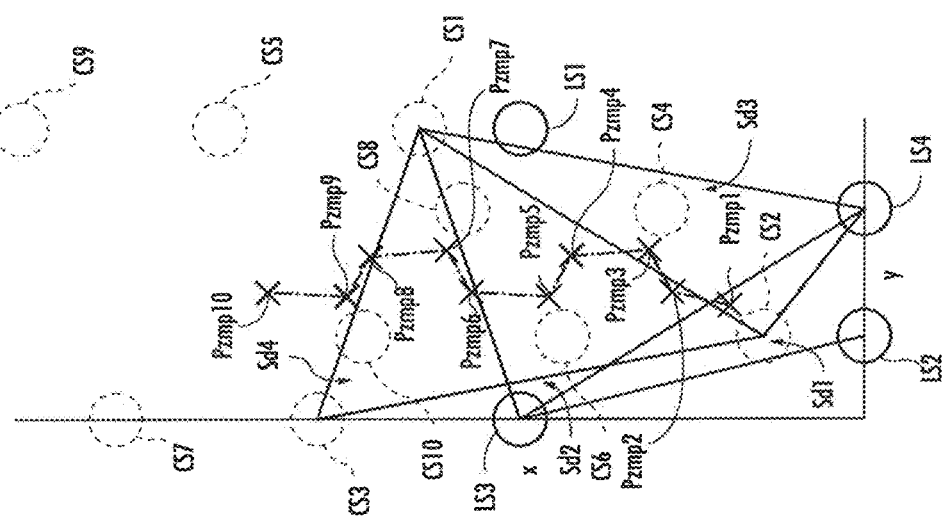

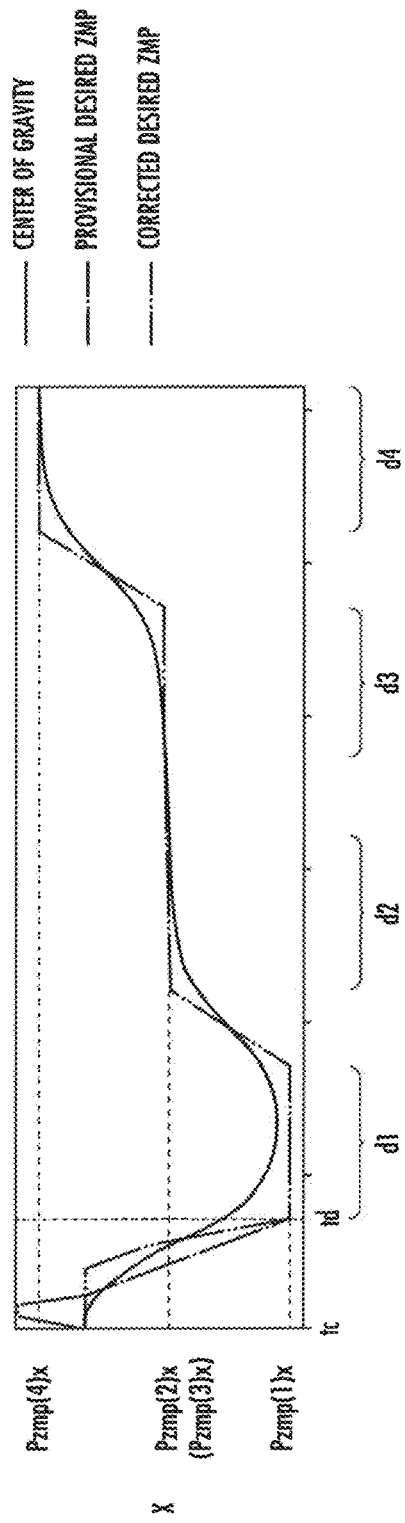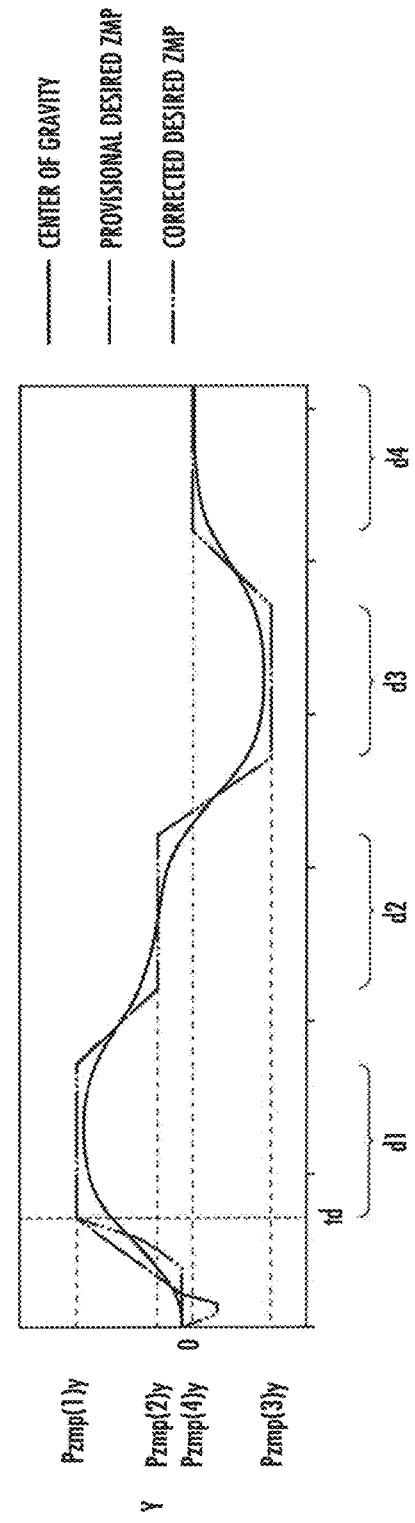

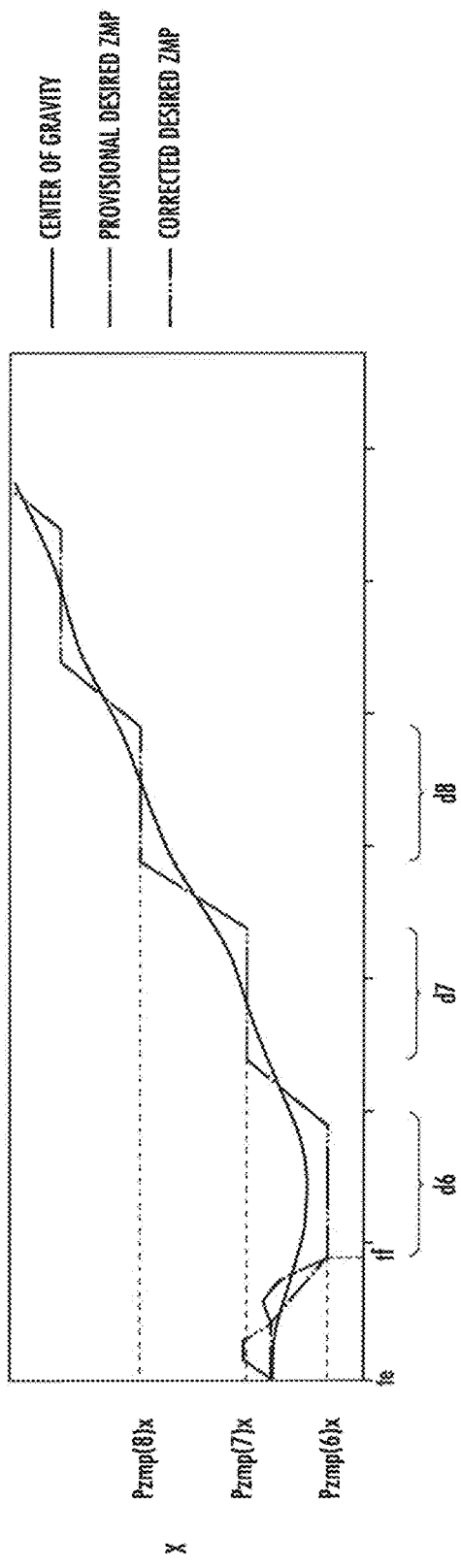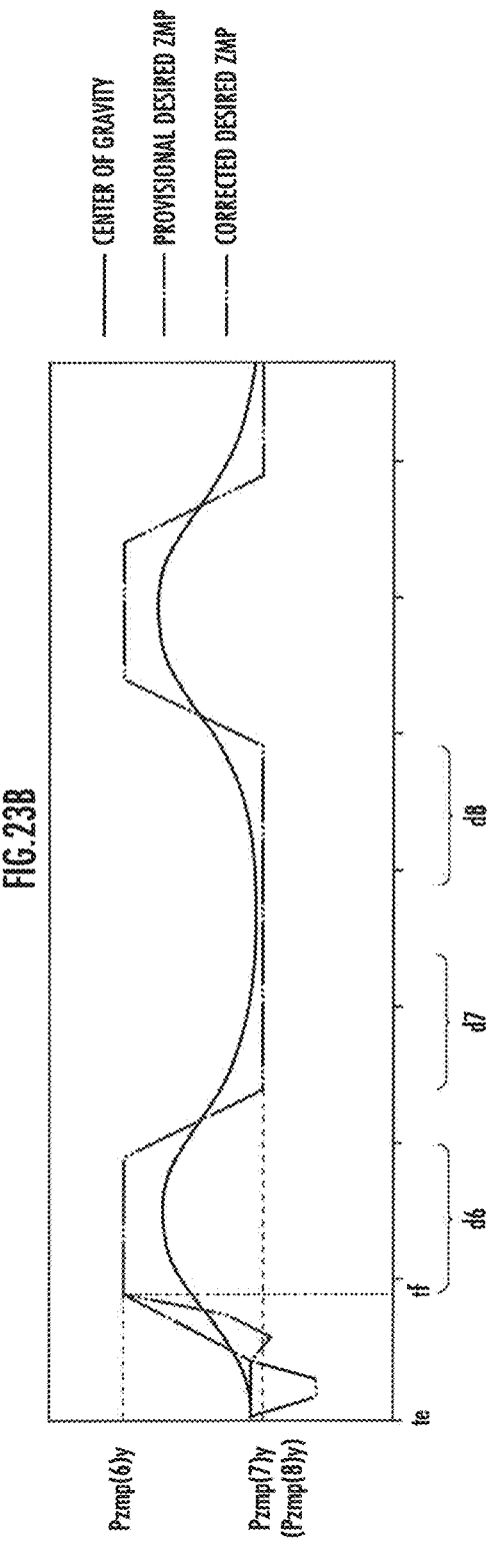

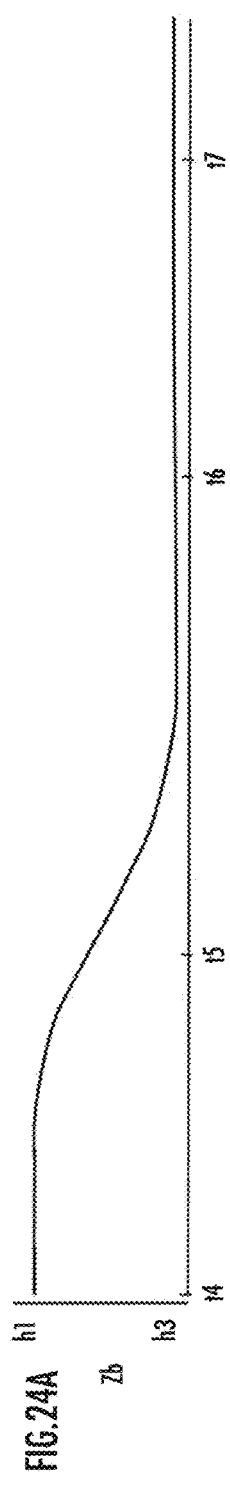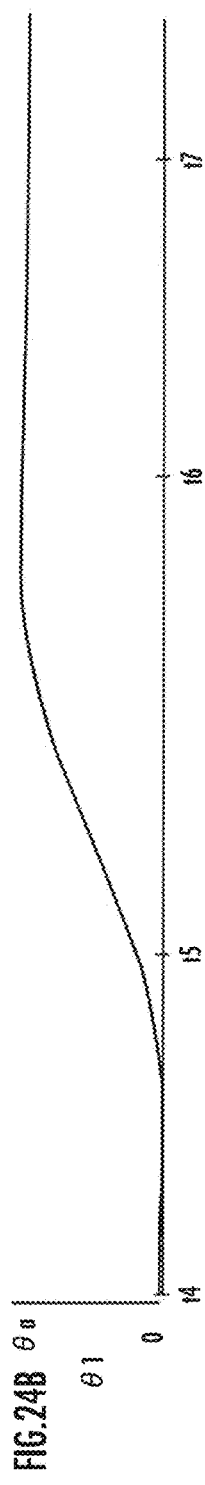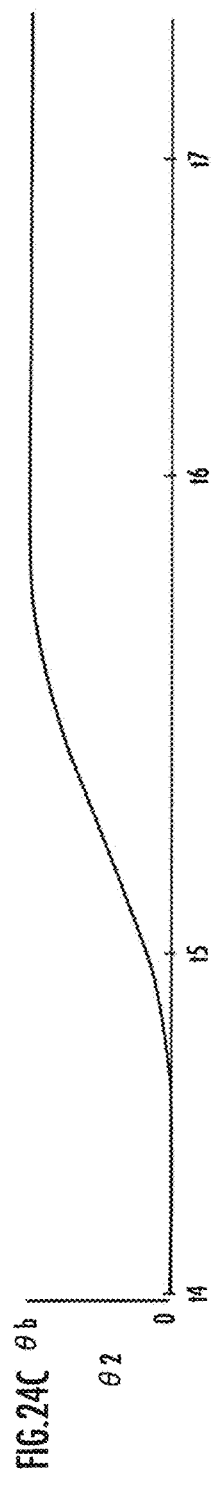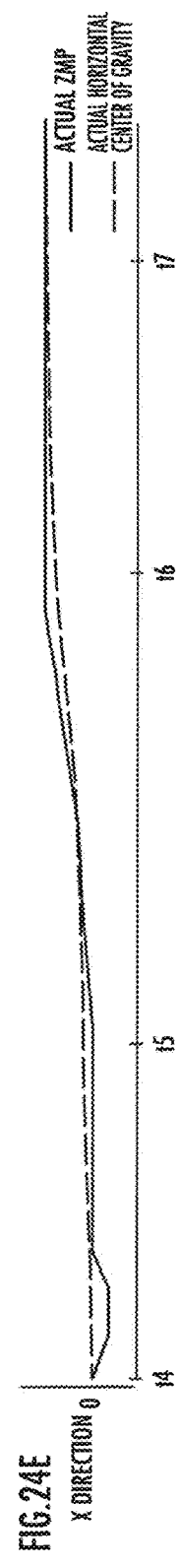

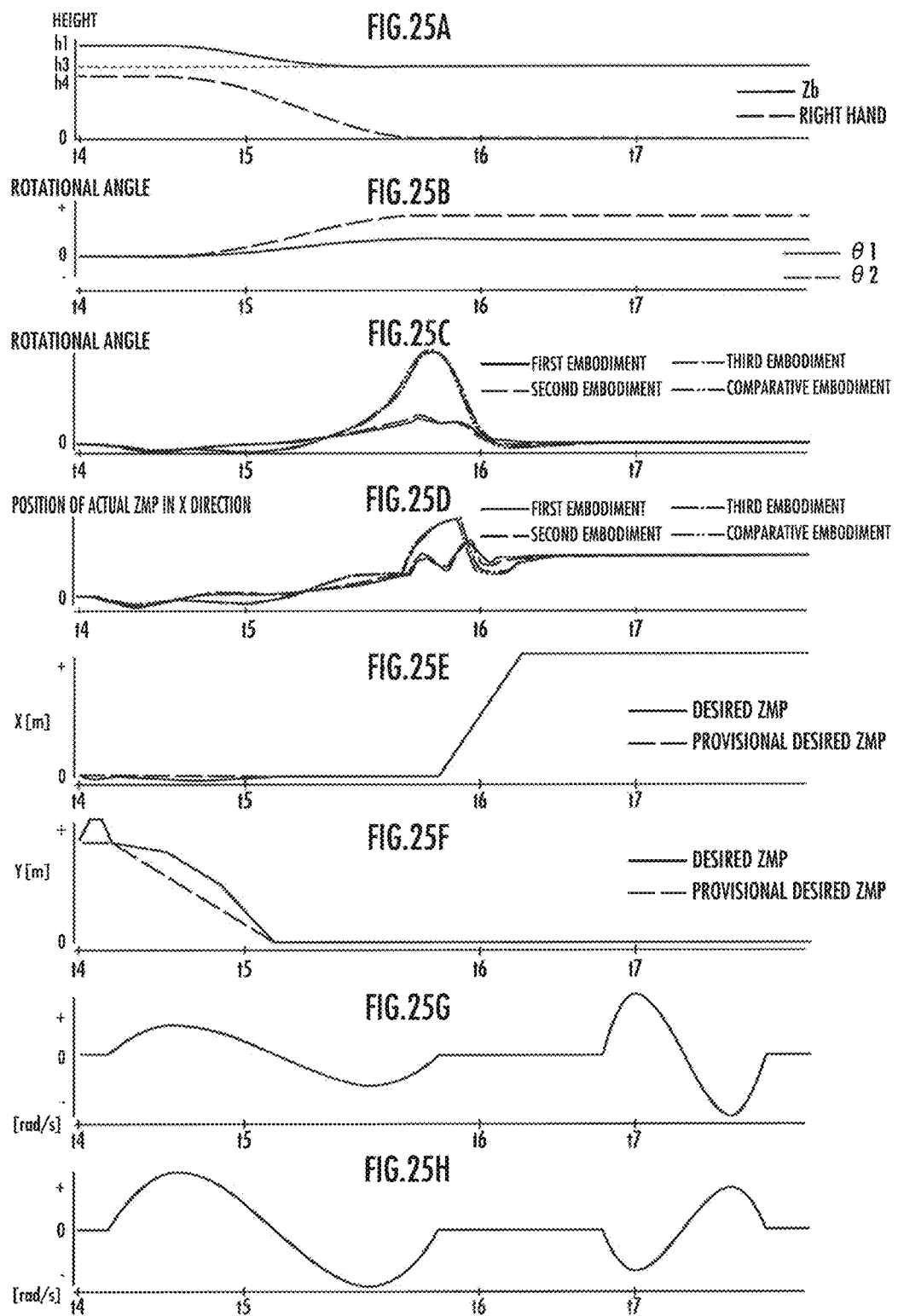

CONTROL DEVICE FOR MOBILE BODY

BACKGROUND OF THE INVENTION

Field of the Invention

The present invention relates to a control device for a mobile body.

Description of the Related Art

As a mobile body having a base body and a moving mechanism that moves the base body on a floor surface, a biped mobile robot, for example, is generally known. In the biped mobile robot, legs correspond to the moving mechanism and a body corresponds to the base body.

Regarding the biped mobile robot, for example, a technique of setting a desired motion trajectory on the basis of a ZMP stability standard has been proposed (see, for example, Patent Literature 1).

[Patent Literature 1] Japanese Patent No. 5232120

SUMMARY OF THE INVENTION

In recent years, for further improvement in motion capability, a legged mobile robot is desired to make transition operations between an ordinary biped state using two legs and a quadruped state for moving in a narrow space or when it stumbles.

To enable a smooth transition operation from the biped state to the quadruped state or from the quadruped state to the biped state, it is preferable that the gait in the biped movement and the desired values of the transition operations between the biped state and the quadruped state are generated on the basis of a same model, so as to avoid the initialization processing and the like that would otherwise be required for switching between different models.

The technique of Patent Literature 1, however, is based on the biped movement, so it would be difficult to apply the operation model for the gait generation in Patent Literature 1, as it is, to generation of the transition operations between the biped state and the quadruped state.

As such, implementation of smooth transition operations was difficult.

It is therefore an object of the present invention to provide a control device for a mobile body which enables smooth transition operations between a first mode and a second mode.

A control device for a mobile body according to the present invention is:

a control device for a mobile body having a base body and a moving mechanism configured to move the base body on a floor surface, the control device being configured to determine a motion parameter as a set of parameters defining an operation of the mobile body in a prescribed period, and to use the determined motion parameter and a dynamic model of the mobile body to generate a desired motion in a first mode of the mobile body and a desired transition operation between the first mode and a second mode which differs in a height of the center of gravity of the base body from the first mode, the control device including an up-and-down direction motion parameter determining unit configured to determine, as one parameter included in the motion parameter, an up-and-down direction motion parameter which defines time series of desired inertial force and desired displacement in an up-and-down direction of the base body, wherein the mobile body in the dynamic model is expressed by at least a center of gravity component which is dependent on a position of the center of gravity of the base body, and a rotational motion component which is dependent on a momentum of rotational motion of the base body, and a change amount of the center of gravity component at a prescribed time is expressed by using an inertial force-dependent manipulated variable component, which changes in accordance with an instantaneous value of the desired inertial force at the prescribed time in the time series of the desired inertial force defined by the up-and-down direction motion parameter, and a displacement-dependent manipulated variable component, which changes in accordance with an instantaneous value of the desired displacement at the prescribed time in the time series of the desired displacement defined by the up-and-down direction motion parameter.

In the desired transition operation between the first mode and the second mode which differ in the height of the center of gravity from each other, the transition operation involves the change of the height of the center of gravity. As the dynamic model is expressed using the displacement-dependent manipulated variable component which changes on a time-series basis in accordance with the instantaneous values of the desired displacement in the up-and-down direction, the desired transition operation is expressed more appropriately by the dynamic model. As a result, the desired motion in the first mode and the desired transition operation between the first mode and the second mode may be implemented more smoothly.

The rotational motion component is preferably dependent on an instantaneous value of the desired displacement at the prescribed time in the time series of the desired displacement defined by the up-and-down direction motion parameter.

According to the control device for the mobile body with the above configuration, the rotational motion component is dependent on the instantaneous value of the desired displacement in the up-and-down direction of the base body, so the rotational motion component may more accurately express the transition operation involving the shift of the center of gravity. As a result, the transition operation between the first mode and the second mode may be performed more smoothly.

Another control device for a mobile body according to the present invention is:

a control device for a mobile body having a base body and a moving mechanism configured to move the base body on a floor surface, the control device being configured to determine a motion parameter as a set of parameters defining an operation of the mobile body in a prescribed period, and to use the determined motion parameter and a dynamic model of the mobile body to generate a desired motion in a first mode of the mobile body, wherein the moving mechanism includes a first moving mechanism functioning as the moving mechanism in both of the first mode and a second mode which differs in a height of the center of gravity of the base body from the first mode, and a second moving mechanism functioning as the moving mechanism in the second mode, the base body includes a first base body rotatably connected to the first moving mechanism, and a second base body rotatably connected to the first base body and also connected to the second moving mechanism, and the mobile body in the dynamic model is expressed by using at least a center of gravity component which is dependent on a position of the center of gravity of the base body, a first rotational motion component which is dependent on an amount of rotation of the first base body, and a second rotational motion component which is dependent on an amount of rotation of the second base body.

According to the control device for the mobile body with the above configuration, in the transition operation between the first mode and the second mode which differ in the height of the center of gravity from each other, while the height of the center of gravity can be changed by rotation of the second base body, large fluctuation in posture of the first moving mechanism, which functions as the moving mechanism in both of the first and second modes, with respect to the first base body during the transition operation may be avoided or alleviated. Further, as the mobile body in the dynamic model used for generating the desired motion in the first mode is expressed using the first rotational motion component and the second rotational motion component, the transition operation of the mobile robot involving the rotational motion of the first base body and the rotational motion of the second base body is expressed using that dynamic model. As a result, the desired transition operation is generated using the same dynamic model as the one used for generating the desired motion in the first mode. It thus becomes unnecessary to switch the dynamic model when performing the transition operation, ensuring that a series of operations from generation of a desired transition operation to execution of the transition operation may be implemented smoothly.

Preferably, the control device for the mobile body with the above configuration includes an up-and-down direction motion parameter determining unit configured to determine, as one parameter included in the motion parameter, an up-and-down direction motion parameter which defines time series of desired inertial force and desired displacement in an up-and-down direction of the base body, and the second rotational motion component is preferably dependent on an instantaneous value of the desired displacement at a prescribed time in the time series of the desired displacement defined by the up-and-down direction motion parameter.

According to the control device for the mobile body with the above configuration, the second rotational motion component is dependent on the instantaneous value of the desired displacement in the up-and-down direction of the base body, so the second rotational motion component may more accurately express the transition operation involving the shift of the center of gravity. As a result, the transition operation between the first mode and the second mode may be performed more smoothly.

Preferably, the control device for the mobile body of the present invention includes an up-and-down direction motion parameter determining unit configured to determine, as one parameter included in the motion parameter, an up-and-down direction motion parameter which defines time series of desired inertial force and desired displacement in an up-and-down direction of the base body, and the first rotational motion component is preferably dependent on an instantaneous value of the desired displacement at a prescribed time in the time series of the desired displacement defined by the up-and-down direction motion parameter.

According to the control device for the mobile body with the above configuration, the first rotational motion component is dependent on the instantaneous value of the desired displacement in the up-and-down direction of the base body, so the first rotational motion component may more accurately express the transition operation involving the shift of the center of gravity. As a result, the transition operation between the first mode and the second mode may be performed more smoothly.

BRIEF DESCRIPTION OF THE DRAWINGS

FIG. 4A shows a gait of the robot at time t1 in biped walking;

FIG. 4B shows a gait of the robot at time t2 in biped walking;

FIG. 4C shows a gait of the robot at time t3 in biped walking;

FIG. 4D shows a gait of the robot at time t4 in biped-to-quadruped transition;

FIG. 4E shows a gait of the robot at time t5 in biped-to-quadruped transition;

FIG. 4F shows a gait of the robot at time t6 in biped-to-quadruped transition;

FIG. 4G shows a gait of the robot at time t7 in biped-to-quadruped transition;

FIG. 4H shows a gait (trot gait) of the robot at time t8 in quadruped walking;

FIG. 4I shows a gait (trot gait) of the robot at time t9 in quadruped walking;

FIG. 4J shows a gait of the robot at time t10 in quadruped-to-biped transition;

FIG. 4K shows a gait of the robot at time t11 in quadruped-to-biped transition;

FIG. 4L shows a gait of the robot at time t12 in quadruped-to-biped transition;

FIG. 4M shows a gait of the robot at time t13 in quadruped-to-biped transition;

FIG. 5A shows the on-the-floor or off-the-floor state of each limb of the robot at the times in FIGS. 4A to 4M;

FIG. 5B shows the number of robot limbs in contact with the floor at the times in FIGS. 4A to 4M;

FIG. 7A shows a gait of the robot at time t1 in biped walking;

FIG. 7B shows a gait of the robot at time t2 in biped walking;

FIG. 7C shows a gait of the robot at time t3 in biped walking;

FIG. 7D shows a gait of the robot at time t4 in biped-to-quadruped transition;

FIG. 7E shows a gait of the robot at time t5 in biped-to-quadruped transition;

FIG. 7F shows a gait of the robot at time t6 in biped-to-quadruped transition;

FIG. 7G shows a gait of the robot at time t7 in biped-to-quadruped transition;

FIG. 7H shows a gait (crawl gait) of the robot at time t8' in quadruped walking;

FIG. 7I shows a gait (crawl gait) of the robot at time t8" in quadruped walking;

FIG. 7J shows a gait (crawl gait) of the robot at time t9' in quadruped walking;

FIG. 7K shows a gait (crawl gait) of the robot at time t9" in quadruped walking;

FIG. 7L shows a gait of the robot at time t10 in quadruped-to-biped transition;

FIG. 7M shows a gait of the robot at time t11 in quadruped-to-biped transition;

FIG. 7N shows a gait of the robot at time t12 in quadruped-to-biped transition;

FIG. 7O shows a gait of the robot at time t13 in quadruped-to-biped transition;

FIG. 20A illustrates a trajectory of provisional desired ZMPs in the crawl gait in the case of traveling straight ahead;

FIG. 20B illustrates a trajectory of provisional desired ZMPs in the crawl gait in the case of turning;

FIG. 21A is a graph showing time-series changes of the positions in the X-axis direction of the center of gravity, provisional desired ZMP, and corrected desired ZMP in the crawl gait;

FIG. 21B is a graph showing time-series changes of the positions in the Y-axis direction of the center of gravity, provisional desired ZMP, and corrected desired ZMP in the crawl gait;

FIG. 23A is a graph showing time-series changes of the positions in the X-axis direction of the center of gravity, provisional desired ZMP, and corrected desired ZMP in the trot gait;

FIG. 23B is a graph showing time-series changes of the positions in the Y-axis direction of the center of gravity, provisional desired ZMP, and corrected desired ZMP in the trot gait;

FIG. 24A shows time-series changes of the body mass point vertical position in the period from t4 to t7 in FIGS. 4A to 4M;

FIG. 24B shows time-series changes of the rotational angle of the waist joint in the period from t4 to t7 in FIGS. 4A to 4M;

FIG. 24C shows time-series changes of the rotational angle of the lumbar joint in the period from t4 to t7 in FIGS. 4A to 4M;

FIG. 24D shows time-series changes of the vertical position of a hand (height of the hand of the upper limb) in the period from t4 to t7 in FIGS. 4A to 4M;

FIG. 24E shows time-series changes of the positions in the X direction of an actual ZMP and an actual horizontal center of gravity in the period from t4 to t7 in FIGS. 4A to 4M;

FIG. 25A is a graph showing the body mass point vertical position and the height of the hand in the same period as in FIGS. 24A to 24E;

FIG. 25B is a graph showing the rotational angles of the waist joint and the lumbar joint in the same period as in FIGS. 24A to 24E;

FIG. 25C is a graph showing the rotational angles about the Y axis (in the pitch direction) in the first through third embodiments and a comparative embodiment in the same period as in FIGS. 24A to 24E;

FIG. 25D is a graph showing the positions of actual ZMP in the X direction in the first through third embodiments and the comparative embodiment in the same period as in FIGS. 24A to 24E;

FIG. 25E is a graph showing the positions of desired ZMP and provisional desired ZMP on the X axis in the same period as in FIGS. 24A to 24E;

FIG. 25F is a graph showing the positions of desired ZMP and provisional desired ZMP on the Y axis in the same period as in FIGS. 24A to 24E;

FIG. 25G is a graph showing the roll acceleration of the waist joint in the same period as in FIGS. 24A to 24E;

FIG. 25H is a graph showing the roll acceleration of the lumbar joint in the same period as in FIGS. 24A to 24E;

DESCRIPTION OF THE PREFERRED EMBODIMENTS

Embodiments of the present invention will be described below by taking a biped/quadruped mobile robot as an example of the mobile body.

(Configuration of Biped/Quadruped Mobile Robot)

Figure 1:
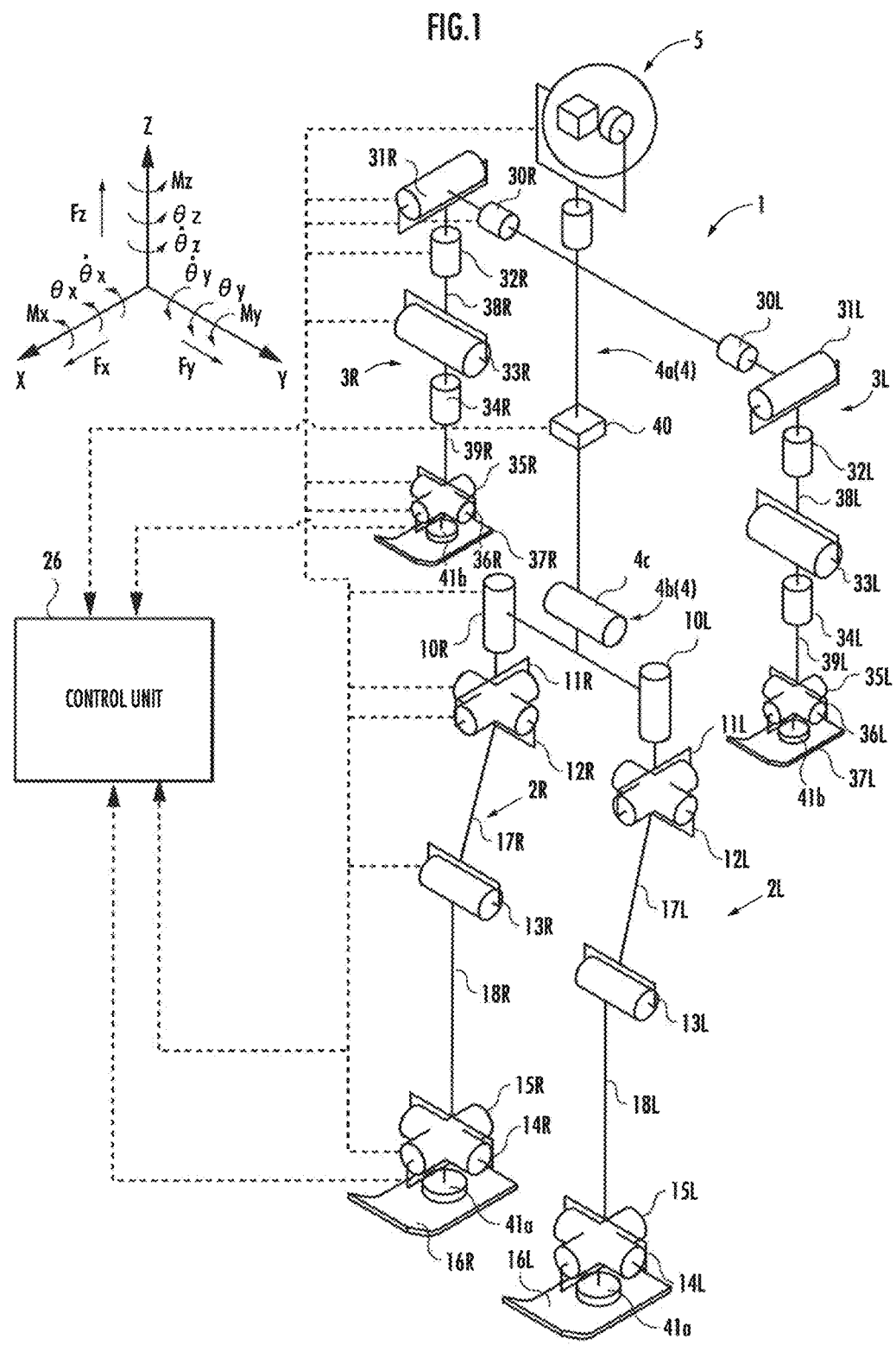
FIG. 1 is a schematic diagram generally showing a gait generation system of a limbed mobile robot according to a first embodiment of the present invention.

As shown in FIG. 1, a biped/quadruped mobile robot 1 (hereinafter, simply referred to as "robot 1") of a first embodiment includes a body 4 (corresponding to the "base body" of the present invention) as a base body and, as a moving mechanism that moves the body 4 on the floor surface, a pair of right and left lower limbs (legs) 2R, 2L (corresponding to the "first moving mechanism" of the present invention) interposed between the body 4 and the floor, and a pair of right and left upper limbs (arms) 3R, 3L (corresponding to the "second moving mechanism" of the present invention) attached to the respective sides of the upper portion of the body 4.

The robot 1 is configured to be able to make transitions between a biped state (first mode), in which the body 4 is supported above the floor surface by the lower limbs 2R, 2L landed on the floor, and a quadruped state (second mode), in which the body 4 is supported above the floor surface by the lower limbs 2R, 2L and the upper limbs 3R, 3L landed on the floor.

The body 4 includes an upper body 4a (corresponding to the "second base body" of the present invention) and a lower body 4b (corresponding to the "first base body" of the present invention). The upper body 4a and the lower body 4b are connected through a lumbar joint, which will be described later. The upper body 4a is connected to the proximal end portions (upper end portions) of the upper limbs 3R, 3L through shoulder joints, which will be described later. The lower body 4b is connected to the proximal end portions (upper end portions) of the lower limbs 2R, 2L through waist joints (hip joints), which will be described later.

In the description of the first embodiment, the symbol R means that it corresponds to the lower limb on the right side (right lower limb) or the upper limb on the right side (right upper limb), and the symbol L means that it corresponds to the lower limb on the left side (left lower limb) or the upper limb on the left side (left upper limb). Further, the X, Y, and Z axes correspond to three coordinate axes of a supporting limb coordinate system, which will be described later. The X-axis direction and the Y-axis direction in the supporting limb coordinate system are two-axis directions which are orthogonal to each other on a horizontal plane. The X-axis direction corresponds to the front-and-back direction (roll axis direction) of the robot 1, and the Y-axis direction corresponds to the lateral direction (pitch axis direction) of the robot 1. The Z-axis direction is the vertical direction (gravitational direction), which corresponds to the up-and-down direction (yaw axis direction) of the robot 1. In the first embodiment, the vertical direction or the Z-axis direction has the meaning as the up-and-down direction in the present invention.

The lower limbs 2R, 2L share the same structure, each having six joints. The six joints are, in order from the body 4 side, a joint 10R or 10L for turning the waist (hip) (for rotation in a yaw direction (about the Z axis) relative to the body 4), a joint 11R or 11L for rotating the waist (hip) in a roll direction (about the X axis), a joint 12R or 12L for rotating the waist (hip) in a pitch direction (about the Y axis), a joint 13R or 13L for rotating the knee in the pitch direction, a joint 14R or 14L for rotating the ankle in the pitch direction, and a joint 15R or 15L for rotating the ankle in the roll direction.

The joints 10R (L), 11R (L), and 12R (L) of lower limb 2R(L) constitute a waist joint (hip joint) having three degrees of freedom, the joint 13R (L) constitutes a knee joint having one degree of freedom, and the joints 14R (L) and 15R (L) constitute an ankle joint having two degrees of freedom.

The waist joint (hip joint) 10R (L), 11R (L), 12R (L) is connected to the knee joint 13R (L) by a thigh link 17R (L), and the knee joint 13R (L) is connected to the ankle joint 14R (L), 15 R (L) by a crus link 18R (L). Below the ankle joint 14R (L), 15R (L) of lower limb 2R(L), a foot (a lower limb ground contact portion) 16R (L) is attached to constitute a distal end portion (lower end portion) of lower limb 2R(L). The upper end portion (proximal end portion) of lower limb 2R(L) is connected to the body 4 via the waist joint (hip joint) 10R (L), 11R (L), 12R (L).

The upper limbs 3R, 3L share the same structure, each having seven joints. The seven joints are, in order from the body 4 side, a joint 30R or 30L for turning the shoulder (for rotation in the pitch direction relative to the body 4), a joint 31R or 31L for rotating the shoulder in the roll direction, a joint 32R or 32L for rotating the shoulder in the yaw direction, a joint 33R or 33L for rotating the elbow in the pitch direction, a joint 34R or 34L for rotating the wrist in the yaw direction, a joint 35R or 35L for rotating the wrist in the roll direction, and a joint 36R or 36L for rotating the wrist in the pitch direction.

The joints 30R (L), 31R (L), and 32R (L) of each upper limb 3R (L) constitute a shoulder joint having three degrees of freedom, the joint 33R (L) constitutes an elbow joint having one degree of freedom, and the joints 34R (L), 35R (L), and 36R (L) constitute a wrist joint having three degrees of freedom.

The shoulder joint 30R (L), 31R (L), 32R (L) is connected to the elbow joint 33R (L) by an upper arm link 38R (L), and the elbow joint 33R (L) is connected to the wrist joint 34R (L), 35R (L), 36R (L) by a forearm link 39R (L). Below the wrist joint 35R (L), 36R (L) of each upper limb 3R (L), a hand (an upper limb ground contact portion) 37R (L) is attached to constitute a distal end portion (lower end portion) of each upper limb 3R (L). The upper end portion (proximal end portion) of each upper limb 3R (L) is connected to the body 4 via the shoulder joint 30R (L), 31R (L), 32R (L). The ground contact portion 37R(L) may be configured to have a plurality of fingers so as to enable various works such as grasping an object in the biped state.

The body 4 has a joint 4c between the upper body 4a and the lower body 4b for rotation in the pitch direction. The joint 4c constitutes a lumbar joint having one degree of freedom.

Each of the above-described joints may have a known structure, such as the one proposed by the present applicant in Japanese Patent Application Laid-Open No. 3-184782, for example. In this case, an actuator rotatively driving each joint is configured with an electric motor 42 (see FIG. 2) having a reduction gear mechanism.

With the above-described construction of each lower limb 2R (L), the ground contact portion 16R (L) of each lower limb 2R (L) has six degrees of freedom relative to the body 4. During the movement of the robot 1, desired motions of the ground contact portions 16R, 16L can be accomplished by driving 6*2=12 (in this specification, "*" denotes multiplication in scalar calculation and outer product in vector calculation) joints in total of the lower limbs 2R, 2L at appropriate angles.

Further, with the above-described construction of each upper limb 3R (L), the ground contact portion 37R (L) of each upper limb 3R (L) has seven degrees of freedom relative to the body 4. During the movement of the robot 1, desired motions of the ground contact portions 37R, 37L can be accomplished by driving 7*2=14 joints in total of the upper limbs 3R, 3L at appropriate angles.

Furthermore, with the above-described construction of the body 4, the lower body 4b has one degree of freedom relative to the upper body 4a. During the movement of the robot 1, desired motions such as the transition operations between the biped state and the quadruped state as well as quadruped walking can be accomplished by driving the joint of the body 4 at an appropriate angle.

The above configuration enables the robot 1 to perform motions for traveling in a three-dimensional space, such as biped walking operation, biped running operation, and quadruped walking operation (crawl walking operation, trot walking operation).

In the case of biped walking or biped running, the lower limbs 2R, 2L function as the moving mechanism that moves the body 4 as the base body on the floor surface. The body 4 as the base body is supported by the lower limbs 2R, 2L via the waist joints (hip joints), so as to be able to make relative motions with respect to the lower limbs 2R, 2L. Further, the drive control of the joints in the lower limbs 2R, 2L makes it possible to control the motions of the body 4 with respect to the floor surface.

It should be noted that the position of the body 4 and its velocity, described herein later, mean a prescribed position of the body 4, or more specifically, the position of a representative point of the body 4, and its moving velocity. This will be described later.

In the case of quadruped walking, the lower limbs 2R, 2L and the upper limbs 3R, 3L function as the moving mechanism that moves the body 4 as the base body on the floor surface. The body 4 as the base body is supported by the lower limbs 2R, 2L and the upper limbs 3R, 3L via the waist joints (hip joints) and the shoulder joints, so as to be able to make relative motions with respect to the lower limbs 2R, 2L and the upper limbs 3R, 3L. Further, the drive control of the joints in the lower limbs 2R, 2L and the upper limbs 3R, 3L makes it possible to control the motions of the body 4 with respect to the floor surface.

Here, the motions of the body 4 include, not only a motion of the body 4 in the horizontal direction (or a direction parallel to the floor surface), but also a motion of the body 4 in the up-and-down direction (vertical direction or a direction perpendicular to the floor surface), and a motion which causes the posture of the body 4 to change.

In the first embodiment, a head 5 is mounted on top of the body 4, although the head may be omitted.

Inside the body 4, a control unit 26 is housed which controls operations of the robot 1. In FIG. 1, for convenience of illustration, the control unit 26 is shown outside the body 4.

In lower limb 2R (L), a six-axis force sensor 41a is provided between the ankle joint 14R (L), 15R (L) and the ground contact portion 16R (L). Further, in each upper limb 3R (L), a six-axis force sensor 41b is provided between the wrist joint 35R (L), 36R (L) and the ground contact portion 37R (L). The six-axis force sensors 41a, 41b detect translational force components Fx, Fy, Fz in three axis directions and moment components Mx, My, Mz about the three axes of the floor reaction force which is transmitted from the floor to each lower limb 2R (L) and each upper limb 3R (L) via the ground contact portion 16R (L) and the ground contact portion 37R (L), and output the detection signals to the control unit 26.

The body 4 is mounted with an inclination sensor 40, which rotational angles (in the roll and pitch directions) of the body 4 with respect to the vertical direction (gravitational direction) and change rates (angular velocities) thereof. More specifically, the inclination sensor 40 is composed of an accelerometer and a rate sensor (angular velocity sensor) such as a gyro sensor, and outputs the detection signals of these sensors to the control unit 26. Then, in the control unit 26, on the basis of the outputs from the inclination sensor 40, the rotational angles and the angular velocities of the body 4 with respect to the vertical direction are measured by a technique known in the art.

Further, the electric motors 42 (see FIG. 2) for rotatively driving the joints are each provided with an encoder (rotary encoder) 44 (see FIG. 2) for detecting an angle of rotation of the corresponding joint, and the detection signals of the encoders 44 are output to the control unit 26.

Figure 2:
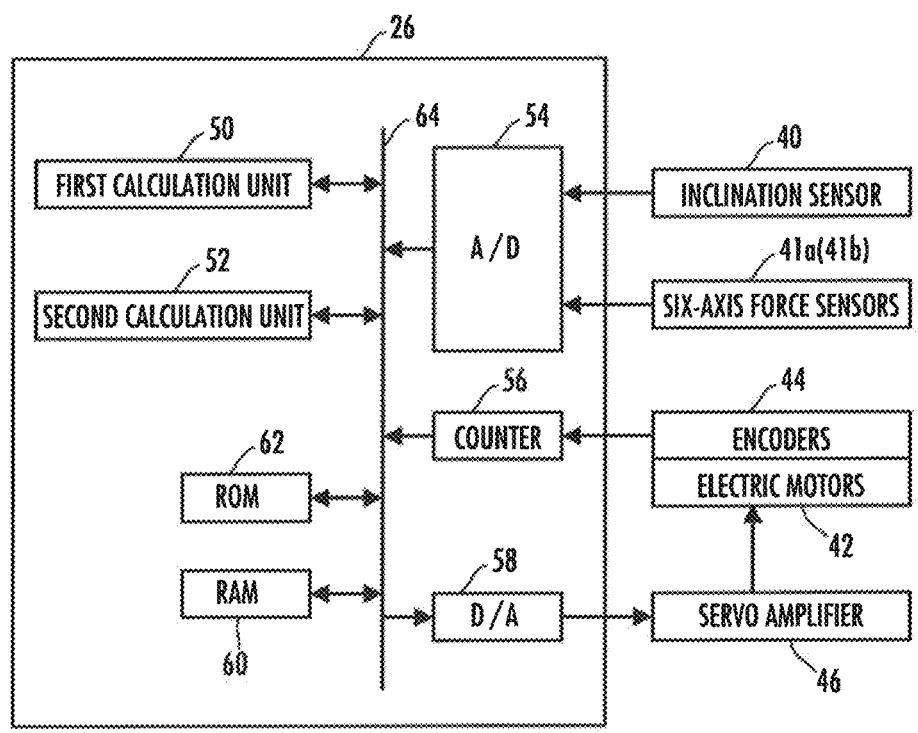
FIG. 2 is a block diagram showing the details of the control unit shown in FIG. 1.

FIG. 2 is a block diagram showing the details of the control unit 26, which is made up of a microcomputer. In the control unit 26, outputs from the inclination sensor 40 and the like are converted into digital values in an A/D converter (in the figure, shown as "A/D") 54, and the resultant outputs are sent to a RAM 60 via a bus 64. Further, outputs from the encoders 44, arranged adjacent to the respective electric motors 42, are input into the RAM 60 via a counter 56.

The control unit 26 includes a first calculation unit 50 and a second calculation unit 52, which are composed of CPUs. The first calculation unit 50 generates a desired gait, as will be described later, and also calculates a joint displacement command, as will also be described later, and sends the same to the RAM 60. The second calculation unit 52 reads the command as well as a detected, actual measurement value from the RAM 60, and calculates a manipulated variable required for driving each joint and outputs the same to the electric motor 42 that drives the corresponding joint, via a D/A converter (in the figure, shown as "D/A") 58 and a servo amplifier 46.

Figure 3:
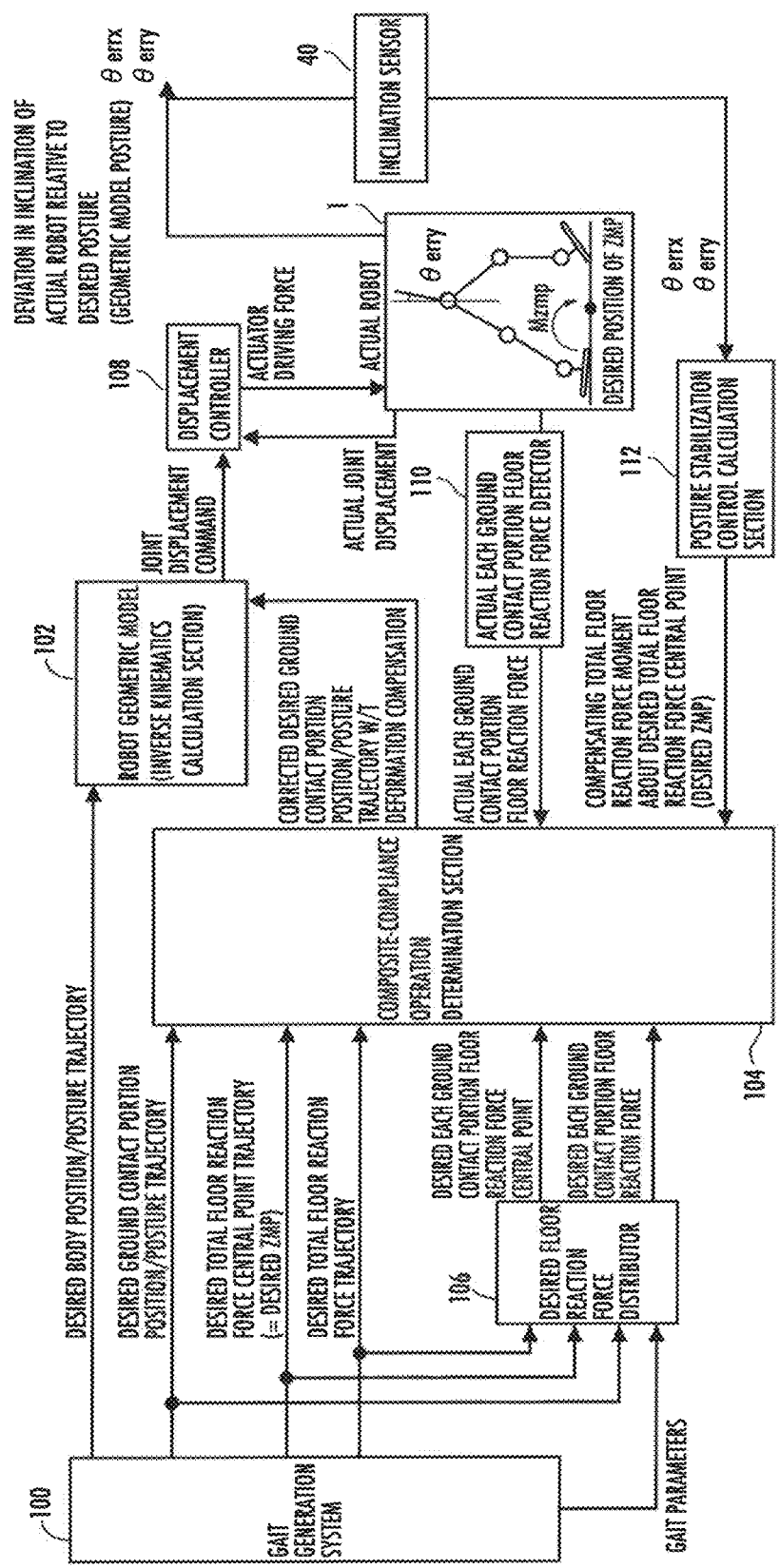
FIG. 3 is a block diagram functionally showing the configuration of the gait generation system of the limbed mobile robot shown in FIG. 1.

FIG. 3 is a block diagram showing an overall configuration and operation of a walking (posture) control system of the limbed mobile robot according to the present embodiment.

A description will now be provided. The first calculation unit 50 includes a gait generation system 100. The gait generation system 100 generates and outputs a desired gait freely and on a real-time basis, as will be described later. The desired gait is made up of: a desired body position/posture (trajectory), a desired ground contact portion position/posture (trajectory), a desired total floor reaction force central point (desired ZMP) (trajectory), and a desired total floor reaction force (trajectory or pattern).

It should be noted that the floor reaction force acting on each ground contact portion (foot 16R(L), in the case of biped walking, foot 16R(L), hand 37R(L) in the case of quadruped walking) will be called "each ground contact portion floor reaction force", and the resultant force of the floor reaction forces acting on all the ground contact portions will be called "total floor reaction force". In the following, however, each ground contact portion floor reaction force will hardly be referred to, and therefore, the term "floor reaction force" will be regarded to mean the "total floor reaction force", unless otherwise stated.

The gaits generated by this walking control system are roughly classified as: a biped gait, which is a gait for walking with two limbs (see time t1 in FIG. 4A to time t3 in FIG. 4C); a biped-to-quadruped transition gait, which is a gait for transition from the biped state to the quadruped state (see time t4 in FIG. 4D to time t7 in FIG. 4G); a quadruped gait, which is a gait for walking with four limbs (see time t8 in FIG. 4H to time t9 in FIG. 4I); and a quadruped-to-biped transition gait, which is a gait for transition from the quadruped state to the biped state (see time t10 in FIG. 4J to time t13 in FIG. 4M). More specifically, the walking control system freely generates a desired gait necessary for performing posture stabilization control of the robot in accordance with composite-compliance control, as proposed earlier by the present applicant in Japanese Patent Application Laid-Open No. 10-277969.

In the posture stabilization control proposed earlier, a deviation of an actually measured position from a desired position of the floor reaction force central point (ZMP) is detected, and the ground contact portions are driven to eliminate the deviation, to thereby stabilize the posture. In addition, when the robot is apt to tumble, the desired floor reaction force is intentionally shifted so as to shift the actual floor reaction force, to thereby obtain a posture restoring force.

As such, in a limbed mobile robot, it is impossible to ensure stable walking unless the relationship between the desired motion trajectory and the desired floor reaction force pattern satisfies a dynamic balance condition. The dynamic balance condition, as described above, is specifically, for example, that the desired floor reaction force central point (point of application on the floor where the secondary moment of the desired floor reaction force distribution becomes zero) matches the ZMP. If they do not match, when the compliance control is operative, the resultant force of the inertial force and the gravitational force will become unbalanced with the floor reaction force, causing the robot to fall down in the worst case.

The technique proposed earlier takes advantage of this to recover the posture when the robot becomes unstable. However, as apparent from the above, for the limbed mobile robot proposed by the present applicant, not only the desired motion pattern, but also a desired floor reaction force pattern that satisfies the dynamic balance condition against the desired motion pattern are needed as desired values to be given to the walking control as described above.

A desired floor reaction force is generally expressed by a point of application and a force and moment of force applied to the point. As the point of application may be set anywhere, an infinite number of expressions are conceivable for one and the same desired floor reaction force. However, particularly when the desired floor reaction force is expressed by setting the aforesaid desired floor reaction force central point as the point of application, the moment of force becomes zero except for its component perpendicular to the floor.

As stated above, in a gait that satisfies the dynamic balance condition, the ZMP calculated from the desired motion trajectory and the desired floor reaction force central point coincide with each other, and thus, providing a desired ZMP trajectory in place of the desired floor reaction force central point trajectory should mean the same.

Therefore, the above statement can be rephrased as follows: "not only the desired motion trajectory, but also a desired ZMP trajectory (desired floor reaction force pattern) are needed as the desired values to be given to the walking control". On the basis of the above, in this specification, the desired gait is defined as follows.

a) A desired gait in a broad sense is a set of a desired motion trajectory and its desired floor reaction force pattern for a period of one or more steps.

b) A desired gait in a narrow sense is a set of a desired motion trajectory and its ZMP trajectory for a period of one step.

c) A series of walking means a series of gaits connected continuously.

In the following, for ease of understanding, the term "desired gait" will be used to mean the desired gait in the narrow sense, unless otherwise stated.

More specifically, as used herein, a desired gait means a gait for one step. In the case of biped walking, the period of one step corresponds to the period from the beginning of a two-leg supporting period to the end of a one-leg supporting period succeeding thereto, as shown in FIGS. 5A and 5B.

In the case of quadruped walking, the period of one step corresponds to the period from the beginning of a four-limb supporting period to the end of a two-limb (or three-limb) supporting period succeeding thereto, as shown in FIGS. 5A and 5B. In the case of biped-to-quadruped transition, the period of one step refers to one of a plurality of periods (hand lowering period, ZMP moving period, quadruped walking preparation period) into which a series of transition operations during the biped-to-quadruped transition is divided at prescribed timings.

In the case of quadruped-to-biped transition, the period of one step refers to one of a plurality of periods (waist moving period, ZMP moving period, hand lifting period) into which a series of transition operations during the quadruped-to-biped transition is divided at prescribed timings.

Further, at the time of biped walking, the two-leg supporting period refers to a period during which the robot 1 supports its own weight with two legs 2. The one-leg supporting period refers to a period during which the robot 1 supports its own weight with one of the two legs 2.

In the one-leg supporting period, the leg (link) that is not supporting the weight of the robot 1 is called a "free limb". The definitions of the supporting periods at the time of biped walking are described in detail in Japanese Patent Application Laid-Open No. 10-86081 proposed earlier, and thus, no further description will be made here.

The quadruped walking is classified into various types of walking including crawl, trot, pace, and gallop. In the first embodiment, descriptions will be given about the case where the robot 1 performs trot walking, in which two limbs at a time are repeatedly lifted and landed in order of "left upper limb and right lower limb" and "right upper limb and left lower limb", as shown in FIGS. 4A to 4M, and the case where the robot 1 performs crawl walking, in which one limb at a time is repeatedly lifted and landed in order of "left upper limb", "right lower limb", "right upper limb", and "left lower limb", as shown in FIGS. 7A to 7O.

The two-limb supporting period in the quadruped walking refers to the period during which the robot 1 supports its own weight with two limbs out of the legs 2 and the arms 3 in the trot walking, as shown at times t8 to t9 in FIGS. 4 to 6. The limb(s) (leg 2, arm 3) that is/are not supporting the weight of the robot 1 in the three-limb supporting period and the two-limb supporting period is/are called "free limb(s)", as in the case of the biped walking.

The three-limb supporting period in the quadruped walking refers to the period during which the robot 1 supports its own weight with three limbs out of the legs 2 and the arms 3 in the crawl walking, as shown from time t8' in FIG. 7H to time t9" in FIG. 7K.

Further, the four-limb supporting period in the quadruped walking refers to the period during which the robot 1 supports its own weight with both legs 2 and both arms 3.

In the present embodiment, in each of the trot walking and the crawl walking, the four-limb supporting period is provided between the two-limb supporting periods or the three-limb supporting periods, as shown for example in FIGS. 5A and 5B.

The hand lowering period in the biped-to-quadruped transition refers to the period, as shown at times t4 to t5 in FIGS. 4 to 7, from the beginning of the two-leg supporting period in the biped walking until the arms 3 support the weight of the robot 1 through rotation of the waist and lumbar joints (more strictly, to the end of the period during which the arms 3 are in the air).

The ZMP moving period in the biped-to-quadruped transition refers to the period, as shown at time t6 in FIGS. 4 to 7, from when the arms 3 support the weight of the robot 1 (more strictly, from the beginning of the period in which the arms 3 are on the floor) until the posture of the robot 1 is adjusted by moving the ZMP from the optimal position in the two-leg supporting period to the optimal position in the four-limb supporting period (i.e. until the end of the period in which the ZMP is moved to the optimal position in the four-limb supporting period).

The quadruped walking preparation period in the biped-to-quadruped transition refers to the period, as shown at time t7 in FIGS. 4 to 7, from the end of the ZMP moving period until the posture of the robot 1 is adjusted, by moving the waist position, to a posture suitable for quadruped walking (to a posture of the four-limb supporting period in the quadruped walking) (i.e. until the beginning of the four-limb supporting period in the quadruped walking).

The waist moving period in the quadruped-to-biped transition refers to the period, as shown at time t10 in FIGS. 4 to 7, from the beginning of the four-limb supporting period in the quadruped walking and during which the waist position is moved to a prescribed position such that the robot 1 attains a posture suitable for biped walking.

The ZMP moving period in the quadruped-to-biped transition refers to the period, as shown at time t11 in FIGS. 4 to 7, during which the ZMP position is moved to a position optimal for the hand lifting period (where the weight of the robot 1 is supported by only the legs 2).

The hand lifting period in the quadruped-to-biped transition refers to the period, as shown at times t12 to t13 in FIGS. 4 to 7, from the end of the ZMP moving period until the robot 1 stands straight with two limbs, through rotation of the waist and lumbar joints (until the rotations of the waist and lumbar joints are finished).

Here, conditions as a desired gait will be described.

The conditions that the desired gait needs to meet are roughly classified into the following five:

Condition 1) The gait should satisfy the dynamic balance condition. In other words, the ZMP trajectory calculated dynamically from the desired motion trajectory of the robot 1 should agree with the desired ZMP trajectory.

Condition 2) In the case where certain requirements regarding stride, turning angle, etc. that the gait should satisfy are set by a walking planning section or a walking route guiding section (both not shown) of the robot 1 or by an operator, the gait should satisfy those requirements.

Condition 3) The gait should satisfy restriction conditions related to kinematics as follows: that the ground contact portions ("feet" in the case of biped walking, "feet" and "hands" in the case of quadruped walking) will not dig or scrape the floor, that the joint angles will not exceed the movable ranges, and that the joint velocities will not exceed the limits.

Condition 4) The gait should satisfy restriction conditions related to dynamics as follows: that the ZMP should be within a supporting polygon, which will be described later, and that the driving system should not exceed the maximum capability.

Condition 5) The gait should satisfy a boundary condition. As a natural consequence of the condition 1), the boundary condition that at least the position and velocity of each site are continuous at the gait boundary is derived (if they are discontinuous, infinite force would be produced or the ZMP would move to a point far away from the ground contact surface (the surface in contact with the floor) of the robot).

Further, the initial state of the n+1-th gait should agree with the terminal state of the n-th gait (particularly in terms of the position/posture and velocity of the body with respect to the ground contact portions). At this time, when the initial state of the n+1-th gait has been determined, it is possible to make the terminal state of the n-th gait agree with the initial state of the n+1-th gait.

If such a state has not been determined, all that is needed is that the terminal state of the n-th gait falls within the range allowing long-time walking with no collapse in posture.

Continuing the description of the gait, the gait is described by gait parameters. The gait parameters include motion parameters and a ZMP parameter (more generally, a floor reaction force parameter). In this specification, the term "floor reaction force parameter" is used to mean the "parameter related to a temporal pattern of floor reaction force". The ZMP parameter is expressed by the position of break point on a line graph of ZMP trajectory for each of the X, Y, and Z coordinates (directions) and the passing time, as will be described later in conjunction with FIGS. 13A and 13B (where the X coordinate alone is shown).

The motion parameters include ground contact portion (trajectory) parameters and body (trajectory) parameters.

The ground contact portion trajectory parameters include initial free limb position and posture (when leaving the floor) and terminal free limb position and posture (when landing on the floor) of a foot 16, initial free limb position and posture (when leaving the floor) and terminal free limb position and posture (when landing on the floor) of a hand 37, the times of two-leg supporting period, one-leg supporting period, four-limb supporting period, three-limb supporting period, two-limb supporting period, hand lowering period, ZMP moving period, quadruped walking preparation period, waist moving period, ZMP moving period, biped walking preparation period, etc. On the basis of these parameters, instantaneous values of the positions (xf, yf, zf) and postures (θxf, θyf, θzf) of both feet and instantaneous values of the positions (xh, yh, zh) and postures (θxh, θyh, θzh) of both hands are obtained by using the techniques proposed earlier by the present applicant in Japanese Patent Applications Laid-Open Nos. 5-318339 and 5-324115. Here, the posture means "inclination or orientation in a space".

The body trajectory parameters include a parameter determining the posture of the lower body 4b (orientation or inclination of the lower body 4b in a space), a parameter determining the posture of the upper body 4a relative to the lower body 4b (inclination relative to the lower body 4b), a parameter determining the height (value in the Z direction) of the body (upper body 4a), and parameters of the initial position (displacement) and velocity of the body (representative point).

On the basis of the parameters determining the position and posture of the body, instantaneous values of the horizontal position (xb, yb) and posture (θxb, θyb, θzb) of the body (upper body 4a) are obtained by using time functions, the technique proposed earlier by the present applicant in Japanese Patent Application Laid-Open No. 5-324115, or a technique as will be described later. The height zb of the body (upper body 4a) is determined by using an appropriate technique such as, for example, the technique proposed by the present applicant in Japanese Patent Application Laid-Open No. 10-86080.

The limbed mobile robot 1 has 27 joints as shown in FIG. 1. Thus, on the basis of the positions/postures of the ground contact portions and the position/posture of the body obtained, desired joint displacements are uniquely determined by inverse kinematics calculation, as will be described later. That is, the current time's desired posture of the robot is determined uniquely.

Incidentally, an ideal desired gait cannot oppose the physical laws, and therefore, a wanted state cannot be reached quickly. The transition to the wanted state should be made over time by changing the gait parameters, such as the ZMP trajectory, landing position, and landing time, within the permissible regions. In particular, the dynamic system of the biped/quadruped walking robot in the present embodiment becomes a divergence system when it is regarded as the system having the ZMP as an input and the body position as an output. Thus, it will become difficult to restore a normal state unless the gait parameters are changed carefully.

Therefore, for generating a desired gait freely and on a real-time basis, it is desirable to predict future behaviors of the robot and determine how to set the gait parameter values so as not to cause divergence of the robot behavior in the future, for example several steps ahead, and also to adjust the gait so as to avoid divergence when a possibility of occurrence of the divergence is predicted.

Figure 8:
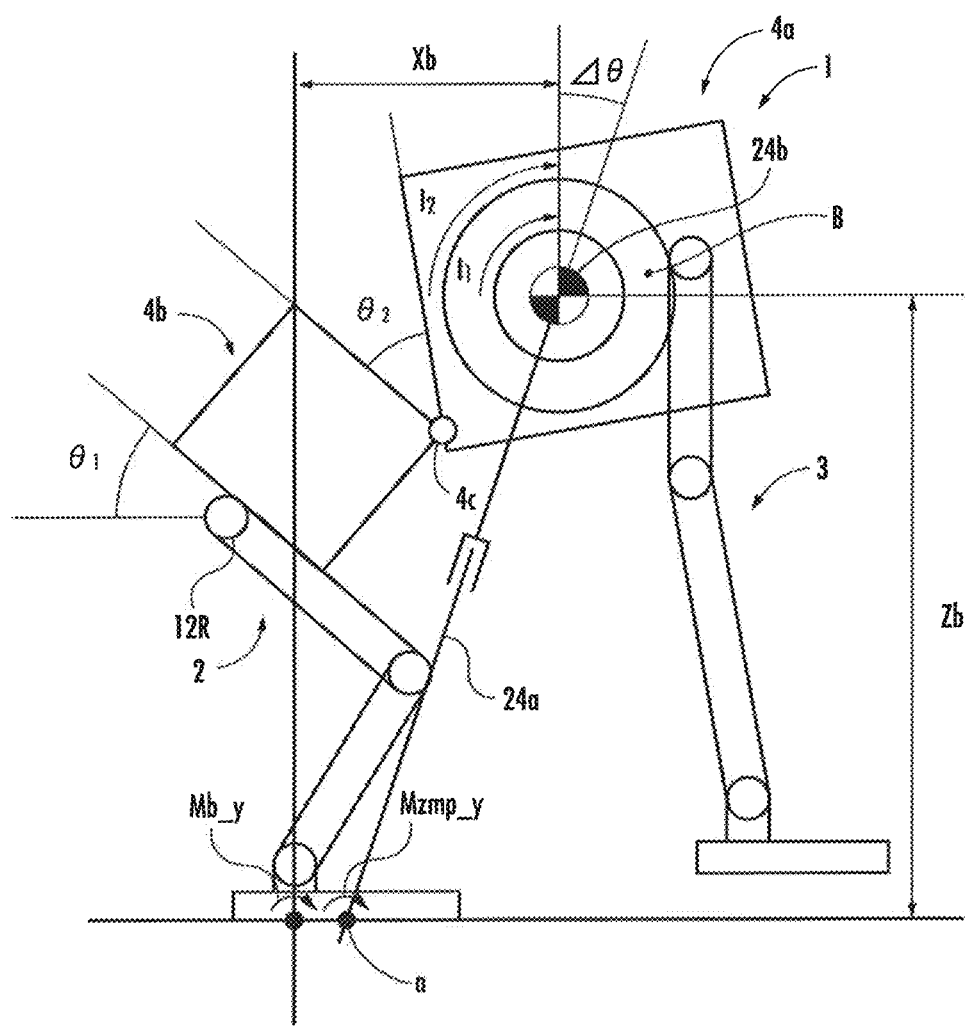
FIG. 8 illustrates a dynamic model obtained by approximating the limbed mobile robot shown in FIG. 1 as an inverted pendulum, the model being used in the gait generation system in the configuration shown in FIG. 3.
Figure 9:
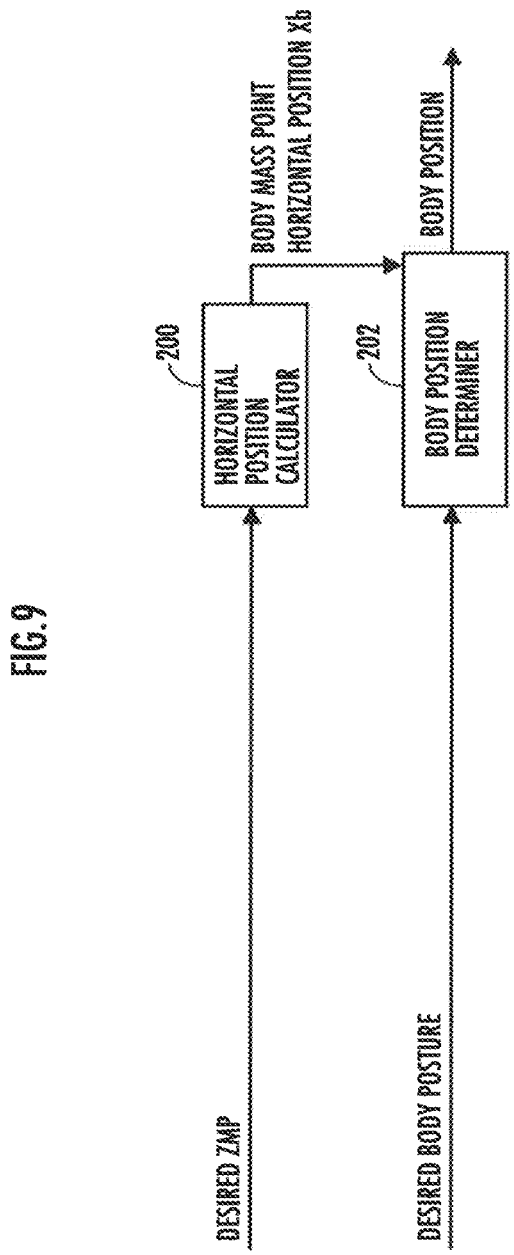
FIG. 9 is a block diagram illustrating dynamic calculations carried out using the dynamic model shown in FIG. 8 by the gait generation system shown in FIG. 3.

In the present embodiment, a dynamic model describing the dynamic behavior of the robot 1 has been simplified to enable predictive calculation of a future robot behavior on a real-time basis and in an analytical manner. FIG. 8 shows the simplified dynamic model. As illustrated, this dynamic model is a single-mass-point model. FIG. 9 is a block diagram showing dynamic calculations which are conducted using the dynamic model shown in FIG. 8 by a dynamic calculation section in the gait generation system 100.

The dynamic model will now be described.

1) This model is made up of a single mass point of an inverted pendulum.

2) The inverted pendulum is made up of a supporting point a, which is freely movable in the horizontal direction, a link 24a, which is variable in length and has no mass, and a mass point 24b. The link 24a connects the supporting point a and the mass point 24b.

3) This model includes two mass-free fly wheels which represent rotational components having the mass point 24b as their common center.

The mass point of the inverted pendulum, in the sense of physics, corresponds to the mass point of the body 4 (which does not necessarily mean the center of gravity). Therefore, the inverted pendulum mass point and the body mass point will be hereinafter regarded as interchangeable terms. The position (in a broader sense, the displacement) of the body mass point will be hereinafter simply called the "body mass point position".

4) The horizontal position of the body is determined geometrically from the horizontal position of the body mass point. Specifically, for example, the horizontal position (XY coordinates observed from the supporting limb coordinate system) of a certain representative point fixed on the body (hereinafter, this point will be called the "body representative point") is moved by a prescribed distance in the direction in which the body 4 is inclined, as indicated by the inclination sensor, from the horizontal position of the body mass point, and the resultant horizontal position of the point is determined as the horizontal position of the body.

The manner of description of variables and parameters related to the illustrated dynamic calculation model will now be described.

The behavior of this dynamic model is mathematized as shown below. It should be noted that, for simplification of explanation, only the equations of motions on a sagittal plane (a plane that contains the X axis and the Z axis of the supporting limb coordinate system) will be described, while the equations of motions on a lateral plane (a plane that contains the Y axis and the Z axis of the supporting limb coordinate system) will not be described.

For convenience of explanation, the variables and parameters related to the dynamic model are defined as follows:

Zb: Vertical position of the body mass point (position in the Z-axis direction)
Xb: Horizontal position of the body mass point (position in the X-axis direction)
Vxb: Horizontal velocity of the body mass point (velocity in the X-axis direction)
mb: Mass of the body mass point
Xzmp: Horizontal position of the desired ZMP (position in the X-axis direction)
Zzmp: Vertical position of the desired ZMP (position in the Z-axis direction)
Fx: Horizontal component of the floor reaction force (specifically, component in the X-axis direction of the translational floor reaction force)
Fz: Vertical component of the floor reaction force (specifically, component in the Z-axis direction of the translational floor reaction force)
Mzmp_y: Floor reaction force moment about the desired ZMP (specifically, component about the Y axis of the floor reaction force moment)

Mb_y: Floor reaction force moment about the origin of the supporting limb coordinate system (specifically, component about the Y axis of the floor reaction force moment)

$\theta_1$: Angle of rotation of the waist joint (angle of rotation about the joint 12 (in the pitch direction) of the lower body 4b relative to the lower limb 2)

$\theta_2$: Angle of rotation of the lumbar joint (angle of rotation about the joint 4c (in the pitch direction) of the upper body 4a relative to the lower body 4b).

For an arbitrary variable A, dA/dt represents the first-order time differential value of A, and d2A/dt2 represents the second-order time differential value of A. Therefore, when the variable A represents a displacement (position), dA/dt indicates the velocity and d2A/dt2 indicates the acceleration. Further, g represents a gravitational acceleration constant. Here, g takes a positive value.

The equations of motions of the above dynamic model are expressed by the following expressions 01 to 04.

$$Fz=mb^*(g+d2Zb/dt2) \qquad \text{Expression 01}$$

$$Fx=mb^*d2Xb/dt2 \qquad \text{Expression 02}$$

$$Mb\_y=-mb^*Xb^*(g+d2Zb/dt2)+mb^*Zb^*(d2Xb/dt2) \qquad \text{Expression 03}$$

$$Mzmp\_y=-mb^*(Xb-Xzmp)^*(g+d2Zb/dt2)+mb^*(Zb-Zzmp)^*(d2Xb/dt2) \qquad \text{Expression 04}$$

In this case, the relationship between Mb_y and Mzmp_y is expressed by the following expression 05.

$$\begin{aligned} Mb\_y &= Mzmp\_y - mb*Xzmp*(g + d2Zb/dt2) + \\ &\quad mb*Zzmp*(d2Xb/dt2) \\ &= Mzmp\_y - Xzmp*Fz + Zzmp*Fx \end{aligned} \qquad \text{Expression 05}$$

It is noted that the positional difference in the vertical direction (Z-axis direction) between the desired ZMP and the origin of the supporting limb coordinate system is generally "0" or substantially "0", so it may be regarded as: Zzmp=0.

The horizontal position and velocity of the body mass point are expressed by the following state equation.

$$\frac{d}{dt}XVb(t) = A\left(Zb(t), \frac{d^2}{dt^2}Zb(t)\right) * XVb(t) + B\left(Zb(t), \frac{d^2}{dt^2}Zb(t)\right) * u(t) \qquad \text{Expression 100}$$

where $$XVb(t) = \begin{bmatrix} Xb(t) \\ Vxb(t) \end{bmatrix} \qquad \text{Expression 100a}$$

$$u(t) = \begin{bmatrix} Xzmp(t) \\ \frac{d^2}{dt^2}\theta_1(t) \\ \frac{d^2}{dt^2}\theta_2(t) \end{bmatrix} \qquad \text{Expression 100b}$$

$$A\left(Zb(t), \frac{d^2}{dt^2}Zb(t)\right) = \begin{bmatrix} 0 & 1 \\ \omega(t)^2 & 0 \end{bmatrix} \qquad \text{Expression 100c}$$

$$B\left(Zb(t), \frac{d^2}{dt^2}Zb(t)\right) = \begin{bmatrix} 0 & 0 & 0 \\ -\omega(t)^2 & \varphi_1(t) & \varphi_2(t) \end{bmatrix} \qquad \text{Expression 100d}$$

$$\omega(t) = \sqrt{\frac{g + \frac{d^2}{dt^2}Zb(t)}{Zb(t)}} \qquad \text{Expression 100e}$$

$$\varphi_i(t) = \frac{I_i}{mb*Zb(t)} \quad i=1,2 \qquad \text{Expression 100f}$$

It is noted that Xzmp(t) represents the ZMP trajectory, $I_1$ represents an inertia moment of the waist joint, and $I_2$ represents an inertia moment of the lumbar joint.

The value obtained by multiplying the second element on the right side of the expression 100b by the second column on the right side of the expression 100d corresponds to the "first rotational motion component" of the present invention. The value obtained by multiplying the third row of the expression 100b by the third column of the expression 100d corresponds to the "second rotational motion component" of the present invention. The denominator on the right side of the expression 100e corresponds to the "center of gravity component" of the present invention. The second term of the numerator on the right side of the expression 100e corresponds to the "inertial force-dependent manipulated variable component" of the present invention.

It should be noted that the "first rotational motion component" and the "second rotational motion component" are components which vary, not only by the rotations of the first base body 4b and the second base body 4a, but also by the rotations of, for example, the upper limbs 3R, 3L.

Here, $d^2\theta_1/dt^2(t)$ and $d^2\theta_2/dt^2(t)$ in the expression 100b may be fixed to "0" in the cases of biped walking and biped running on a flat ground. In the cases of biped-to-quadruped transition (quadruped-to-biped transition) and quadruped walking, $d^2\theta_1/dt^2(t)$ and $d^2\theta_2/dt^2(t)$ in the expression 100b take values other than "0". Further, in the cases of biped walking, biped running, and quadruped walking, Zb(t) may be regarded as a constant value. For example, in the cases of biped walking and biped running, an average value h1 of the vertical position of the center of gravity during the biped walking or biped running may be adapted as Zb(t). In the case of quadruped walking, an average value h2 of the vertical position of the center of gravity during the quadruped walking may be adapted as Zb(t). Rewriting the expression 100 to an expression based on a discrete time system provides the following state equation 102.

$$XVb[k+1]=A(k)^*XVb[k]+B(k)^*u(k) \qquad \text{Expression 102}$$

The variables followed by suffixes (k) and (k+1) mean the value at the k-th time and the value at the k+1-th time, respectively, in the discrete time system. In the following description, the k-th time and the k+l-th time may be denoted simply by "time k" and "time k+1", respectively, in some cases.

As defined in the note to the expression 100 above, XVb(k) in the expression 102 denotes a state variable vector (column vector) taking the horizontal position Xb of the body mass point 24b and the horizontal velocity Vxb, which is the temporal change rate thereof, as the state variables.

Further, A(k) and B(k) in the expression 102 denote a square matrix (state transition matrix) of order 2 and a matrix of two rows and three columns, respectively, and their component values are determined as indicated by the following expressions 104a and 106a. It is noted that ΔT represents a notch time in the discrete time system, and ω represents the angular frequency value defined by the expression 108c in the following note. While the expressions for determining A(k) and B(k) would vary depending on whether the sum of the gravitational force g and $d^2Zb(t)/dt^2$ is larger than zero or not, the sum of the gravitational force g and $d^2Zb(t)/dt^2$ is larger than zero in usual walking. Therefore, in the following, only the case where the sum of the gravitational force g and $d^2Zb(t)/dt^2$ is larger than zero will be described.

$$A(k) = \begin{bmatrix} \cosh(\Delta T \omega(k)) & \frac{\sinh(\Delta T \omega(k))}{\omega(k)} \\ \omega(k)\sinh(\Delta T \omega(k)) & \cosh(\Delta T \omega(k)) \end{bmatrix}$$ Expression 104a $$B(k) = \begin{bmatrix} b_1 & \varphi_1(k)b_1 & \varphi_2(k)b_1 \\ b_2 & \varphi_1(k)b_2 & \varphi_2(k)b_2 \end{bmatrix}$$ Expression 106a where $b_1 = (1 - \cosh(\Delta T \omega(k)))$  Expression 108a $b_2 = -\omega(k)\sinh(\Delta T \omega(k))$  Expression 108b $$\omega(k) = \sqrt{\left|\frac{g + \frac{d^2}{dt^2}Zb(k)}{Zb(k)}\right|}$$ Expression 108c $\varphi_i(k) = \frac{l_i}{mb*Zb(k)}$  $i = 1, 2$  Expression 108d A second embodiment of the present invention differs from the first embodiment in that the following expressions 108e and 108f are used in place of the expressions 108c and 108d in the first embodiment. It is noted that h1 represents an average value of the center of gravity of the robot 1 at the time of biped walking.

$$\omega(t) = \sqrt{\frac{g + \frac{d^2}{dt^2}Zb(t)}{h1}}$$ Expression 108e $\varphi_i(t) = \frac{l_i}{mb*h1}$  $i = 1, 2$  Expression 108f A third embodiment of the present invention differs from the first embodiment in that the following expression 106b is used in place of the expression 106a in the first embodiment.

$$B(k) = \begin{bmatrix} b_1 & \varphi_1(k)b_1 \\ b_2 & \varphi_1(k)b_2 \end{bmatrix}$$ Expression 106b A comparative embodiment differs from the first embodiment in that the above expressions 106b, 108e, and 108f are used in place of the expressions 106a, 108c, and 108d in the first embodiment.

Referring to FIG. 9, an operation of the dynamic calculation section of the gait generation system 100 (shown in FIG. 3) will be described. A horizontal position calculator 200 in the dynamic calculation section calculates a body mass point horizontal position Xb from a desired ZMP in accordance with the expression 100.

Further, as shown in FIG. 9, the dynamic calculation section includes a body position determiner 202. The body position determiner 202 determines the horizontal position of the body from the body mass point horizontal position Xb.

Continuous posture stability in gaits will now be described.

The dynamic model described above merely calculates the body trajectory from the desired ZMP so as to approximately satisfy the dynamic balance condition at each instant; it does not prevent the divergence of the body trajectory (or, it does not prevent the position of the body 4 from deviating far away from the positions of the ground contact portions).

In the following, a description will be made about the way of preventing the divergence of the body trajectory and maintaining an appropriate positional relationship between the body and the ground contact portions.

First, a divergent component is defined, which is a motion component having divergent property when the same gait is repeated infinitely.

In the system expressed by the state equation of the above expression 102, when the initial value XVb[0] (the value of XVb at time (time 0) when k=0) of the state variable vector XVb and the time series of input moment Min (horizontal component Mb_y of the floor reaction force moment) from time 0 to time k−1 are given, the value XVb[k] of the state variable vector XVb at an arbitrary time k (>0) is given by the following expression 110.

$$XVb[k] = \phi(k, 0)XVb[0] + \sum_{i=0}^{k-1}\phi(k, i+1)B(i)u[i]$$ Expression 110

$$\phi(k, j) = \begin{cases} A(k-1)A(k-2), \ldots, A(j) & \text{if } (k > j) \\ I & \text{otherwise} \end{cases}$$

In the above expression, I denotes an identity matrix.

Attention will now be paid to the behavior of the inverted pendulum model in the gait described above. It is here assumed that the starting time Ts of a gait is the time when k=0, that the ending time Te (=Ts+Tcyc) of the gait is the time when k=kcyc (where kcyc=Tcyc/ΔT), and that the state variable vector XVb defined by the motion of the gait at the starting time Ts is XVb(0). Further, of the state variable vector XVb at the ending time Te (when k=kcyc) of the gait, the component dependent on the state variable vector value XVb at the starting time Ts of the gait is denoted by XVb(kcyc). At this time, the relationship between XVb(kcyc) and XVb(0) is expressed by the following expression 112 on the basis of the above expression 110.

$XVb(kcyc) = \phi(kcyc, 0)*XVb(0)$  Expression 112 where $\phi(kcyc,0) = A(kcyc-1)* \ldots *A(1)*A(0)$

Further, two eigenvalues of the matrix $\phi(kcyc, 0)$ on the right side of the expression 112 are denoted by λ1 and λ2, eigenvectors (column vectors) corresponding to the respective eigenvalues are denoted by $(a11,a21)^T$ and $(a12,a22)^T$ (where the superscript T represents transposition of vectors or rows and columns), and a square matrix of order 2 having these eigenvectors as the first column and the second column, respectively, is denoted by Γcyc. A matrix obtained by diagonalizing $\phi(kcyc, 0)$ using the matrix Γcyc is denoted by Λ. That is, Λ is defined by the following expression 114. Hereinafter, the matrix Γcyc will be referred to as the diagonalizing matrix.

$$\Lambda = \Gamma_{cyc}^{-1} * \phi(k_{cyc}, 0) * \Gamma_{cyc}$$ Expression 114

-continued where $$\Lambda \equiv \begin{bmatrix} \lambda 1 & 0 \\ 0 & \lambda 2 \end{bmatrix}$$

$$\Gamma_{cyc} \equiv \begin{bmatrix} a11 & a12 \\ a21 & a22 \end{bmatrix}$$

$$\phi(k_{cyc}, 0) * \begin{bmatrix} a11 \\ a21 \end{bmatrix} = \lambda 1 * \begin{bmatrix} a11 \\ a21 \end{bmatrix}$$

$$\phi(k_{cyc}, 0) * \begin{bmatrix} a12 \\ a22 \end{bmatrix} = \lambda 2 * \begin{bmatrix} a12 \\ a22 \end{bmatrix}$$

The following expression 116 is derived from the expression 114 and the above expression 112.

$$\Gamma cyc^{-1} * XVb(kcyc) = \Lambda * \Gamma cyc^{-1} * XVb(0) \qquad \text{Expression 116}$$

Here, a vector obtained by linearly converting a state variable vector XVb(k) at an arbitrary time k by an inverse matrix $\Gamma cyc^{-1}$ of the diagonalizing matrix $\Gamma cyc$ is denoted by $(p(k),q(k))^T$ (hereinafter, this vector will be referred to as the "converted state variable vector"). That is, the converted state variable vector $(p(k),q(k))^T$ is defined by the following expression 118.

$$(p(k),q(k))^T = \Gamma cyc^{-1} * XVb(k) \qquad \text{Expression 118}$$

The following expression 120 is derived from the expression 118 and the above expression 116.

$$(p(kcyc),q(kcyc))^T = \Lambda * (p(0),q(0))^T \qquad \text{Expression 120}$$

In this expression 120, if $\lambda 1 > 1$, then the absolute value of p(kcyc)>the absolute value of the initial value p(0), whereas if $\lambda 1 \leq 1$, then the absolute value of p(kcyc)≤the absolute value of the initial value p(0). Similarly, if $\lambda 2 > 1$, then the absolute value of q(kcyc)>the absolute value of the initial value q(0), whereas if $\lambda 2 \leq 1$, then the absolute value of q(kcyc)≤the absolute value of the initial value q(0).

On the other hand, in the gait in the first embodiment, generally, one of the two eigenvalues $\lambda 1$ and $\lambda 2$ of $\phi(kcyc,0)$ takes a value that is larger than "1", while the other takes a value that is smaller than "1".

Therefore, hereinafter, it is assumed that $\lambda 1 < 1$ and $\lambda 2 > 1$. That is, of the converted state variable vector $(p(k),q(k))^T$, the first component p(k) is assumed to be a component corresponding to the eigenvalue $\lambda 1$ that is smaller than "1", and the second component q(k) is assumed to be a component corresponding to the eigenvalue $\lambda 2$ that is larger than "1". At this time, p(k) has a meaning as the state quantity of a motion component having convergent property in a gait repeated infinitely, and q(k) has a meaning as the state quantity of a motion component having divergent property in the gait repeated infinitely.

Accordingly, in the first embodiment, the second component q(k) of the converted state variable vector $(p(k),q(k))^T$ defined by the expression 118 is defined as the aforesaid divergent component. The divergent component q(k) thus defined takes a value resulting from linear combination of the state variables Xb(k) and Vxb(k). In this case, the weighting coefficients by which Xb(k) and Vxb(k) are multiplied in the linear combination are determined dependent on the time series of the inertial force of the body mass point 24b within the period of one cycle of a normal gait. It is noted that the first component p(k) of the converted state variable vector $(p(k),q(k))^T$ defined by the expression 118 is called the convergent component.

It should be noted that the convergent component p(k) and the divergent component q(k) defined by the above expression 118 are, more specifically, the convergent component p(k) and the divergent component q(k) on a sagittal plane (the convergent component and the divergent component corresponding to the state variable vector XVb having, as its components, the horizontal position Xb and the horizontal velocity Vxb of the body mass point 24b in the X-axis direction). The convergent component and the divergent component on a lateral plane are defined in a similar manner. Specifically, the convergent component and the divergent component on the lateral plane are defined by an expression corresponding to the expression 118 in which the components Xb and Vxb of the state variable vector XVb(k) on the right side thereof have been replaced with the horizontal position and the horizontal velocity, respectively, of the body mass point 24b in the Y-axis direction. In this case, the matrix $\Gamma cyc^{-1}$ in the expression 118 remains the same in both axial directions of the X-axis direction and the Y-axis direction.

A gait generation algorithm which ensures continuity of walking by using the aforesaid divergent component will now be described.

It was previously discussed that, in order to prevent the divergence of the body trajectory and maintain an appropriate positional relationship between the body and the ground contact portions, it would be important to determine ZMP trajectory parameters and other parameters appropriately such that the divergent component would remain within the range causing no problem in walking (the range in which the change in posture would be small). The next problem is how to determine the range of the divergent component that will cause no problem in walking or an appropriate value of the divergent component.

The gait generation system 100 according to the present embodiment has been configured to determine an appropriate value of the divergent component by provisionally assuming a gait (hereinafter, called "normal turning gait", which will be described later) that is to be continuous to the gait generated this time. The operations of the gait generation system 100 will be described below in detail.

The gait generation system 100 receives, as inputs, required values (requests) of the free limb ground contact portion landing position/posture and landing time for next two steps, and determines a desired body position/posture trajectory, a desired ground contact portion position/posture trajectory, and a desired ZMP trajectory. At this time, some of the gait parameters are corrected to satisfy the continuity of walking. A gait that is about to be generated will be called a "current time gait", a gait succeeding thereto will be called a "next time gait", and a gait further succeeding thereto will be called a "next but one time gait".

Figure 10:
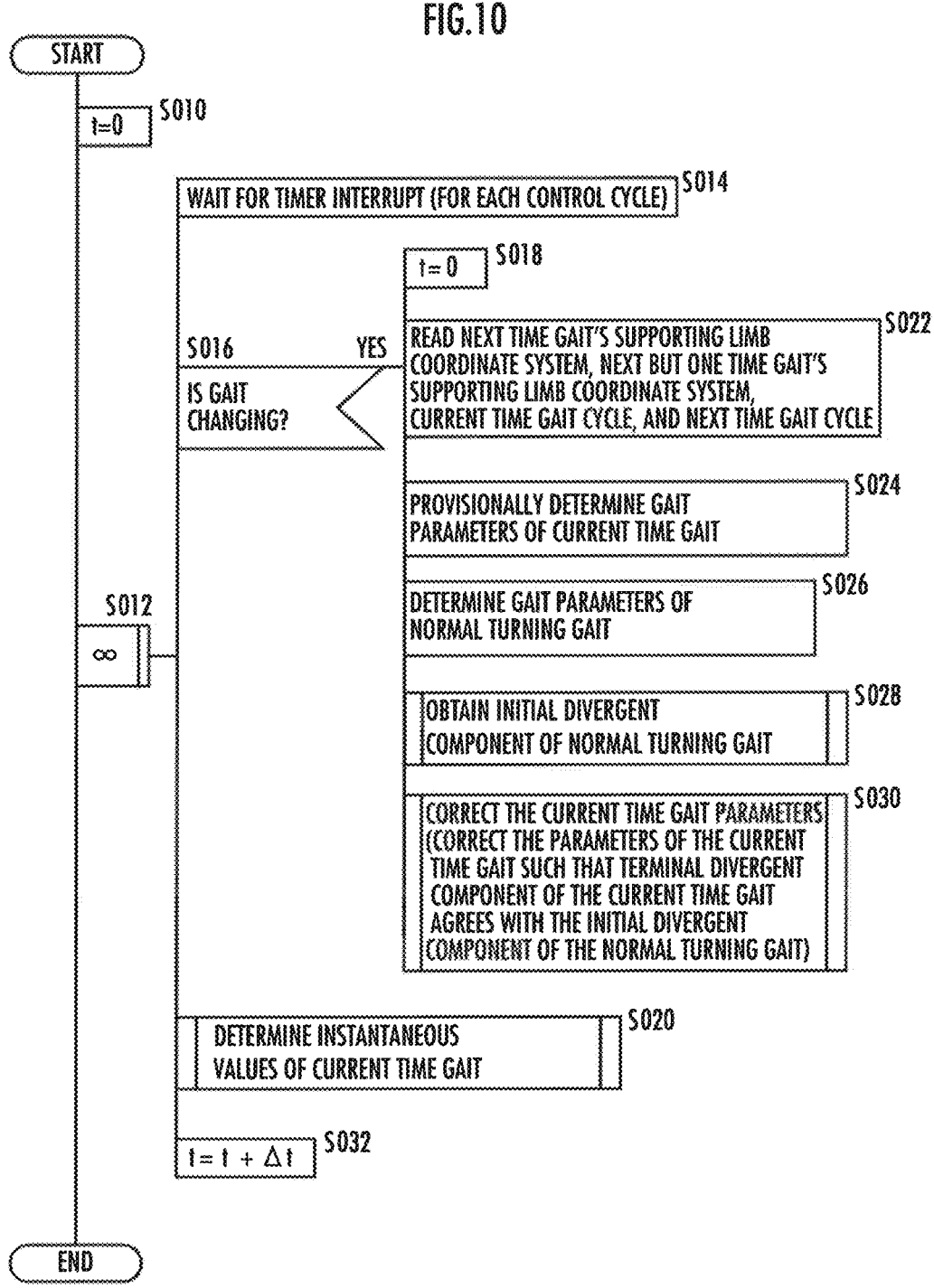
FIG. 10 is a flowchart illustrating an operation of the gait generation system of the limbed mobile robot shown in FIG. 1.

FIG. 10 is a flowchart (structured flowchart) illustrating the gait generating processing carried out by the gait generation system 100.

The flow will now be described. First, in S010, various initialization works are performed, including initialization of time t to "0". The process then proceeds through S012 to S014, where the device 100 waits for a timer interrupt for each control cycle. The control cycle is denoted by $\Delta t$. Next, the process proceeds to S016, where the device determines whether a gait is changing. If so, the process proceeds to S018; otherwise, the process proceeds to S020.

When the process proceeds to S018, the time t is initialized to "0", and then the process proceeds to S022, where a next time gait's supporting limb coordinate system, a next but one time gait's supporting limb coordinate system, a current time gait cycle, and a next time gait cycle are read. These correspond to the above-described requests. They may be stored in advance as a walking schedule, or they may be determined on the basis of external commands (requests) received via a wireless network or the like as well as the history of walking up to that time.

The process then proceeds to S024, where gait parameters of the current time gait are determined (calculated) provisionally.

The current time gait's initial free limb ground contact portion position/posture are set to be the present free limb position/posture observed from the current time gait's supporting limb coordinate system (as the initial values). The current time gait's initial supporting limb ground contact portion position/posture are set to be the present supporting limb position/posture observed from the current time gait's supporting limb coordinate system (as the initial values). The current time gait's terminal free limb ground contact portion position/posture are determined in response to the next time gait's supporting limb coordinate system observed from the current time gait's supporting limb coordinate system. That is, it is set such that the position/posture of the ground contact portion, obtained when the ground contact portion, kept in contact with the floor, is rotated to the horizontal level, without slippage, from the terminal free limb ground contact portion position/posture in the current time gait, will correspond to the next time gait's supporting limb coordinate system.

The current time gait's terminal supporting limb ground contact portion position/posture are set to be position/posture of the ground contact portion when the ground contact portion, kept in contact with the floor, is rotated from the present supporting limb position/posture, without slippage, until the ground contact portion comes into surface contact with the floor. Therefore, if the floor surface is flat, the current time gait's terminal supporting limb ground contact portion position/posture agree with the current time gait's supporting limb coordinate system. It should be noted that, while the supporting limb ground contact portion becomes horizontal at the end of this gait, it does not necessarily have to be set in this manner.

The ZMP trajectory parameter of the current time gait is determined such that it has a high stability allowance and does not develop an abrupt change (Having a high stability allowance refers to a state where the ZMP is present at or near the center of a smallest convex polygon (convex region) (the so-called supporting polygon) that includes the ground contact surface (the surface in contact with the floor) of the robot (as described in detail in Japanese Patent Application Laid-Open No. 10-86081)). The ZMP trajectory parameter of the current time gait, thus determined provisionally, will be corrected as will be described later.

With S024, the gait generation system 100 functions as a unit which calculates a required total floor reaction force central point position, which will be described in detail later.

In the first through third embodiments, the convex polygon including the ground contact surface of the robot is expressed as the "supporting polygon". The region including the ground contact surface of the robot, however, does not necessarily have to be a polygon; it may be a circular region, for example.

The method for determining the ZMP in quadruped walking will be described later.

Next, the process proceeds to S026, where gait parameters of the normal turning gait that is to be continuous to the current time gait are determined.

As used herein, the "normal turning gait" means a cyclic gait that will cause no discontinuity in the motional states at the gait boundary when the gait is repeated.

The normal turning gait comprises a first turning gait to an n-th turning gait in accordance with the gait type.

More specifically, in the case of biped walking gait, gaits for next two steps are configured as the first turning gait and the second turning gait.

Of the quadruped walking gait, in the case of crawl walking gait, gaits for next four steps are configured as the first through fourth turning gaits.

Of the quadruped walking gait, in the case of trot walking gait, gaits for next two steps are configured as the first turning gait and the second turning gait.

In the case of biped-to-quadruped transition gait, the normal turning gait comprises gaits for a required number of steps, in accordance with the transition state, from the following: one step in the hand lowering period, one step in the ZMP moving period, one step in the quadruped walking preparation period, and first through fourth steps (or first and second steps) in the succeeding quadruped walking.

In the case of quadruped-to-biped transition gait, the normal turning gait comprises gaits for a required number of steps, in accordance with the transition state, from the following: one step in the waist moving period, one step in the ZMP moving period, one step in the hand lifting period, and first and second steps in the succeeding biped walking.

The term "turning" is used here because, as the turning rate of zero means traveling straight ahead, such straight advancement can also be included in "turning" in a broad sense. The normal turning gait is tentatively generated by the gait generation system 100 for determining a divergent component at the end of the current time gait. Therefore, the normal turning gait, as it is, is not output from the gait generation system 100.

First, boundary conditions of each trajectory in the gait parameters of the first turning gait to the n-th turning gait are set such that each trajectory is made continuous in order of the current time gait, the first turning gait, . . . , and the n-th turning gait.

Specifically, the first turning gait's initial free limb ground contact portion position/posture are set to be the current time gait's terminal supporting limb ground contact portion position/posture observed from the next time gait's supporting limb coordinate system. The first turning gait's initial supporting limb ground contact portion position/posture are set to be the current time gait's terminal free limb ground contact portion position/posture observed from the next time gait's supporting limb coordinate system.

The first turning gait's terminal free limb ground contact portion position/posture are determined in response to the next but one time gait's supporting limb coordinate system observed from the next time gait's supporting limb coordinate system, as in the case of determining the current time gait's terminal free limb ground contact portion position/posture. The first turning gait's terminal supporting limb ground contact portion position/posture are set to be position/posture of the ground contact portion when the ground contact portion that has been set to the next time gait's supporting limb coordinate system is rotated, while being kept in contact with the floor and without slippage, until the ground contact portion comes into surface contact with the floor. Therefore, if the floor surface is flat, the first turning gait's terminal supporting limb ground contact portion position/posture agree with the next time gait's supporting limb coordinate system.

The second turning gait's initial free limb ground contact portion position/posture are set to be the first turning gait's terminal supporting limb ground contact portion position/posture observed from the next but one time gait's supporting limb coordinate system. The second turning gait's initial supporting limb ground contact portion position/posture are set to be the first turning gait's terminal free limb ground contact portion position/posture observed from the next but one time gait's supporting limb coordinate system.

The second turning gait's terminal free limb ground contact portion position/posture are set to be the current time gait's terminal free limb ground contact portion position/posture observed from the current time gait's supporting limb coordinate system. The second turning gait's terminal supporting limb ground contact portion position/posture are set to be the current time gait's terminal supporting limb ground contact portion position/posture observed from the current time gait's supporting limb coordinate system.

Figure 11:
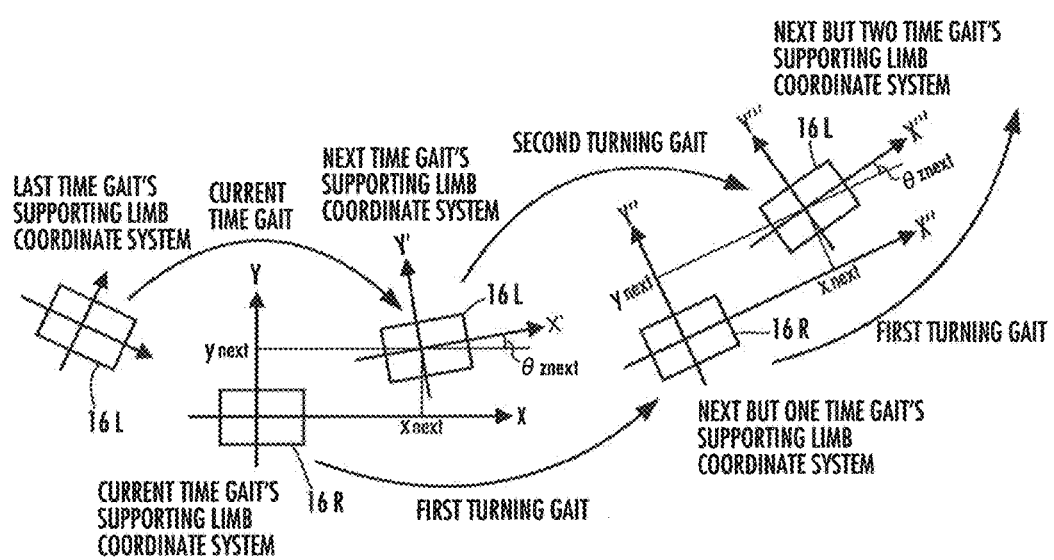
FIG. 11 is a diagram illustrating, by landing positions etc., a normal turning gait which is used in the flowchart in FIG. 10.

These relationships are illustrated in FIG. 11.

The first turning gait and the second turning gait have their gait cycles identical to that of the next time gait (while they do not necessarily have to be identical, it is preferable that they are determined in accordance with the next time gait cycle). The remaining motion parameters of the current time gait, the first turning gait, and the second turning gait (including time parameters such as the time of two-leg supporting period) are determined as appropriate, in accordance with the determined parameters described above, so as to satisfy the gait conditions (including the condition that the velocity of each electric motor (actuator) falls within the permissible region).

The ZMP trajectory parameters of the first turning gait and the second turning gait are also determined such that they have a high stability allowance and do not develop an abrupt change.

Incidentally, in the case where the initial position and velocity of the body representative point are set to certain values Xb0 and Vb0, when the simple model shown in FIG. 8 is used to generate the above-described first through n-th turning gaits and then generate the first turning gait again, the initial position and velocity of the body representative point become equal to the set values Xb0 and Vb0 of the initial position and velocity of the body representative point.

When the values are set in the above-described manner, even when some of the first through n-th turning gaits (corresponding to biped walking or quadruped walking) are generated repeatedly using the simple model shown in FIG. 8, the initial position and velocity of the body representative point in the first turning gait will take the values Xb0 and Vb0, unless the computation errors are accumulated. In other words, the continuity of walking is guaranteed. The divergent component at this time is called the "initial divergent component of the normal turning gait".

Returning to the explanation of FIG. 10, next, the process proceeds to S028, where the initial divergent component of the normal turning gait is obtained.

Figure 12:
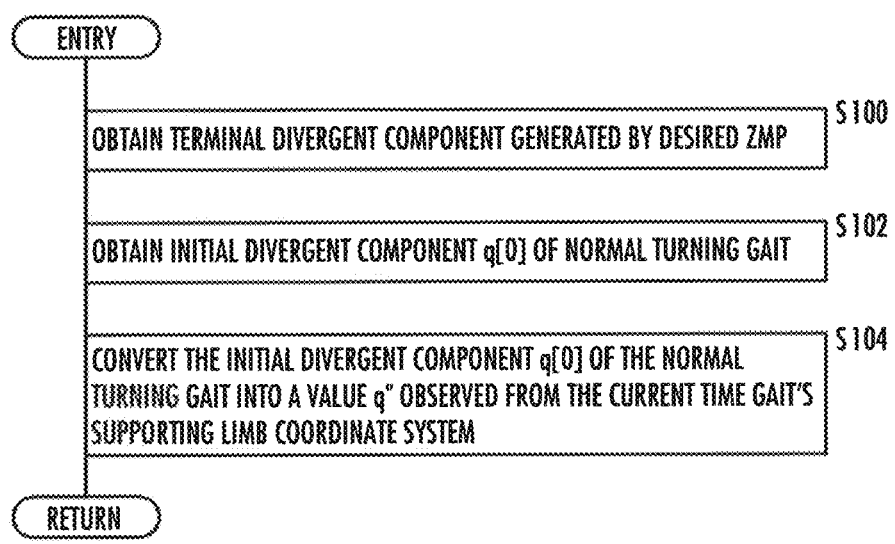
FIG. 12 is a subroutine flowchart illustrating the calculation work of an initial divergent component of the normal turning gait in the flowchart in FIG. 10.

FIG. 12 is a flowchart of the subroutine for calculating the initial divergent component of the normal turning gait in S028 in the flowchart in FIG. 10.

Before starting the description of this figure, a principle for calculating the initial divergent component of the normal turning gait will be described.

In accordance with the definition of the divergent component q explained previously, an initial divergent component q[0] of a normal turning gait is calculated as follows.

On the basis of the normal turning gait parameters, the vertical positions $Zb(0)$ and $Zb(k_{cyc})$ of the body mass point, the vertical accelerations $g+d2Zb/dt2(0)$ and $g+d2Zb/dt2(k_{cyc})$ of the body mass point, and $u(0)$ and $u(k_{cyc})$, at the initial time 0 and at the end $k_{cyc}$ of the normal turning gait are obtained.

Here, it is set such that $\Gamma_{cyc}^{-1}=(v_p^T, v_q^T)^T$. At this time, the divergent component at time k is given by the following expression 122.

$$q[k] = \lambda_q q[0] + v_q^T \sum_{i=0}^{k-1} \phi(k, i+1) * B(i) * u[i]$$
$$= \lambda_q q[0] + q_u[k]$$

where $$q_u[k] = v_q^T \sum_{i=0}^{k-1} \phi(k, i+1) * B(i) * u[i]$$

Expression 122

On the other hand, the following expression 124 holds in accordance with the boundary conditions of the normal turning gait explained previously.

$$q[ke]=Rz*(q[0]+o_{next})$$  Expression 124

It is noted that Rz represents mapping obtained by rotating by a posture angle $\theta_{next}$ the supporting limb coordinate system of the next normal turning gait observed from the supporting limb coordinate system of the target normal turning gait (coordinate system of the first turning gait that is continuous to the n-th turning gait of the target normal turning gait), $o_{next}$ represents the coordinate of the origin of the supporting limb coordinate system of the next normal turning gait observed from the supporting limb coordinate system of the target normal turning gait, and ke represents the time at the end of the n-th turning gait of the normal turning gait.

On the other hand, the following expression 126 holds from the above expression 122.

$$q[ke]=\lambda_q q[0]+q_u[ke]$$  Expression 126

The following expression 128 is obtained by combining the expressions 124 and 126.

$$q[0]=(Rz-\lambda_q I)^{-1}*(q_u[ke]-Rz*o_{next})$$  Expression 128

In the above-described manner, the initial divergent component q[0] of the normal turning gait can be calculated.

On the premise of the above-described calculation principle, the process will now be described with reference to the flowchart in FIG. 12. In S100, a terminal divergent component produced by the desired ZMP is obtained in the above-described manner. Then, in S102, an initial divergent component q[0] of a normal turning gait is obtained using the expression 128. The initial divergent component q[0] of the normal turning gait is a value observed from the supporting limb coordinate system of the normal turning gait.

Next, in S104, the initial divergent component q[0] of the normal turning gait is converted into a value observed from the supporting limb coordinate system of the current time gait. This value is denoted by q".

The next task is to correct the gait parameters of the current time gait provisionally determined as described above, such that the terminal divergent component of the current time gait agrees with q". This processing is almost the same as the processing in the normal turning gait described above. Thus, in the following, the variables, values, and symbols are made to correspond to the current time gait anew.

In this embodiment, it is assumed that the ZMP trajectory parameter is corrected, although other gait parameters may be corrected.

The ZMP is corrected by adding a ZMP correction amount (corrected amount or added amount) to the aforesaid, provisionally determined desired ZMP (this will be called the "provisional desired ZMP"). The thus corrected ZMP will be defined as a desired ZMP anew. These relationships are illustrated in FIGS. 13A and 13B.

As shown in the figures, the desired ZMP parameter is corrected such that the desired ZMP=provisional desired ZMP+ZMP correction amount.

Figure 13A:
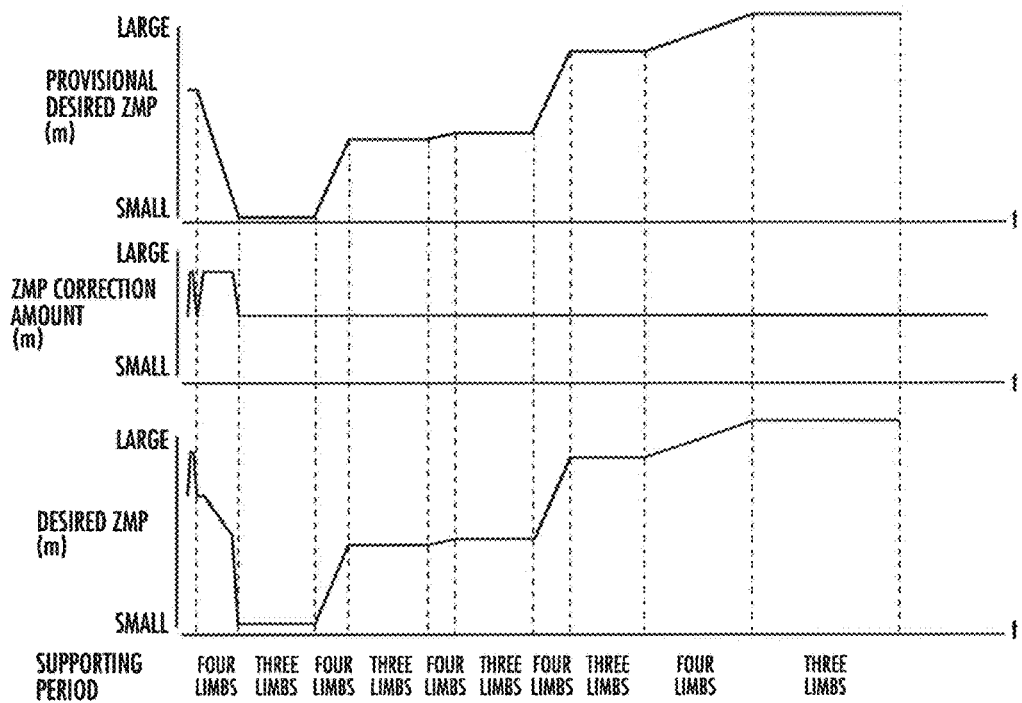
FIG. 13A is a time chart illustrating the operation of correcting a desired ZMP, which is a gait parameter of current time gait in crawl gait, in the flowchart in FIG. 10, on the basis of the initial divergent component calculated in the flowchart in FIG. 12.
Figure 13B:
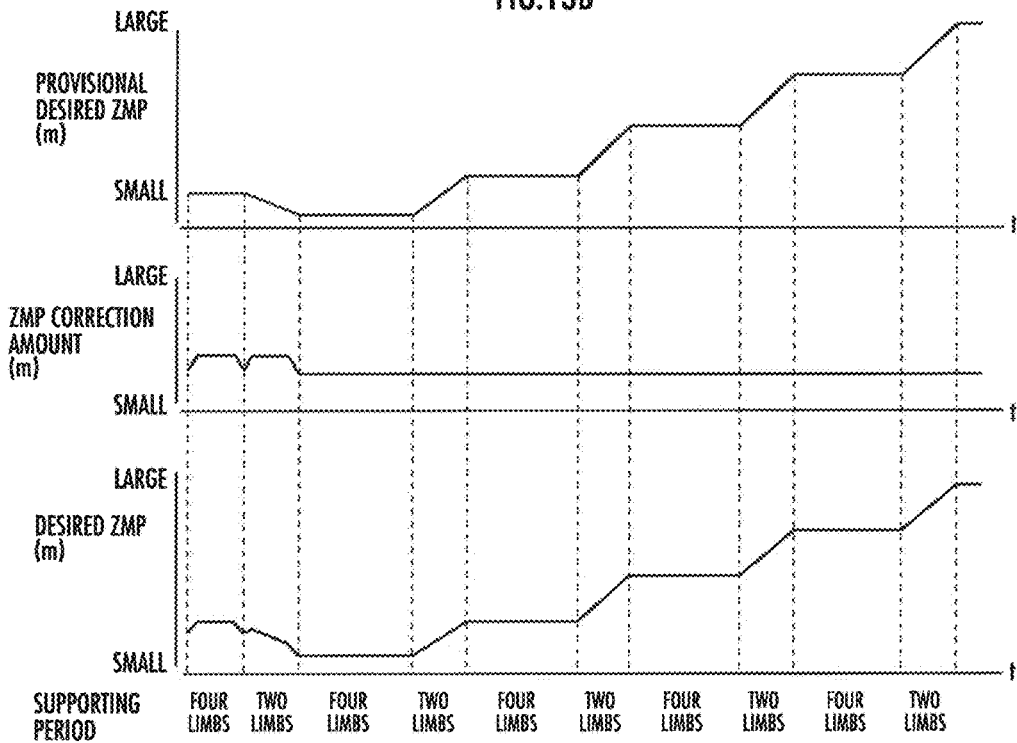
FIG. 13B is a time chart illustrating the operation of correcting a desired ZMP, which is a gait parameter of current time gait in trot gait, in the flowchart in FIG. 10, on the basis of the initial divergent component calculated in the flowchart in FIG. 12.

The ZMP correction amount is of a trapezoidal shape, as shown in the middle in FIGS. 13A and 13B, with its height denoted by "a".

For example, the height "a" is calculated by the following expression 130.

$$a = \frac{q[0] - v_q^T X V b[0]}{q_{template}}$$ Expression 130

It is noted that $q_{template}$ is a factor predetermined for adjustment of the ZMP correction amount.

Lastly, the parameter of the desired ZMP is corrected such that the sum of the provisional desired ZMP and the ZMP correction amount becomes the desired ZMP. As a result, the terminal divergent component of the current time gait agrees with the value q' which is the initial divergent component of the normal turning gait observed from the current time gait.

Returning to the explanation of the flowchart in FIG. 10, the process then proceeds to S030, where the current time gait parameters are corrected. Specifically, the gait parameters of the current time gait are corrected such that the terminal divergent component of the current time gait agrees with the initial divergent component q" of the normal turning gait.

Figure 14:
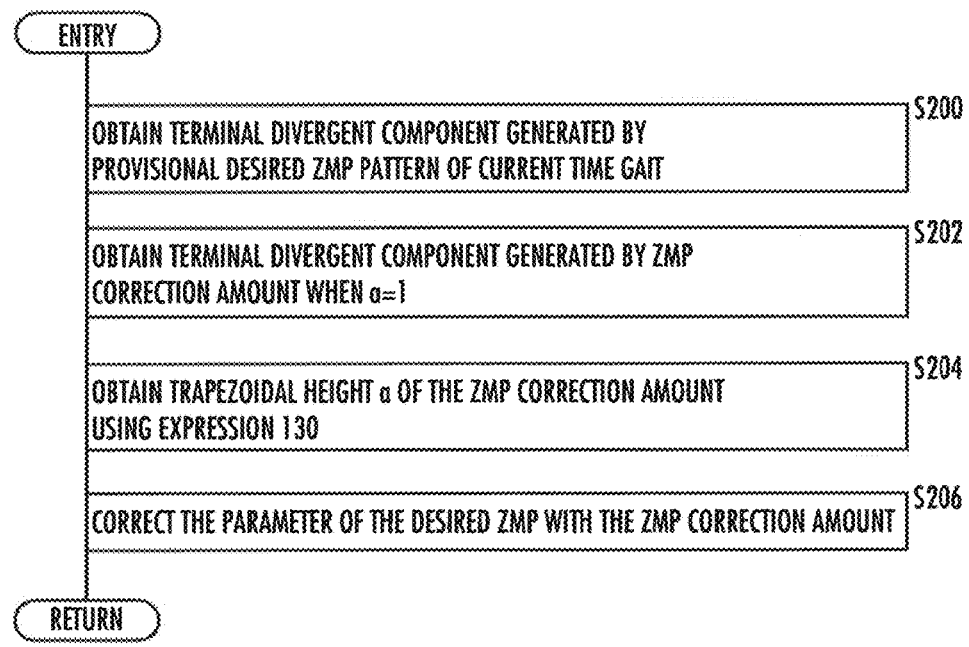
FIG. 14 is a subroutine flowchart illustrating the operation of correcting the desired ZMP of the gait parameter of the current time gait based on the initial divergent component in the flowchart in FIG. 10.

FIG. 14 is a subroutine flowchart illustrating the processing.

Explaining this, in S200, the terminal divergent component generated by the provisional desired ZMP pattern of the current time gait is obtained. Then, in S202, the terminal divergent component generated by the ZMP correction amount when a=1 is obtained.

The process then proceeds to S204, where the initial divergent component q[0] of the current time gait is obtained from the initial position and velocity of the body mass point, and the obtained value is substituted into the expression 130, to thereby obtain the trapezoidal height a of the ZMP correction amount. Then, in S206, the parameter of the desired ZMP is corrected as described above.

The above has described the processing performed when the gait is changing.

Returning to the explanation of the flowchart in FIG. 10, the process then proceeds to S020, where the instantaneous values of the current time gait are determined from the determined gait parameters.

Figure 15:
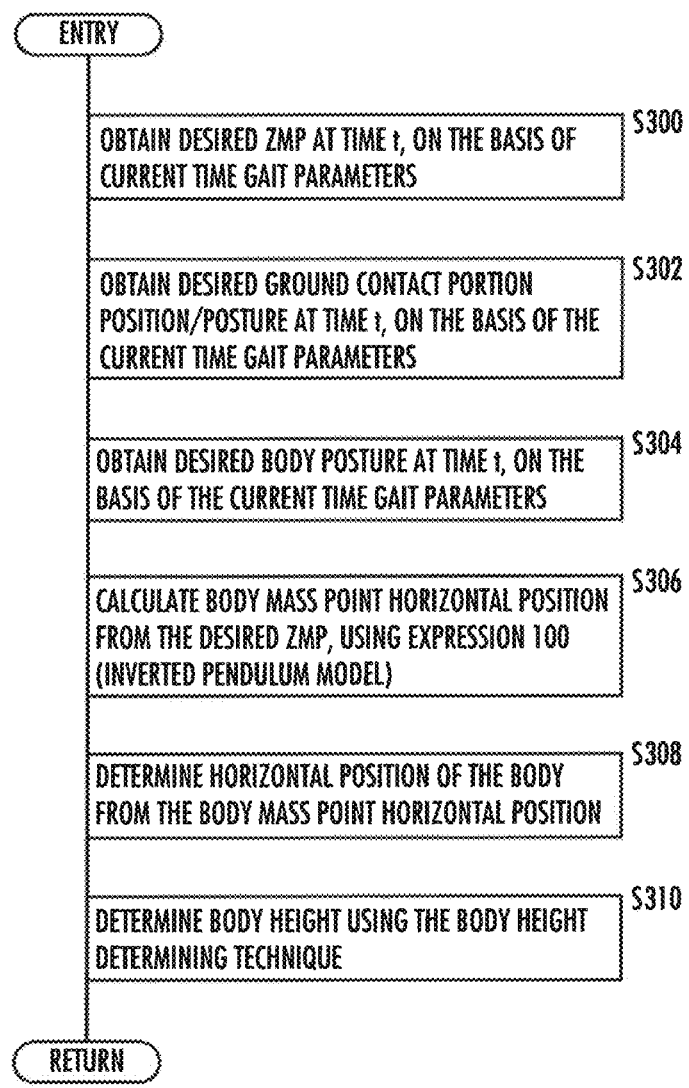
FIG. 15 is a subroutine flowchart illustrating the calculation work of instantaneous values of the current time gait in the flowchart in FIG. 10.

FIG. 15 is a subroutine flowchart illustrating this processing.

Explaining this, in S300, a desired ZMP at time t is obtained on the basis of the current time gait parameters. Then, in S302, desired ground contact portion position/posture at the time t are obtained on the basis of the current time gait parameters. Then, in S304, desired body position/posture at the time t are obtained on the basis of the current time gait parameters.

The process then proceeds to S306, where a body mass point horizontal position is calculated from the desired ZMP by using the expression 100. Then, in S308, a horizontal position of the body is determined from the body mass point horizontal position.

The process then proceeds to S310, where the body height is determined by using the body height determination technique proposed earlier by the present applicant in Japanese Patent Application Laid-Open No. 10-86080.

Returning to the explanation of the flowchart in FIG. 10, the process then proceeds to 5032, where Δt is added to the time t. The process then returns to S014, and the above-described processing is repeated.

The operations of the gait generation system according to this embodiment will further be described with reference to FIG. 3. In the gait generation system 100, a desired gait is generated as described above. Of the gait parameters of the generated desired gait, the desired body position/posture (trajectory) are directly sent to a robot geometric model (inverse kinematics calculation section) 102.

Further, the remaining parameters including the desired ground contact portion position/posture (trajectory), the desired total floor reaction force central point (i.e. the desired ZMP) trajectory, and the desired total floor reaction force (trajectory) are directly sent to a composite-compliance operation determination section 104 and also sent to a desired floor reaction force distributor 106. In the desired floor reaction force distributor 106, the floor reaction force is distributed to the respective ground contact portions, and a desired each ground contact portion floor reaction force central point and a desired each ground contact portion floor reaction force are determined and sent to the composite-compliance operation determination section 104.

From the composite-compliance operation determination section 104, corrected desired ground contact portion position/posture (trajectory) with deformation compensation are sent to the robot geometric model 102. On receipt of the desired body position/posture (trajectory) and the corrected desired ground contact portion position/posture (trajectory) with deformation compensation, the robot geometric model 102 calculates joint displacement commands (values) for the 27 joints (10R (L) etc.) to satisfy them, and sends the commands to a displacement controller 108. The displacement controller 108 uses the joint displacement commands (values) calculated in the robot geometric model 102, as desired values, to perform follow-up control of the displacements of the 27 joints of the robot 1.

The floor reaction force thus generated in the robot 1 is detected by an actual each ground contact portion floor reaction force detector 110 (six-axis force sensors 41a, 41b). The detected values are sent to the composite-compliance operation determination section 104. Further, posture inclination deviations θerrx, θerry generated in the robot 1 are detected by the inclination sensor 40, and the detected values are sent to a posture stabilization control calculation section 112. In the posture stabilization control calculation section 112, a compensating total floor reaction force moment about a desired total floor reaction force central point, for restoring the posture inclination, is calculated and sent to the composite-compliance operation determination section 104. The composite-compliance operation determination section 104 corrects the desired value(s) on the basis of the input value.

It should be noted that the gist of the present invention resides in generation of robot gaits in the gait generation system 100. The configurations and operations of the above-described composite-compliance operation determination section 104 and other components are described in detail in, for example, Japanese Patent Application Laid-Open No.

10-277969 filed earlier by the present applicant. Thus, no further description will be made here.

(Outline of Quadruped Walking)

Processing for generating a desired gait in quadruped walking of the robot 1 performed by the gait generation system 100 will be described below, on the premise of the desired gait generating processing described above.

Figure 16:
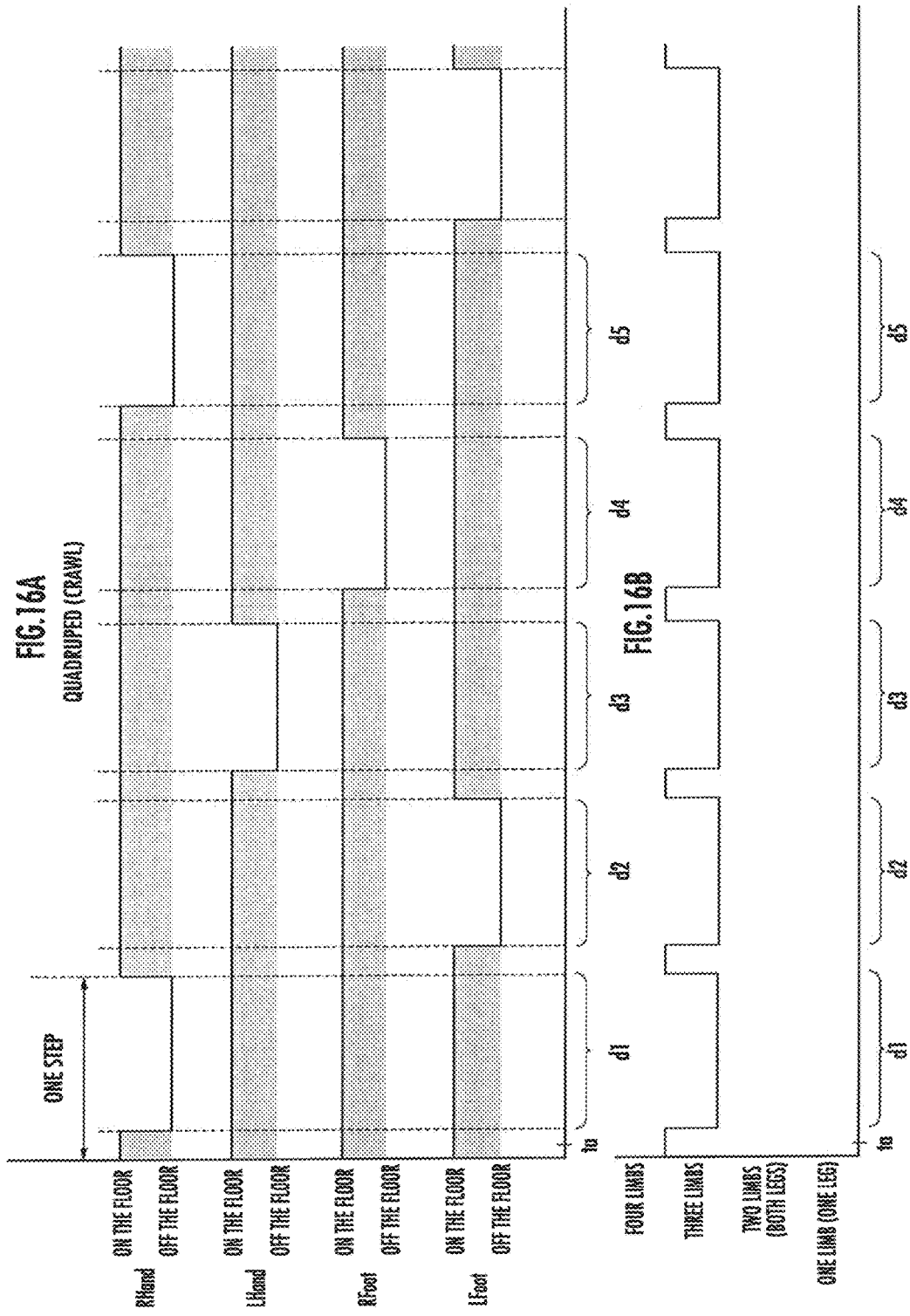
FIG. 16A is a graph showing time-series changes of the on-the-floor or off-the-floor state of each limb in the crawl gait.
FIG. 16B is a graph showing time-series changes of the number of limbs in contact with the floor in the crawl gait.

Crawl walking of the robot 1 will be described with reference to FIGS. 7 and 16. FIG. 16A is a graph showing the on-the-floor or off-the-floor state of each limb in the crawl walking, with the vertical axis representing the on-the-floor state and the off-the-floor state of the limbs (right upper limb, left upper limb, right lower limb, and left lower limb) and the horizontal axis representing time, and FIG. 16B is a graph showing the corresponding changes of the number of limbs in contact with the floor in the crawl walking. At time $t=t_a$, the robot 1 is in the state of being supported by four limbs (four-limb supporting period; the state where the four limbs are all on the floor). From this state, the robot 1 lifts the right upper limb 3R to enter the state of being supported by the remaining three limbs (three-limb supporting period; the state where three out of the four limbs are on the floor) (see the period d1 in FIGS. 16A and 16B, and t8' in FIG. 7H), and then moves the right upper limb 3R to a prescribed position where it is landed on the floor. Thereafter, the robot 1 lifts one limb and then lands it on the floor, likewise the right upper limb 3R, in order of the left lower limb 2L (see the period d2 in FIGS. 16A and 16B, and t8" in FIG. 7I), the left upper limb 3L (see the period d3 in FIGS. 16A and 16B, and t9' in FIG. 7J), and the right lower limb 2R (see the period d4 in FIGS. 16A and 16B, and t9" in FIG. 7K), with the four-limb supporting period inserted each time. After completion of lifting and landing the right lower limb 2R, the robot 1 performs lifting and landing the right upper limb 3R again (see the period d5 and on in FIGS. 16A and 16B).

In the first embodiment, the gait generation system 100 recognizes a period, in the crawl gait, from the starting point of a four-limb supporting period to the ending point of a three-limb supporting period that follows the four-limb supporting period and in which one limb is lifted and the remaining three limbs support the robot, as a gait of one step, and generates a desired gait in accordance with the above-described gait generating processing.

Figure 17:
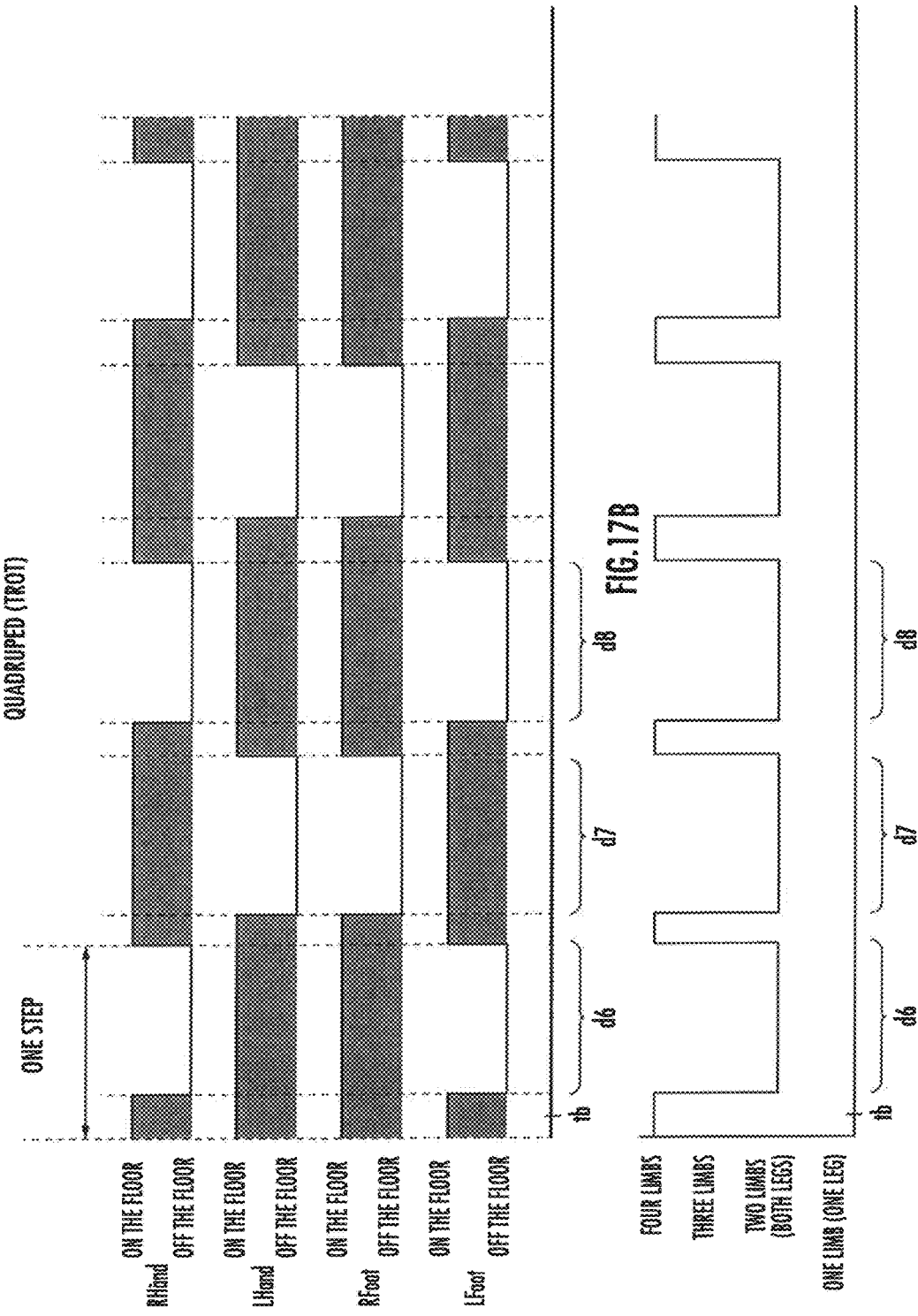
FIG. 17A is a graph showing time-series changes of the on-the-floor or off-the-floor state of each limb in the trot gait.
FIG. 17B is a graph showing time-series changes of the number of limbs in contact with the floor in the trot gait.

Trot walking of the robot 1 will be described with reference to FIGS. 4 and 17. FIG. 17A is a graph showing the on-the-floor or off-the-floor state of each limb in the trot walking, with the vertical axis representing the on-the-floor state and the off-the-floor state of the limbs (right upper limb, left upper limb, right lower limb, and left lower limb) and the horizontal axis representing time, and FIG. 17B is a graph showing the corresponding changes of the number of limbs in contact with the floor in the trot walking. At time $t=t_b$, the robot 1 is in the state of being supported by the four limbs. From this state, the robot 1 lifts the right upper limb 3R and the left lower limb 2L to enter the state of being supported by the remaining two limbs (two-limb supporting period; the state where two out of the four limbs are on the floor) (see the period d6 in FIGS. 17A and 17B, and t8 in FIG. 4H), and then moves the right upper limb 3R and the left lower limb 2L to prescribed positions where they are landed on the floor. Then, after a four-limb supporting period, the robot 1 lifts the left upper limb 3L and the right lower limb 2R and then lands them on the floor (see the period d7 in FIGS. 17A and 17B, and t9 in FIG. 4I), likewise the right upper limb 3R and the left lower limb 2L. Thereafter, the robot 1 performs lifting and landing the right upper limb 3R and the left lower limb 2L and lifting and landing the left upper limb 3L and the right lower limb 2R repeatedly (see the period d8 and on in FIGS. 17A and 17B).

In the first embodiment, the gait generation system 100 recognizes a period, in the trot gait, from the starting point of a four-limb supporting period to the ending point of a two-limb supporting period that follows the four-limb supporting period and in which two limbs are lifted and the remaining two limbs support the robot, as a gait of one step, and generates a desired gait in accordance with the above-described gait generating processing.

While the basic flow of the desired gait generating processing is as described above, the calculating processing for provisionally determining the ZMP trajectory parameter in a current time gait (S024 in FIG. 10) differs between the crawl gait and the trot gait, which will be described below in detail.

(Outline of ZMP Trajectory Parameter Determining Processing in Quadruped Walking)

In S024 in FIG. 10, the gait generation system 100 calculates a provisional desired ZMP candidate (or, a required total floor reaction force central point position) Pzmp in a two-limb supporting period or a three-limb supporting period in the quadruped walking, as a basis for provisional determination of the ZMP trajectory parameter, by the following expression 200.

$$Pzmp(i)=SP(i)+\alpha(i)*(EP(i)-SP(i)) \quad \text{Expression 200}$$

It is noted that SP(i) (first total floor reaction force center reference position) is a point on the floor surface, represented by the supporting limb coordinate system of the current time gait, which point is determined on the basis of the current time's supporting polygon and the next time's supporting polygon. For example, one point included in the region which extends with reference to the center of the overlapping region between the current time's supporting polygon and the next time's supporting polygon may be adopted as SP(i).

The center of the overlapping region may be the center of gravity of the overlapping region, or in the case where the overlapping region is longitudinally long and can be regarded as a line segment, it may be the midpoint of the line segment.

As the region which extends with reference to the center of the overlapping region, a range determined by an inscribed circle in the overlapping region (to be more specific, the largest one of the circles completely contained in the overlapping region) with its center corresponding to the center of the overlapping region may be adopted.

Further, EP(i) (second total floor reaction force center reference position) is a point on the floor surface, represented by the supporting limb coordinate system of the current time gait, which point is included in a region which extends with reference to a point of intersection between a free limb line and a supporting limb line. Here, the free limb line refers to a line that connects the floor-leaving or floor-landing position of a free limb (if there are two or more free limbs, one free limb is determined in priority order of right upper limb→left upper limb→right lower limb) and the position of the limb arranged diagonal to the free limb. The supporting limb line refers to a line that connects the positions of the remaining two supporting limbs.

As the region which extends with reference to the point of intersection, a region determined by an inscribed circle in the overlapping region (to be more specific, the largest one of the circles completely included in the overlapping region) with its center corresponding to the point of intersection may be adopted.

α(i) is a parameter of 0≤α(i)<1 which changes the weights of the margin at present and stability in the future, in accordance with acceleration/deceleration, and is defined, for example, by the following expression 202. Alternatively, α(i) may be a constant (of 0.5, for example).

$$\alpha(i) = \frac{Xswg[i]}{Xswg[i+1] + Xswg[i]} \quad \text{Expression 202}$$

It is noted that Xswg[i] represents the length of stride (movement amount) of the current time's free limb (if there are two or more free limbs, one free limb is determined in priority order of right upper limb→left upper limb→right lower limb), and Xswg[i+1] represents the length of stride (movement amount) of the next time's free limb.

As the movement amount of the next time's free limb relative to the movement amount of the current time's free limb is larger, the denominator of the expression 202 becomes larger, so α decreases. As a result, the provisional desired ZMP candidate Pzmp(i) is determined, by the expression 200, to approach SP(i).

On the other hand, as the movement amount of the next time's free limb relative to the movement amount of the current time's free limb is smaller, the denominator of the expression 202 becomes smaller, so α increases. As a result, the provisional desired ZMP candidate Pzmp(i) is determined, by the expression 200, to approach EP(i).

The provisional desired ZMP candidate Pzmp(i) becomes located on the line segment SP(i)-EP(i).

Of the provisional desired ZMP candidates determined in this manner, the provisional desired ZMP candidate of the current time gait (provisional desired ZMP) is corrected in S030 in FIG. 10, as explained previously.

(Specific Example of Processing of Determining Provisional Desired ZMP Candidate in Crawl Gait)

A specific example of processing of determining a provisional desired ZMP candidate in the crawl gait will now be described with reference to FIGS. 16 and 18 to 21. In the crawl gait, SP is defined as a point within a region which extends with reference to the center of an overlapping region between the supporting polygon in the current time's three-limb supporting period and the supporting polygon in the next time's three-limb supporting period. Further, the free limb line in the crawl gait in the first embodiment is defined as a line which connects a planned landing position of a free limb and the landing position of the limb arranged diagonal to the free limb. Alternatively, the free limb line in the crawl gait may be defined as a line which connects a floor-leaving position of the free limb and the landing position of the limb arranged diagonal to the free limb.

First, a description will be made about the processing of determining a provisional desired ZMP candidate in the case where the period d1 (i=1) shown in FIGS. 16A and 16B corresponds to the current time's three-limb supporting period.

The gait generation system 100 obtains a provisional desired ZMP candidate Pzmp(1) by the expression 200 in the following manner.

First, the gait generation system 100 obtains a region enclosing the landing position of each of the supporting limbs (other than the free limb) 3L, 2L, and 2R in the current time's three-limb supporting period (period d1), as a supporting polygon Sd1 in the current time's three-limb supporting period.

The gait generation system 100 then obtains a region enclosing the landing position or planned landing position of each of the supporting limbs 3R, 3L, and 2R in the next time's three-limb supporting period (period d2), as a supporting polygon Sd2 in the next time's three-limb supporting period.

The gait generation system 100 obtains an overlapping region DR1 between the current time's supporting polygon Sd1 and the next time's supporting polygon Sd2.

The gait generation system 100 then obtains a free limb line L1 by a line connecting the planned landing position of the free limb 3R in the current time's three-limb supporting period and the landing position of the limb 2L arranged diagonal to the free limb (more specifically, the line connecting a point determined within the planned landing position of the free limb 3R (for example, the central point within the planned landing position of 3R or the midpoint of the lower side thereof) and a point determined within the landing position of the limb 2L (for example, the central point within the landing position of 2L or the midpoint of the upper side thereof) in FIG. 18A).

Further, the gait generation system 100 obtains a supporting limb line L2 by a line connecting the remaining two limbs 3L and 2R (more specifically, the line connecting a point determined within the landing position of the limb 3L and a point determined within the landing position of the limb 2R in FIG. 18A).

The gait generation system 100 obtains a region (inscribed circle in DR1) SC1 which extends, inside the overlapping region DR1, with reference to the midpoint of the supporting limb line L2 corresponding to the center of the overlapping region DR1.

The gait generation system 100 obtains a region EC1 which extends, inside the overlapping region DR1, with reference to the point of intersection between the free limb line L1 and the supporting limb line L2.

The gait generation system 100 obtains a point included in the region SC1 (in the present embodiment, the midpoint of the supporting limb line L2) as a point SP(1).

Figure 18:
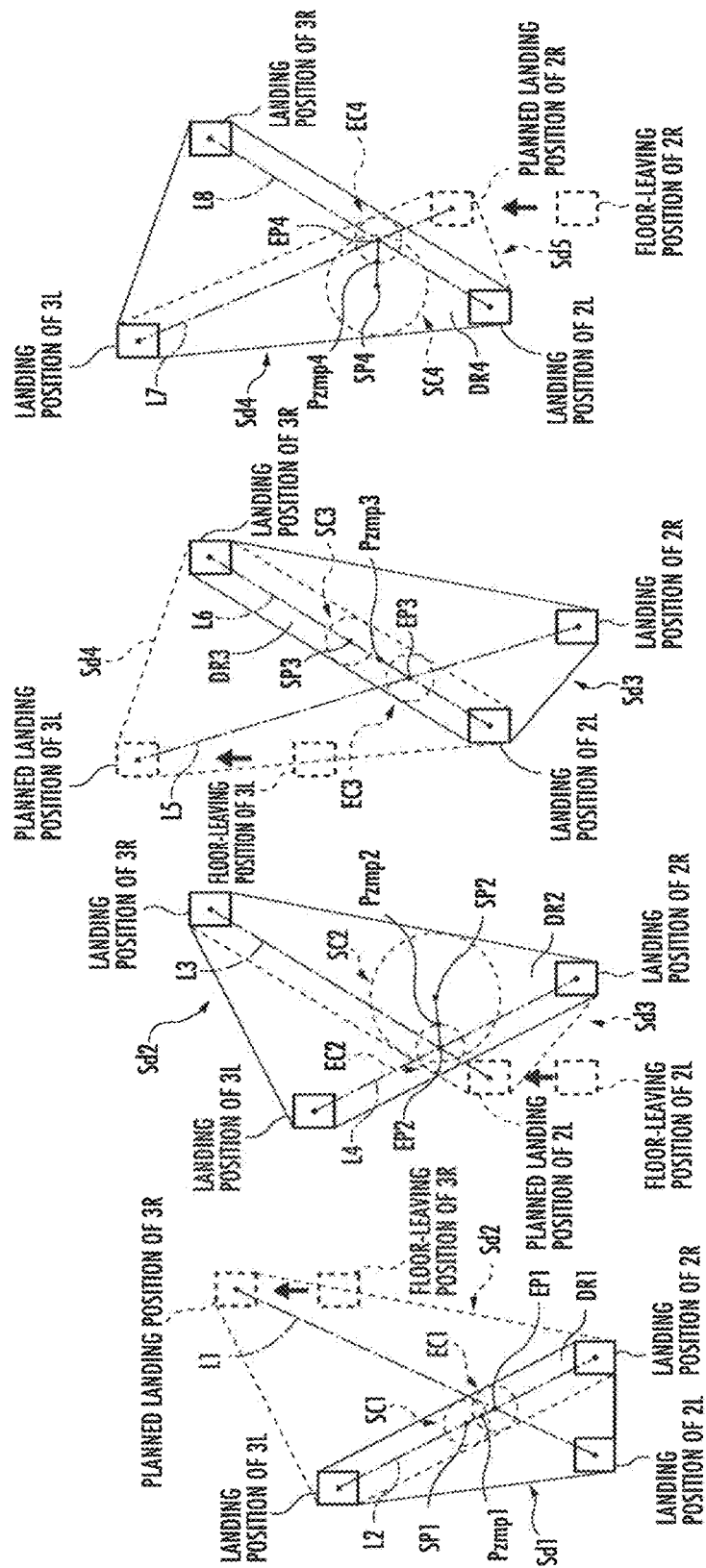
FIG. 18A illustrates processing of calculating a provisional desired ZMP in the crawl gait in the case where the right upper limb is a free limb.
FIG. 18B illustrates processing of calculating a provisional desired ZMP in the crawl gait in the case where the left lower limb is a free limb.
FIG. 18C illustrates processing of calculating a provisional desired ZMP in the crawl gait in the case where the left upper limb is a free limb.
FIG. 18D illustrates processing of calculating a provisional desired ZMP in the crawl gait in the case where the right lower limb is a free limb.

It should be noted that, in FIG. 18 as well as in FIGS. 20 and 22 (described later), SP(1), EP(1), and Pzmp(1) are simply indicated as SP1, EP1, and Pzmp1, respectively.

Further, the gait generation system 100 obtains a point included in the region EC1 (in the present embodiment, the point of intersection between the free limb line L1 and the supporting limb line L2) as a point EP(1).

The gait generation system 100 uses the above expression 200 to weight the two points SP(1) and EP(1) by α(1) to obtain a point as a provisional desired ZMP candidate Pzmp(1), and sets the same as a provisional desired ZMP.

It should be noted that, in FIGS. 18A to 18D, Pzmp(i) is indicated assuming that α(i)=0.5.

Thereafter, the gait generation system 100 makes a transition, via a four-limb supporting period, to the period d2 shown in FIGS. 16A and 16B. In this four-limb supporting period, the gait generation system 100 moves the provisional desired ZMP from the position of Pzmp(1) to the position of Pzmp(2) (described later), as shown in FIGS. 21A and 21B. It should be noted that, in FIGS. 21A and 21B as well as in FIGS. 23A and 23B (described later), the value of X of Pzmp(i) is represented as Pzmp(i)x, and the value of Y of Pzmp(i) is represented as Pzmp(i)y.

A description will now be made about the processing of determining a provisional desired ZMP candidate in the case where the period d2 (i=2) shown in FIGS. 16A and 16B corresponds to the current time's three-limb supporting period.

The gait generation system 100 obtains a provisional desired ZMP candidate Pzmp(2) by the expression 200 in the following manner.

First, the gait generation system 100 obtains a region enclosing the landing position of each of the supporting limbs 3R, 3L, and 2R in the current time's three-limb supporting period (period d2), as a supporting polygon Sd2 in the current time's three-limb supporting period.

The gait generation system 100 then obtains a region enclosing the landing position or planned landing position of each of the supporting limbs 3R, 2L, and 2R in the next time's three-limb supporting period (period d3), as a supporting polygon Sd3 in the next time's three-limb supporting period.

The gait generation system 100 obtains an overlapping region DR2 between the current time's supporting polygon Sd2 and the next time's supporting polygon Sd3.

The gait generation system 100 then obtains a free limb line L3 by a line connecting the planned landing position of the free limb 2L in the current time's three-limb supporting period and the landing position of the limb 3R arranged diagonal to the free limb (more specifically, the line connecting a point determined within the planned landing position of the free limb 2L and a point determined within the landing position of the limb 3R in FIG. 18B).

Further, the gait generation system 100 obtains a supporting limb line L4 by a line connecting the remaining two limbs 3L and 2R (more specifically, the line connecting a point determined within the landing position of the limb 3L and a point determined within the landing position of the limb 2R in FIG. 18B).

The gait generation system 100 obtains a region (inscribed circle in DR2) SC2 which extends, inside the overlapping region DR2, with reference to the center of gravity of the overlapping region DR2 corresponding to the center of the overlapping region DR2.

The gait generation system 100 obtains a region EC2 which extends, inside the overlapping region DR2, with reference to the point of intersection between the free limb line L3 and the supporting limb line L4.

The gait generation system 100 obtains a point included in the region SC2 (in the present embodiment, the center of gravity of the overlapping region DR2) as a point SP(2).

Further, the gait generation system 100 obtains a point included in the region EC2 (in the present embodiment, the point of intersection between the free limb line L3 and the supporting limb line L4) as a point EP(2).

The gait generation system 100 uses the above expression 200 to weight the two points SP(2) and EP(2) by α(2) to obtain a point as a provisional desired ZMP candidate Pzmp(2), and sets the same as a provisional desired ZMP.

Thereafter, the system makes a transition, via a four-limb supporting period, to the period d3 shown in FIGS. 16A and 16B. In this four-limb supporting period, the gait generation system 100 moves the provisional desired ZMP from the position of Pzmp(2) to the position of Pzmp(3) (described later), as shown in FIGS. 21A and 21B.

A description will now be made about the processing of determining a provisional desired ZMP candidate in the case where the period d3 (i=3) shown in FIGS. 16A and 16B corresponds to the current time's three-limb supporting period.

The gait generation system 100 obtains a provisional desired ZMP candidate Pzmp(3) by the expression 200 in the following manner.

First, the gait generation system 100 obtains a region enclosing the landing position of each of the supporting limbs 3R, 2L, and 2R in the current time's three-limb supporting period (period d3), as a supporting polygon Sd3 in the current time's three-limb supporting period.

The gait generation system 100 then obtains a region enclosing the landing position or planned landing position of each of the supporting limbs 3R, 3L, and 2L in the next time's three-limb supporting period (period d4), as a supporting polygon Sd4 in the next time's three-limb supporting period.

The gait generation system 100 obtains an overlapping region DR3 between the current time's supporting polygon Sd3 and the next time's supporting polygon Sd4.

The gait generation system 100 then obtains a free limb line L5 by a line connecting the planned landing position of the free limb 3L in the current time's three-limb supporting period and the landing position of the limb 2R arranged diagonal to the free limb (more specifically, the line connecting a point determined within the planned landing position of the free limb 3L and a point determined within the landing position of the limb 2R in FIG. 18C).

Further, the gait generation system 100 obtains a supporting limb line L6 by a line connecting the remaining two limbs 3R and 2L (more specifically, the line connecting a point determined within the landing position of the limb 3R and a point determined within the landing position of the limb 2L in FIG. 18C).

The gait generation system 100 obtains a region (inscribed circle in DR3) SC3 which extends, inside the overlapping region DR3, with reference to the midpoint of the supporting limb line L6 corresponding to the center of the overlapping region DR3.

The gait generation system 100 obtains a region EC3 which extends, inside the overlapping region DR3, with reference to the point of intersection between the free limb line L5 and the supporting limb line L6.

The gait generation system 100 obtains a point included in the region SC3 (in the present embodiment, the midpoint of the supporting limb line L6) as a point SP(3).

Further, the gait generation system 100 obtains a point included in the region EC3 (in the present embodiment, the point of intersection between the free limb line L5 and the supporting limb line L6) as a point EP(3).

The gait generation system 100 uses the above expression 200 to weight the two points SP(3) and EP(3) by α(3) to obtain a point as a provisional desired ZMP candidate Pzmp(3), and sets the same as a provisional desired ZMP.

Thereafter, the system makes a transition, via a four-limb supporting period, to the period d4 shown in FIGS. 16A and 16B. In this four-limb supporting period, the gait generation system 100 moves the provisional desired ZMP from the position of Pzmp(3) to the position of Pzmp(4) (described later), as shown in FIGS. 21A and 21B.

A description will now be made about the processing of determining a provisional desired ZMP candidate in the case where the period d4 (i=4) shown in FIGS. 16A and 16B corresponds to the current time's three-limb supporting period.

The gait generation system 100 obtains a provisional desired ZMP candidate Pzmp(4) by the expression 200 in the following manner.

First, the gait generation system 100 obtains a region enclosing the landing position of each of the supporting limbs 3R, 3L, and 2L in the current time's three-limb supporting period (period d4), as a supporting polygon Sd4 in the current time's three-limb supporting period.

The gait generation system 100 then obtains a region enclosing the landing position or planned landing position of each of the supporting limbs 3L, 2L, and 2R in the next time's three-limb supporting period (period d5), as a supporting polygon Sd5 in the next time's three-limb supporting period.

The gait generation system 100 obtains an overlapping region DR4 between the current time's supporting polygon Sd4 and the next time's supporting polygon Sd5.

The gait generation system 100 then obtains a free limb line L7 by a line connecting the planned landing position of the free limb 2R in the current time's three-limb supporting period and the landing position of the limb 3L arranged diagonal to the free limb (more specifically, the line connecting a point determined within the planned landing position of the free limb 2R and a point determined within the landing position of the limb 3L in FIG. 18D).

Further, the gait generation system 100 obtains a supporting limb line L8 by a line connecting the remaining two limbs 3R and 2L (more specifically, the line connecting a point determined within the landing position of the limb 3R and a point determined within the landing position of the limb 2L in FIG. 18D).

The gait generation system 100 obtains a region (inscribed circle in DR4) SC4 which extends, inside the overlapping region DR4, with reference to the center of gravity of the overlapping region DR4 corresponding to the center of the overlapping region DR4.

The gait generation system 100 obtains a region EC4 which extends, inside the overlapping region DR4, with reference to the point of intersection between the free limb line L7 and the supporting limb line L8.

The gait generation system 100 obtains a point included in the region SC4 (in the present embodiment, the center of gravity of the overlapping region DR4) as a point SP(4).

Further, the gait generation system 100 obtains a point included in the region EC4 (in the present embodiment, the point of intersection between the free limb line L7 and the supporting limb line L8) as a point EP(4).

The gait generation system 100 uses the above expression 200 to weight the two points SP(4) and EP(4) by $\alpha(4)$ to obtain a point as a provisional desired ZMP candidate Pzmp(4), and sets the same as a provisional desired ZMP.

Thereafter, the system makes a transition, via a four-limb supporting period, to the period d5 shown in FIGS. 16A and 16B. In this four-limb supporting period, the gait generation system 100 moves the provisional desired ZMP from the position of Pzmp(4) to the position of a next provisional desired ZMP.

Figure 19:
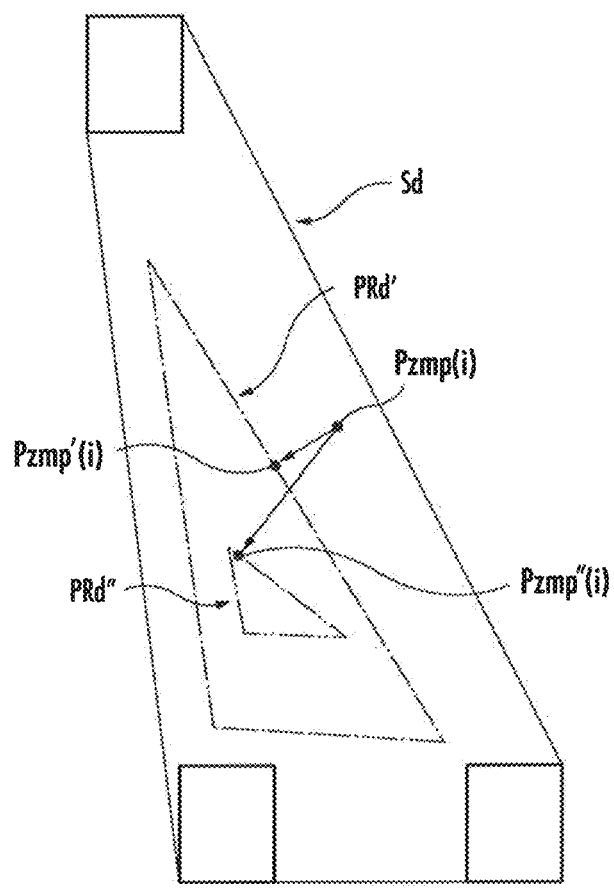
FIG. 19 illustrates a ZMP permissible region and correction of a provisional desired ZMP candidate.

Further, the gait generation system 100 obtains a ZMP permissible region PRd on the basis of the current time's supporting polygon Sd. The ZMP permissible region PRd is defined within the current time's supporting polygon Sd, as a region smaller than the current time's supporting polygon Sd, as shown in FIG. 19, for example. In other words, the ZMP permissible region PRd is set, within the current time's supporting polygon Sd, as a region having a high stability allowance (margin).

It is preferable that the gait generation system 100 sets the size of the ZMP permissible region PRd in accordance with the stability in walking of the robot in the walking environment.

More specifically, it is preferable that the gait generation system 100 sets the ZMP permissible region such that, in the case where the walking environment ensures stable walking of the robot, as in the case of a flat ground, the ZMP permissible region becomes relatively large (see PRd' in FIG. 19), whereas in the case where the walking environment makes it difficult for the robot to walk stably, as in the case of an uneven ground, the ZMP permissible region becomes relatively small (see PRd" in FIG. 19).

Then, in the case where the provisional desired ZMP candidate Pzmp(i) does not fall within the ZMP permissible region PRd, the gait generation system 100 corrects the provisional desired ZMP candidate Pzmp(i) by shifting it to a point on the boundary line of the ZMP permissible region PRd at a shortest distance from the provisional desired ZMP candidate Pzmp(i) (for example, in FIG. 19, to Pzmp'(i) for PRd', and to Pzmp"(i) for PRd"), and determines the resultant point as a provisional desired ZMP.

In the case where the provisional desired ZMP candidate Pzmp(i) falls within the ZMP permissible region PRd, the gait generation system 100 determines the provisional desired ZMP candidate Pzmp(i), as it is, as a provisional desired ZMP.

The position after correction is not limited to the point on the boundary line of the ZMP permissible region PRd at the shortest distance. It may be any position as long as it is on a portion of the boundary line of the ZMP permissible region PRd facing the provisional desired ZMP candidate.

More specifically, when a half line (straight line (line segment) across the ZMP permissible region PRd) is drawn originating from the provisional desired ZMP candidate to pass through the ZMP permissible region PRd, there is one or more points of intersection between the half line and the boundary line of the ZMP permissible region PRd. Of these points of intersection, the point of intersection having the shortest distance from the provisional desired ZMP candidate is herein called the "shortest-distance intersection point". There is one shortest-distance intersection point for each half line originating from the provisional desired ZMP candidate and passing through the ZMP permissible region PRd. When such a shortest-distance intersection point is considered for every half line originating from the provisional desired ZMP candidate and passing through the ZMP permissible region PRd, a set of the shortest-distance intersection points is formed. The portion of the boundary line of the ZMP permissible region PRd facing the provisional desired ZMP candidate is a portion composed of this set of the shortest-distance intersection points.

Returning to the description of the position after correction, the point of intersection between a line segment connecting one reference position contained in the ZMP permissible region PRd with the provisional desired ZMP candidate Pzmp(i), and the boundary line of the ZMP permissible region PRd may be set as the position after correction.

As the one reference position contained in the ZMP permissible region PRd, for example, the above-described point SP(i), or the center of gravity of the ZMP permissible region PRd may be adopted.

The point SP(i) is not necessarily contained in the ZMP permissible region PRd. Therefore, the gait generation system 100 may be configured, for example, to determine whether the SP(i) is contained in the ZMP permissible region PRd, and to set the point SP(i) as the aforesaid reference position if the point SP(i) is contained in the ZMP permissible region PRd, whereas to set the center of gravity of the ZMP permissible region PRd as the aforesaid reference position if the point SP(i) is not contained in the ZMP permissible region PRd.

Further, the control unit 26 may include the "compensating total floor reaction force moment distributor which outputs a desired floor reaction force moment for compliance control" described in Japanese Patent No. 5404544. In this case, "in the ZMP permissible region PRd, the position of the total floor reaction force central point defined by the desired floor reaction force moment for compliance control (desired value of the controlled external force element) which is determined assuming that the external force manipulated variable (compensating total floor reaction force moment about the desired ZMP) of the actual robot is "0"" may be adopted as the aforesaid reference position.

It should be noted that the correction of the provisional desired ZMP candidate Pzmp(i) by shifting it to a point on the boundary line of the ZMP permissible region PRd is similarly applicable to trot walking, which will be described later.

(Trajectory of Provisional Desired ZMP Candidates in Crawl Gait)

FIG. 20A shows a trajectory of the provisional desired ZMP candidates, generated in the above-described manner, at the time of walking straight. In the figure, LS1 to LS4 indicate the initial positions of the right upper limb 3R, the left lower limb 2L, the left upper limb 3L, and the right lower limb 2R, respectively, CS1 to CS10 indicate the landing positions of the corresponding free limbs in the crawl gait, and Pzmp1 to Pzmp10 indicate the generated provisional desired ZMP candidates. It should be noted that the lower numbers of the landing positions CS1 to CS10 as well as Pzmp1 to Pzmp10 correspond to the time points closer to the initial state.

Figure 27:
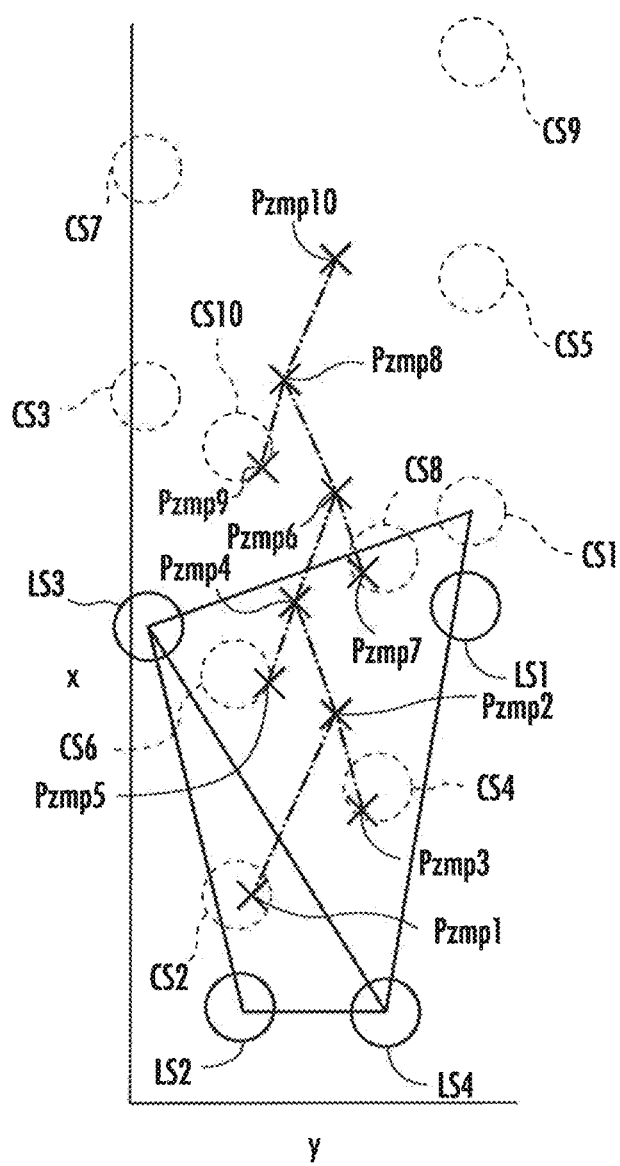
FIG. 27 illustrates a trajectory of provisional desired ZMPs in the crawl gait, in the case where the center of gravity of the current time's supporting polygon is set as a required total floor reaction force central point position.

FIG. 27 shows a trajectory of provisional desired ZMPs at the time of walking straight, obtained in the case where each provisional desired ZMP candidate is set to a statically stable point (point corresponding to the center of gravity of the current time's supporting polygon at the corresponding time point). In FIG. 27, LS1 to LS4 indicate the initial positions of the right upper limb 3R, the left lower limb 2L, the left upper limb 3L, and the right lower limb 2R, respectively, CS1 to CS10 indicate the floor-landing points of the corresponding free limbs in the crawl gait, and Pzmp1 to Pzmp10 indicate the generated provisional desired ZMPs.

The trajectory of the provisional desired ZMP candidates in FIG. 20A is stable, with only slight lateral swaying, as compared to that in FIG. 27. As a result, the amount of correction of ZMP in S030 in FIG. 10 becomes small, and stable walking becomes possible.

FIG. 20B shows a trajectory of provisional desired ZMP candidates in the case of turning to the left. As seen from the figure, in the case of turning to the left as well, the trajectory of the provisional desired ZMP candidates is stable, with only slight lateral swaying.

A description will be made, with reference to FIGS. 21A and 21B, about the amount of correction, in S030 in FIG. 10, of the provisional desired ZMP, which has been determined from the provisional desired ZMP candidate determined in the above-described processing of determining the provisional desired ZMP candidate. FIGS. 21A and 21B are graphs showing the temporal changes of the provisional desired ZMP (one-dot chain line), the corrected desired ZMP (two-dot chain line), and the center of gravity (solid line) of the robot 1 in crawl gait. In FIG. 21A, the vertical axis represents the position in the X-axis direction, and the horizontal axis represents time. In FIG. 21B, the vertical axis represents the position in the Y-axis direction, and the horizontal axis represents time. As seen from FIGS. 21A and 21B, while the provisional desired ZMP and the corrected desired ZMP differ from each other immediately after the start of movement (from time t=tc to time t=td), at time t=td and on, the provisional desired ZMP and the corrected desired ZMP are identical to each other. The total amount of correction of the provisional desired ZMP immediately after the start of movement (from time t=tc to time t=td) is considerably small, which is about 10% of the size of the ground contact portions 16R, 16L. This enables stable walking of the robot 1.

(Specific Example of Processing of Determining Provisional Desired ZMP Candidate in Trot Gait)

A specific example of processing of determining a provisional desired ZMP candidate in the trot gait will now be described with reference to FIGS. 17 and 22. In the trot gait, SP is defined as a point within a region which extends with reference to the center of an overlapping region between the supporting polygon in the current time's two-limb supporting period and the supporting polygon in the next time's two-limb supporting period. In the present embodiment, SP is defined as the point of intersection between a supporting limb line and a free limb line.

In the first embodiment, the free limb line is defined as a line which connects a floor-leaving position of a free limb and a floor-leaving position of the limb arranged diagonal to the free limb. Alternatively, the free limb line in the trot gait may be defined as a line which connects a planned floor-landing position of a free limb and a planned floor-landing position of the limb arranged diagonal to the free limb.

First, a description will be made about the processing of determining a provisional desired ZMP candidate in the case where the period d6 (i=6) shown in FIGS. 17A and 17B corresponds to the current time's two-limb supporting period.

The gait generation system 100 obtains a provisional desired ZMP candidate Pzmp(6) by the expression 200 in the following manner.

First, the gait generation system 100 obtains a region enclosing the landing position of each of the supporting limbs 3L and 2R in the current time's two-limb supporting period (period d6), as a supporting polygon Sd6 in the current time's two-limb supporting period.

The gait generation system 100 then obtains a region enclosing the planned landing position of each of the supporting limbs 3R and 2L in the next time's two-limb supporting period (period d7), as a supporting polygon Sd7 in the next time's two-limb supporting period.

The gait generation system 100 obtains an overlapping region DR6 between the current time's supporting polygon Sd6 and the next time's supporting polygon Sd7.

Figure 22A:
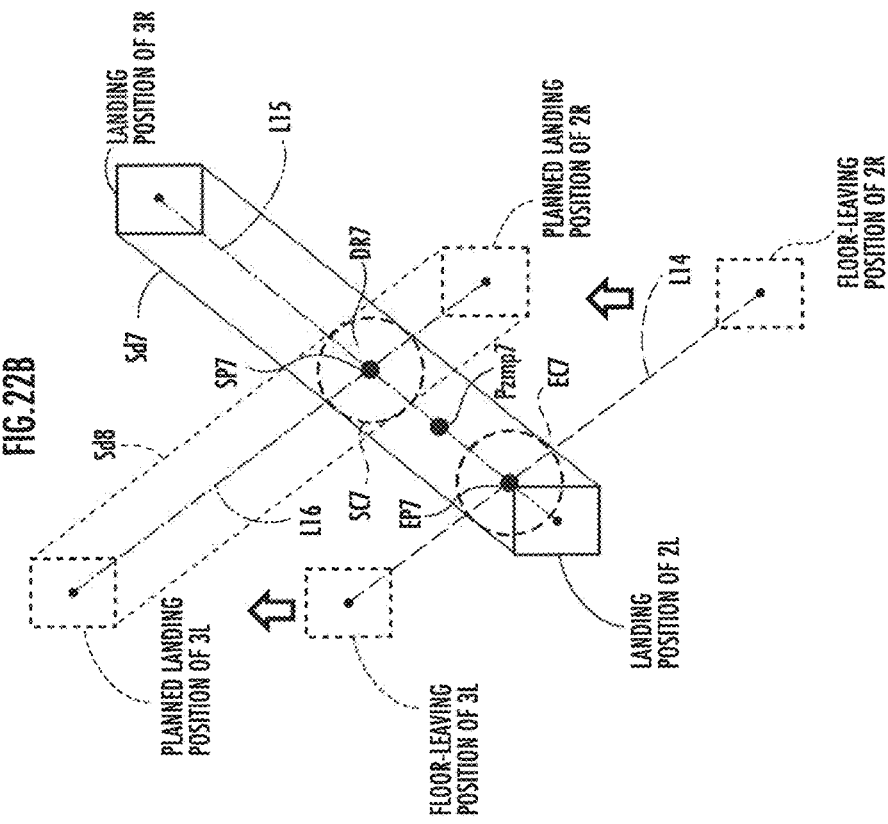
FIG. 22A illustrates processing of calculating a provisional desired ZMP in the trot gait in the case where the right upper limb and left lower limb are free limbs.

The gait generation system 100 then obtains a first free limb line L11 by a line connecting the floor-leaving positions of the free limbs 3R and 2L in the current time's two-limb supporting period (more specifically, the line connecting a point determined within the floor-leaving position of the free limb 3R and a point determined within the floor-leaving position of the free limb 2L in FIG. 22A).

Further, the gait generation system 100 obtains a supporting limb line L12 by a line connecting the remaining two limbs 3L and 2R (more specifically, the line connecting a point determined within the landing position of the limb 3L and a point determined within the landing position of the limb 2R in FIG. 22A).

The gait generation system 100 also obtains a second free limb line L13 by a line connecting the planned floor-landing positions of the free limbs 3R and 2L in the current time's two-limb supporting period (more specifically, the line connecting a point determined within the planned floor-landing position of the free limb 3R and a point determined within the planned floor-landing position of the free limb 2L in FIG. 22A).

The gait generation system 100 obtains a region (inscribed circle in DR6) SC6 which extends, inside the overlapping region DR6, with reference to the point of intersection between the supporting limb line L12 and the second free limb line L13 corresponding to the center of the overlapping region DR6.

The gait generation system 100 obtains a region EC6 which extends, inside the current time's supporting polygon Sd6, with reference to the point of intersection between the first free limb line L11 and the supporting limb line L12.

The gait generation system 100 obtains a point included in the region SC6 (in the present embodiment, the point of intersection between the supporting limb line L12 and the second free limb line L13) as a point SP(6).

Further, the gait generation system 100 obtains a point included in the region EC6 (in the present embodiment, the point of intersection between the first free limb line L11 and the supporting limb line L12) as a point EP(6).

The gait generation system 100 uses the above expression 200 to weight the two points SP(6) and EP(6) by $\alpha(6)$ to obtain a point as a provisional desired ZMP candidate Pzmp(6), and sets the same as a provisional desired ZMP.

Thereafter, the system makes a transition, via a four-limb supporting period, to the period d7 shown in FIGS. 17A and 17B. In this four-limb supporting period, the gait generation system 100 moves the provisional desired ZMP from the position of Pzmp(6) to the position of Pzmp(7) (described later), as shown in FIGS. 23A and 23B.

A description will now be made about the processing of determining a provisional desired ZMP candidate in the case where the period d7 (i=7) shown in FIGS. 17A and 17B corresponds to the current time's two-limb supporting period.

The gait generation system 100 obtains a provisional desired ZMP candidate Pzmp(7) by the expression 200 in the following manner.

First, the gait generation system 100 obtains a region enclosing the landing positions of the supporting limbs 3R and 2L in the current time's two-limb supporting period (period d7), as a supporting polygon Sd7 in the current time's two-limb supporting period.

The gait generation system 100 then obtains a region enclosing the planned landing positions of the supporting limbs 3L and 2R in the next time's two-limb supporting period (period d8), as a supporting polygon Sd8 in the next time's two-limb supporting period.

The gait generation system 100 obtains an overlapping region DR7 between the current time's supporting polygon Sd7 and the next time's supporting polygon Sd8.

Figure 22B:
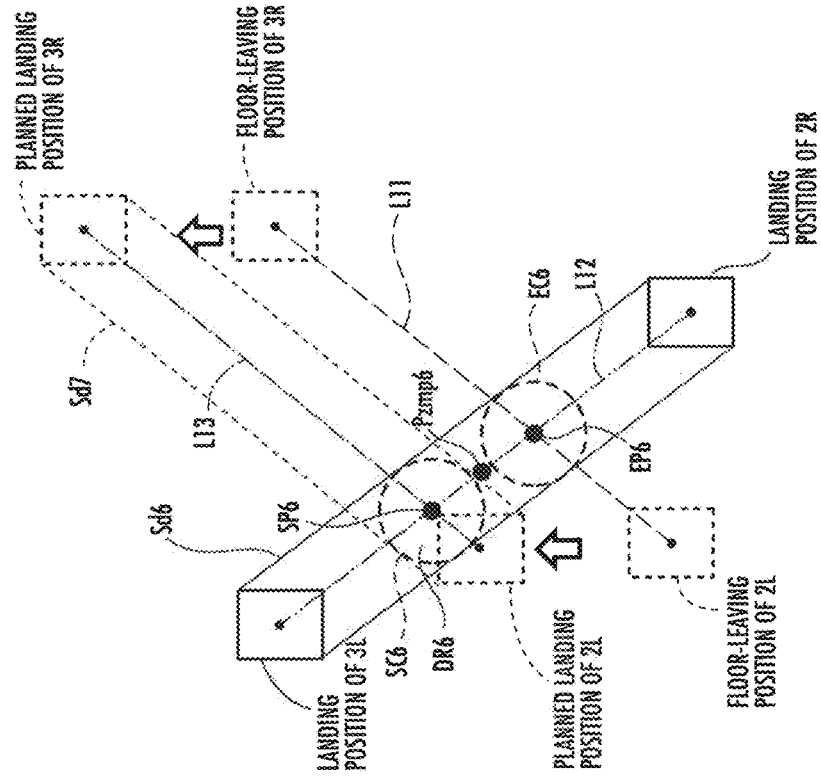
FIG. 22B illustrates processing of calculating a provisional desired ZMP in the trot gait in the case where the left upper limb and right lower limb are free limbs.

The gait generation system 100 then obtains a first free limb line L14 by a line connecting the floor-leaving positions of the free limbs 3L and 2R in the current time's two-limb supporting period (more specifically, the line connecting a point determined within the floor-leaving position of the free limb 3L and a point determined within the floor-leaving position of the free limb 2R in FIG. 22B).

Further, the gait generation system 100 obtains a supporting limb line L15 by a line connecting the remaining two limbs 3R and 2L (more specifically, the line connecting a point determined within the landing position of the limb 3R and a point determined within the landing position of the limb 2L in FIG. 22B).

The gait generation system 100 also obtains a second free limb line L16 by a line connecting the planned floor-landing positions of the free limbs 3L and 2R in the current time's two-limb supporting period (more specifically, the line connecting a point determined within the planned floor-landing position of the free limb 3L and a point determined within the planned floor-landing position of the free limb 2R in FIG. 22B).

The gait generation system 100 obtains a region (inscribed circle in DR7) SC7 which extends, inside the overlapping region DR7, with reference to the point of intersection between the supporting limb line L15 and the second free limb line L16 corresponding to the center of the overlapping region DR7.

The gait generation system 100 obtains a region EC7 which extends, inside the current time's supporting polygon Sd7, with reference to the point of intersection between the first free limb line L14 and the supporting limb line L15.

The gait generation system 100 obtains a point included in the region SC7 (in the present embodiment, the point of intersection between the supporting limb line L15 and the second free limb line L16) as a point SP(7).

Further, the gait generation system 100 obtains a point included in the region EC7 (in the present embodiment, the point of intersection between the first free limb line L14 and the supporting limb line L15) as a point EP(7).

The gait generation system 100 uses the above expression 200 to weight the two points SP(7) and EP(7) by $\alpha(7)$ to obtain a point as a provisional desired ZMP candidate Pzmp(7), and sets the same as a provisional desired ZMP.

Thereafter, the system makes a transition, via a four-limb supporting period, to the period d8 shown in FIGS. 17A and 17B. In this four-limb supporting period, the gait generation system 100 moves the provisional desired ZMP from the position of Pzmp(7) to the position of the next time's provisional desired ZMP, as shown in FIGS. 23A and 23B.

The gait generation system 100 performs correction of the provisional desired ZMP candidate, on the basis of the ZMP permissible region, in the same manner as in the crawl gait.

(Trajectory of Provisional Desired ZMP Candidates in Trot Gait)

As shown in FIGS. 22A and 22B, the trajectory of the provisional desired ZMP candidates Pzmp(6) to Pzmp(7) is stable, with only slight lateral swaying. As a result, the amount of correction of ZMP in S030 in FIG. 10 becomes small, and stable walking becomes possible.

A description will now be made, with reference to FIGS. 23A and 23B, about how the amount of correction of ZMP in S030 in FIG. 10 becomes small. FIGS. 23A and 23B are graphs showing the temporal changes of the provisional desired ZMP (one-dot chain line), the corrected desired ZMP (two-dot chain line), and the center of gravity (solid line) of the robot 1 in trot gait. In FIG. 23A, the vertical axis represents the position in the X-axis direction, and the horizontal axis represents time. In FIG. 23B, the vertical axis represents the position in the Y-axis direction, and the horizontal axis represents time. As seen from FIGS. 23A and 23B, while the provisional desired ZMP and the corrected desired ZMP differ from each other immediately after the start of movement (from time t=te to time t=tf), at time t=tf and on, the provisional desired ZMP and the corrected desired ZMP are identical to each other. The total amount of correction of the provisional desired ZMP immediately after the start of movement (from time t=te to time t=tf) is considerably small, which is about 10% of the size of the ground contact portions 16R, 16L. This enables stable walking of the robot 1.

(Biped-to-Quadruped Transition)

Figure 6A:
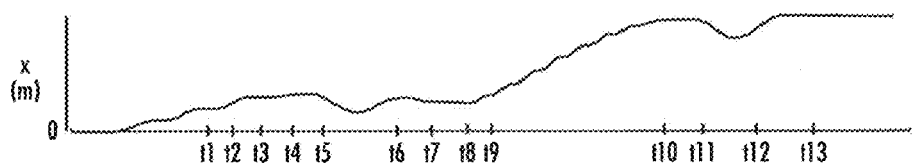
FIG. 6A shows time-series changes of a body mass point horizontal position (in X-axis direction) through the times in FIGS. 4A to 4M.
Figure 6B:
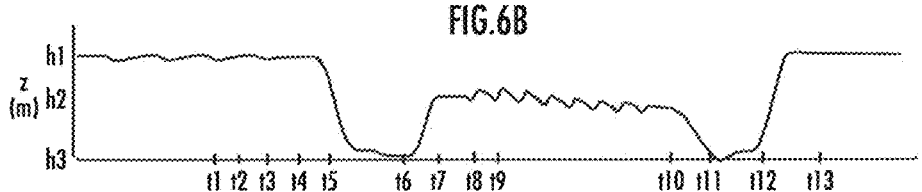
FIG. 6B shows time-series changes of a body mass point vertical position (in Z-axis direction) through the times in FIGS. 4A to 4M.
Figure 6C:
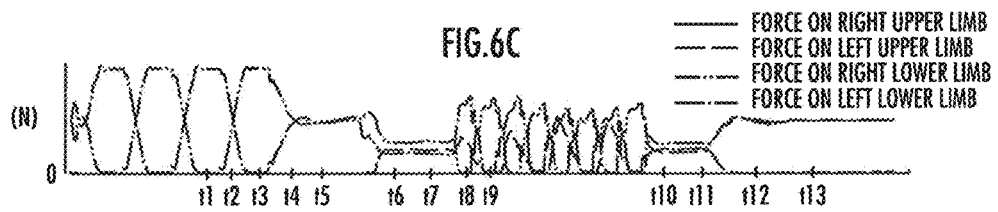
FIG. 6C shows time-series changes in magnitude of the forces acting on the respective limbs of the robot.
Figure 6D:
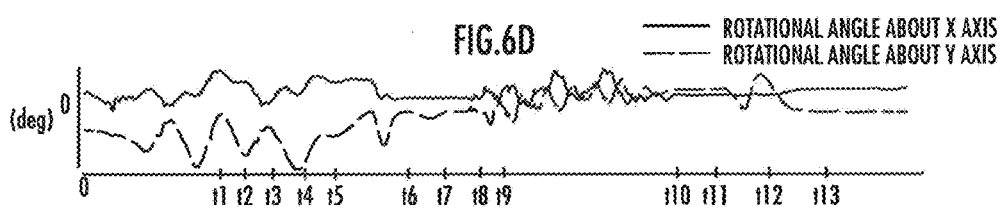
FIG. 6D shows time-series changes of the rotational angles about the X axis and about the Y axis of the robot.
Figure 6E:
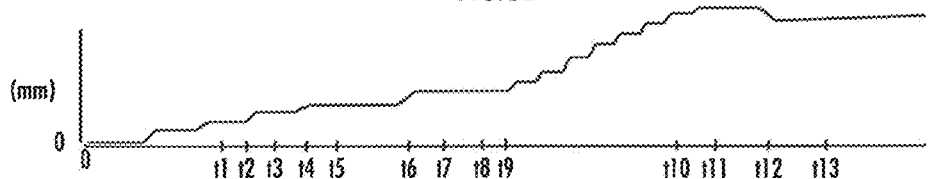
FIG. 6E shows time-series changes of the position of a desired ZMP in the X-axis direction.
Figure 6F:
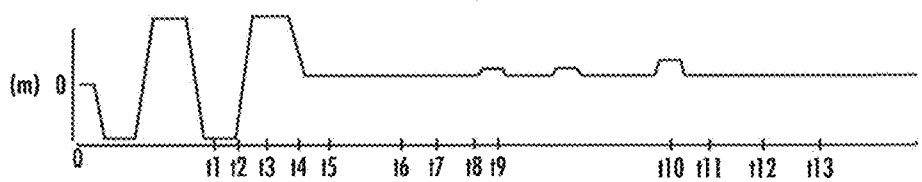
FIG. 6F shows time-series changes of the position of the desired ZMP in the Y-axis direction.

A description will now be made, with reference to FIGS. 4 to 6, about the biped-to-quadruped transition (quadruped-to-biped transition). FIGS. 5A and 5B show the on-the-floor or off-the-floor state of each of the limbs 2, 3 from the biped walking state (times t1 to t3), through the biped-to-quadruped transition (times t4 to t7), to the trot walking state (times t8 to t9), and through the quadruped-to-biped transition (times t10 to t13), to the state of standing with two limbs (time t13 and on). FIGS. 4A to 4M are left side views of the posture of the robot 1 through the above-described states. FIG. 6A is a graph (vertical axis: Xb, horizontal axis: elapsed time) showing the change of the body mass point horizontal position Xb through the above-described states. FIG. 6B is a graph (vertical axis: Zb, horizontal axis: elapsed time) showing the change of the body mass point vertical position Zb. FIG. 6C is a graph (vertical axis: magnitude of force, horizontal axis: elapsed time) showing the force acting on each of the limbs 2, 3 detected by the six-axis force sensors 41a, 41b, where the solid line represents the force acting on the right upper limb 3R, the broken line represents the force acting on the left upper limb 3L, the one-dot chain line represents the force acting on the left lower limb 2L, and the two-dot chain line represents the force acting on the right lower limb 2R. FIG. 6D is a graph (vertical axis: rotational angle, horizontal axis: elapsed time) showing the rotational angles about the X axis and the Y axis, where the solid line represents the rotational angle about the X axis, and the broken line represents the rotational angle about the Y axis. FIG. 6E shows the position of the desired ZMP in the X-axis direction. FIG. 6F shows the position of the desired ZMP in the Y-axis direction.

In the biped walking, the one-leg supporting period, shown at times t1 and t3 in FIGS. 5 and 6, and the two-leg supporting period, shown at time t2, are repeated alternately. As shown in FIGS. 5A and 5B, the gait generation system 100 performs the above-described desired gait generating processing by regarding a two-leg supporting period and a one-leg supporting period succeeding thereto as one step. In this biped walking, the body mass point horizontal position Xb moves forward, as shown in FIG. 6A, while the body mass point vertical position Zb is kept approximately constant, as shown in FIG. 6B (times t1 to t3). Further, as shown in FIG. 6C, the floor reaction force of a certain magnitude acts on the right lower limb 2R and the left lower limb 2L alternately (times t1 to t3). When the floor reaction force is averaged for a period of one step, its magnitude becomes equal to the robot's own weight. While the rotational angles about the X axis and the Y axis are both relatively large, their cycles are moderate, as shown in FIG. 6D (times t1 to t3).

Upon a change of gait in the biped walking (S016: YES in FIG. 10), when the required value of motion type of the current time gait is biped-to-quadruped transition (or when the required value of motion type of the next time gait is quadruped gait), then the gait generation system 100 generates a gait for biped-to-quadruped transition as shown at time t=t4 to time t=t7 in FIGS. 4 to 6. In this case, in S022 to S030 in FIG. 10, the gait generation system 100 divides the biped-to-quadruped transition into the hand lowering period, ZMP moving period, and quadruped walking preparation period, and generates the current time gait parameters in accordance with the transition states.

During the biped-to-quadruped transition, the parameters make transitions continuously, as shown in FIGS. 6A to 6F. Further, as shown in FIG. 6B, the body mass point vertical position Zb temporarily drops, from an average height h1 in the biped walking (time t4), to a height h3 (h1>h2>h3) (times t6 to t7), and then returns to an average height h2 in the quadruped walking (around time t8). Further, as shown in FIG. 6C, the floor reaction force acting on each supporting limb makes a transition from the state where only the lower limbs 2R and 2L receive the floor reaction force in the hand lowering period (times t4 to t5), to the state where the upper limbs 3R, 3L and the lower limbs 2R, 2L bear the floor reaction force in the ZMP moving period and the quadruped walking preparation period (times t6 to t7). Further, as shown in FIG. 6D, the inclinations about the X axis and the Y axis change from the state where the rotational angles are relative large (time t4) to the state where the rotational angles are small (time t7). Further, as shown in FIG. 6E, the position of the desired ZMP in the X-axis direction moves forward in the ZMP moving period t6.

Upon a change of gait (S016: YES in FIG. 10), when the required value of motion type of the current time gait is quadruped walking, the gait generation system 100 generates a gait for quadruped walking as shown at time t=t8 to time t=t9 in FIGS. 4 to 6. In this case, in S022 to S030 in FIG. 10, the gait generation system 100 determines the current time gait parameters by regarding the next time gait and on as the quadruped gaits.

During the quadruped walking (trot walking), as shown in FIG. 6A, the body mass point horizontal position Xb moves forward faster than in the biped walking (see times t8 to t10). As for the magnitudes of the floor reaction force acting on the respective supporting limbs 3R, 3L, 2R, and 2L, as shown in FIG. 6C, they are smaller than the floor reaction force acting on the lower limbs 2R and 2L in the biped walking (times t1 to t3, times t8 to t10). Further, the floor reaction force acting on the lower limb 2R (L) is larger than the floor reaction force acting on the upper limb 3R (L) (times t8 and t9). As to the inclinations about the X axis and the Y axis, as shown in FIG. 6D, the rotational angles are small but their cycles are short, as compared to those in the biped walking (times t1 to t3, times t8 to t10).

Upon a change of gait in the quadruped walking (S016: YES in FIG. 10), when the required value of motion type of the current time gait is quadruped-to-biped transition (or when the required value of motion type of the next time gait is biped walking), then the gait generation system 100 generates a gait for quadruped-to-biped transition as shown at times t10 to t13. In this case, in S022 to S030 in FIG. 10, the gait generation system 100 determines the current time gait parameters by regarding the next time gait and on as the biped gaits.

During the quadruped-to-biped transition, the parameters make transitions continuously, as shown in FIGS. 6A to 6F. Further, as shown in FIG. 6B, the body mass point vertical position Zb temporarily drops from the average height h2 in the quadruped walking (time t10) to the height h3 (time t11), and then returns to the average height h1 in the biped walking (times t12 to t13). Further, as shown in FIG. 6C, the floor reaction force acting on each supporting limb makes a transition from the state where the upper limbs 3R, 3L and the lower limbs 2R, 2L bear the floor reaction force in the waist moving period and the ZMP moving period (times t10 to t11), to the state where only the lower limbs 2R and 2L receive the floor reaction force in the hand lifting period (times t12 to t13). Further, as shown in FIG. 6D, the inclinations about the X axis and the Y axis change from the state where the rotational angles are small (times t10 to t11) to the state where the rotational angles are large (times t12 to t13). Further, as shown in FIG. 6E, the position of the desired ZMP in the X-axis direction moves backward in the time t12.

Of the above-described walking, the biped-to-quadruped transition and the quadruped-to-biped transition will now be described in more detail, by taking the biped-to-quadruped transition as an example.

First, the motions in the biped-to-quadruped transition will be described briefly with reference to FIG. 4. These motions are made in accordance with the desired gaits generated by the desired gait generating processing described above. The robot 1 first makes a transition from the biped waking state to the hand lowering period (time t=t4). Next, the robot 1 rotates the waist and lumbar joints to make a transition through a forward-bent posture (time t=t5) to the ZMP moving period (time t=t6) where the ground contact portions 37R and 37L are landed on the ground. In the ZMP moving period and the following quadruped walking preparation period (time t=t7), the robot 1 changes the ZMP position, the waist position, etc. to the states suitable for the quadruped walking.

Next, a description will be made, with reference to FIG. 24, about the relationships among the body mass point vertical position, waist joint rotational angle, lumbar joint rotational angle, heights of the right hand (right upper limb ground contact portion) and the left hand (left upper limb ground contact portion), the actual ZMP, and the actual horizontal center of gravity (X position) at the time of biped-to-quadruped transition.

In the two-leg supporting period (time t=t4), the body mass point vertical position is at the average height h1 in the biped walking, as shown in FIG. 24A, and the waist joint rotational angle $\theta_1$ and the lumbar joint rotational angle $\theta_2$ are both zero, as shown in FIGS. 24B and 24C. The right and left hands (positions of the lowest ends of the ground contact portions 37R and 37L) are at a height h4 which is the height of the hands when they are stretched downward in the biped walking, as shown in FIG. 24D, and the actual ZMP and the actual horizontal center of gravity are in the initial states, as shown in FIG. 24E.

As previously explained, as the waist and lumbar joints are rotated from the beginning (time t=t4) of the hand lowering period, the robot makes a transition through the forward-bent posture to the ZMP moving period and the quadruped walking preparation period (time t=6 to time t=t7). During the period from the hand lowering period (time t=t4) through the forward-bent posture (time t=t5) to the ZMP moving period (time t=t6), while the body mass point vertical position is decreased to the height h3, as shown in FIG. 24A, the waist joint rotational angle $\theta_1$ and the lumbar joint rotational angle $\theta_2$ increase to prescribed angles $\theta a$ and $\theta b$ ($\theta a < \theta b$), respectively, as shown in FIGS. 24B and 24C. During the period from the hand lowering period (time t=t4) through the forward-bent posture (time t=t5) to the ZMP moving period (time t=t6), the heights of the right and left hands change from the height h4 to zero, as shown in FIG. 24D. During the period from the hand lowering period (time t=t4) through the forward-bent posture (time t=t5) to the ZMP moving period (time t=t6), the ZMP position in the X direction moves slightly backward at the starting point and then gradually moves forward, and the actual horizontal center of gravity moves forward gradually, as shown in FIG. 24E.

From time t=t6 to time t=t7, the body mass point vertical position, the waist joint rotational angle $\theta_1$ and the lumbar joint rotational angle $\theta_2$, the heights of the right and left hands, and the positions of the actual ZMP and the actual center of gravity in the X direction hardly change.

(Functions and Effects of First Through Third Embodiments)

Functions and effects of the first through third embodiments will be described with reference to FIGS. 25 and 26.

FIGS. 25A and 25B are graphs showing the temporal changes of the body mass point vertical position Zb, the height of the right hand, the waist joint rotational angle $\theta_1$, and the lumbar joint rotational angle $\theta_2$, during the biped-to-quadruped transition (time t=t4 to time t=t7).

FIGS. 25C and 25D are graphs showing the rotational angle about the Y axis (pitch direction) and the position of the actual ZMP in the X direction in the same period (during the biped-to-quadruped transition (time t=t4 to time t=t7)), which are compared between the first through third embodiments and a comparative embodiment.

FIGS. 25E and 25F are graphs showing the positions of the desired ZMP and the provisional desired ZMP in the X-axis direction and the Y-axis direction in the same period (during the biped-to-quadruped transition (time t=t4 to time t=t7)).

FIGS. 25G and 25H are graphs showing the roll accelerations of the waist joint and the lumbar joint in the same period (during the biped-to-quadruped transition (time t=t4 to time t=t7)).

Here, the second embodiment is, as explained previously, an embodiment in which Zb(t) is set to a fixed value h in the expression 100 in S306 in FIG. 15 in the desired gait generating processing in the first embodiment. The third embodiment is an embodiment in which $\theta_2$ is fixed to zero in the expression 100 in S306 in FIG. 15 in the desired gait generating processing in the first embodiment (or an embodiment in which no lumbar joint is provided). The comparative embodiment is an embodiment in which Zb(t) is set to the fixed value h and $\theta_2$ is fixed to zero in the expression 100 in S306 in FIG. 15 in the desired gait generating processing in the first embodiment.

The rotational angle about the Y axis in the first embodiment is zero in the hand lowering period (time t=t4), and thereafter, it increases gradually, and reaches a peak around the starting point (time t=t6) of the ZMP moving period. It then converges to almost zero by time t=t7.

Further, the position of the actual ZMP in the X direction in the first embodiment moves gradually forward from the initial state (zero) in the hand lowering period (time t=t4). Around the ZMP moving period (time t=t6), it fluctuates slightly forward and backward, and then converges to an approximately prescribed value by time t=t7.

The rotational angle about the Y axis in the second embodiment undergoes changes similar to those of the rotational angle about the Y axis in the first embodiment in that it is zero in the hand lowering period (time t=t4), and thereafter, it increases gradually and reaches a peak around the starting point (time t=t6) of the ZMP moving period, and it then converges to almost zero by time t=t7. The change amount, however, is slightly larger than the change amount of the rotational angle about the Y axis in the first embodiment.

Further, the position of the actual ZMP in the X direction in the second embodiment undergoes changes similar to those of the position of the actual ZMP in the X direction in the first embodiment in that it moves gradually forward from the initial state (zero) in the hand lowering period (time t=t4) and, around the ZMP moving period (time t=t6), it fluctuates slightly forward and backward, and then converges to an approximately prescribed value by time t=t7. The change amount, however, is slightly larger than the change amount of the position of the actual ZMP in the X direction in the first embodiment.

The rotational angle about the Y axis in the third embodiment undergoes changes similar to those of the rotational angle about the Y axis in the first embodiment in that it is zero in the hand lowering period (time t=t4), and thereafter, it increases gradually and reaches a peak around the starting point (time t=t6) of the ZMP moving period, and it then converges to almost zero by time t=t7. The change amount, however, is considerably larger than the change amounts of the rotational angle about the Y axis in the first and second embodiments.

Further, the position of the actual ZMP in the X direction in the third embodiment undergoes changes similar to those of the position of the actual ZMP in the X direction in the first embodiment in that it moves gradually forward from the initial state (zero) in the hand lowering period (time t=t4) and, around the ZMP moving period (time t=t6), it fluctuates slightly forward and backward, and then converges to an approximately prescribed value by time t=t7. The change amount, however, is considerably larger than the change amounts of the position of the actual ZMP in the X direction in the first and second embodiments.

The rotational angle about the Y axis in the comparative embodiment undergoes changes similar to those of the rotational angle about the Y axis in the third embodiment in that it is zero in the hand lowering period (time t=t4), and thereafter, it increases gradually and reaches a peak around the starting point (time t=t6) of the ZMP moving period, and it then converges to almost zero by time t=t7. The change amount, however, is slightly larger than the change amount of the rotational angle about the Y axis in the third embodiment.

Figure 26A:
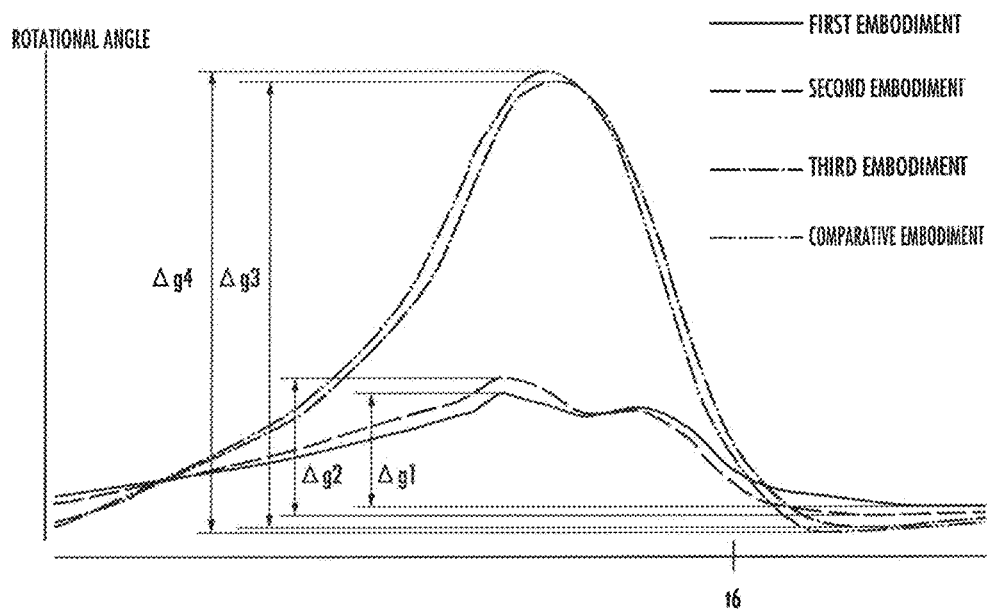
FIG. 26A shows the rotational angles about the Y axis (in the pitch direction) in the first through third embodiments and the comparative embodiment in the vicinity of time t6.

Further, as shown in FIG. 26A, around time t6 (during the biped-to-quadruped transition), the maximum values $\Delta g1$ to $\Delta g3$ of the change amount of the rotational angle about the Y axis in the first through third embodiments, respectively, are all kept smaller than the maximum value $\Delta g4$ of the change amount of the rotational angle about the Y axis in the comparative embodiment. In particular, the maximum values $\Delta g1$ and $\Delta g2$ of the change amount in the first and second embodiments are kept considerably small, at about two degrees.

Further, the position of the actual ZMP in the X direction in the comparative embodiment undergoes changes similar to those of the position of the actual ZMP in the X direction in the third embodiment in that it moves gradually forward from the initial state (zero) in the hand lowering period (time t=t4) and, around the ZMP moving period (time t=t6), it fluctuates slightly forward and backward, and then converges to an approximately prescribed value by time t=t7. The change amount, however, is slightly larger than the change amount of the position of the actual ZMP in the X direction in the third embodiment.

Figure 26B:
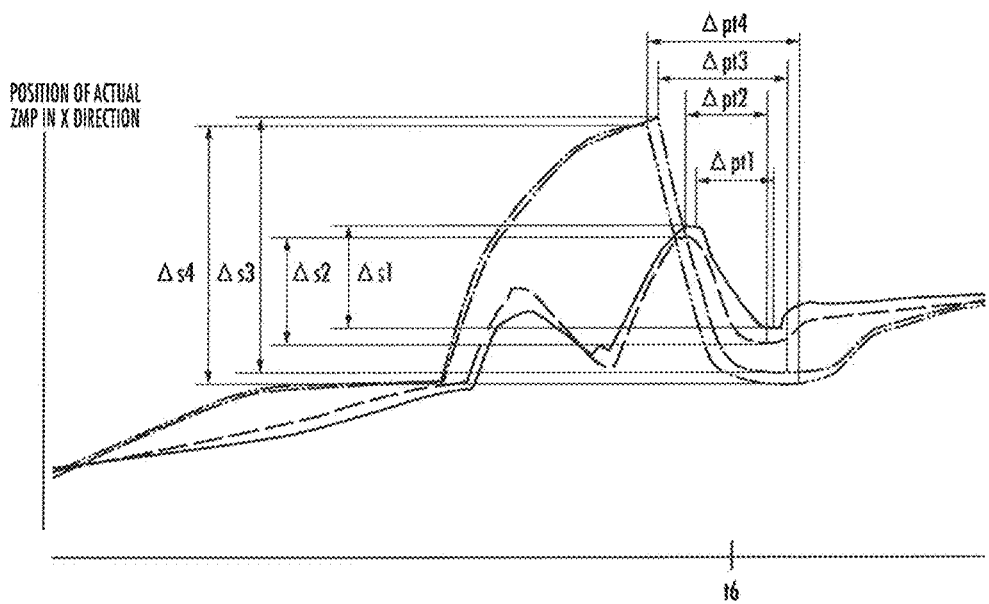
FIG. 26B shows the positions of the actual ZMP in the X direction in the first through third embodiments and the comparative embodiment in the vicinity of time t6.

Further, as shown in FIG. 26B, around time t6 (during the biped-to-quadruped transition), the maximum values $\Delta s1$ to $\Delta s3$ of the change amount of the actual ZMP position in the X direction in the first through third embodiments, respectively, are all kept approximately equal to or smaller than the maximum value $\Delta s4$ of the change amount of the actual ZMP position in the X direction in the comparative embodiment. Further, the periods $\Delta pt1$ to $\Delta pt3$ during which the change amount of the actual ZMP position in the X direction is large in the first through third embodiments, respectively, are shorter than the period $\Delta pt4$ during which the change amount of the actual ZMP position in the X direction is large in the comparative embodiment.

As described above, in each of the first through third embodiments of the present invention, the abrupt changes of the rotational angle about the Y axis and the actual ZMP position during the biped-to-quadruped transition can be alleviated and the time taken by the biped-to-quadruped transition can also be shortened, as compared to those in the comparative embodiment.

This means that the robot 1 according to each of the first through third embodiments can make a biped-to-quadruped transition more stably and more quickly than the robot of the comparative embodiment.

Further, in the first through third embodiments, in the above-described desired gait generating processing, the desired gaits for biped walking, biped running, biped-to-quadruped transition, quadruped-to-biped transition, and quadruped walking are generated on the basis of one and the same dynamic model. Therefore, the desired gaits in the respective operations are generated without the need of initialization that would otherwise be required when switching between different dynamic models. Accordingly, the operations may be switched smoothly, with no prolonged interruption.

DESCRIPTION OF REFERENCE NUMERALS

1: biped/quadruped mobile robot (mobile body); 2: lower limb (first moving mechanism); 3: upper limb (second moving mechanism); 4: body (base body); 4a: second base body; 4b: first base body; and 100: gait generation system (up-and-down direction motion parameter determining unit).

What is claimed is:
1. A control device for a mobile body having a base body and a moving mechanism configured to move the base body on a floor surface, the control device being configured to determine a plurality of motion parameters as a set of parameters defining an operation of the mobile body in a prescribed period, and to input the determined motion parameters into motion equations of a dynamic model of the mobile body to generate a desired motion in a first mode of the mobile body and a desired transition operation between the first mode and a second mode which differs in a height of the center of gravity of the base body from the first mode, wherein
   each of the desired motion and the desired transition operation includes a change amount of the center of gravity at a prescribed time,
   the plurality of motion parameters includes an up-and-down direction motion parameter as one motion parameter which defines a time series of desired inertial force and desired displacement in an up-and-down direction of the base body, the up-and-down direction motion parameter including a time series of the height of the center of gravity of the base body,
   motion equations are expressed by at least a time series of a position of the center of gravity of the base body, a rotational motion component including an acceleration of the base body caused by a momentum of rotational motion of the base body, an inertial force-dependent manipulated variable component, which becomes larger as an instantaneous value of the desired inertial force at the prescribed time in the time series of the desired inertial force defined by the up-and-down direction motion parameter becomes larger, and a displacement-dependent manipulated variable component, which becomes larger as an instantaneous value of the desired displacement at the prescribed time in the time series of the desired displacement defined by the up-and-down direction motion parameter becomes larger, and
   the change amount of the center of gravity at the prescribed time is determined according to the motion equations.

2. The control device for the mobile body according to claim 1, wherein
the rotational motion component becomes smaller as an instantaneous value of the desired displacement at the prescribed time in the time series of the desired displacement defined by the up-and-down direction motion parameter becomes larger.

3. A control device for a mobile body having a base body and a moving mechanism configured to move the base body on a floor surface, the control device being configured to determine a plurality of motion parameters as a set of parameters defining an operation of the mobile body in a prescribed period, and to input the determined motion parameters into motion equations of a dynamic model of the mobile body to generate a desired motion including a change amount of a center of gravity at a prescribed time, in a first mode of the mobile body, wherein
the moving mechanism includes a first moving mechanism functioning as the moving mechanism in both of the first mode and a second mode, the second mode differs from the first mode in a height of the center of gravity of the base body, and a second moving mechanism functioning as the moving mechanism in the second mode,
the base body includes a first base body rotatably connected to the first moving mechanism, and a second base body rotatably connected to the first base body and also connected to the second moving mechanism, and
the motion equations are expressed by at least a time series of a position of the center of gravity of the base body, a first rotational motion component including an acceleration of the first base body caused by rotation of the first base body, and a second rotational motion component including an acceleration of the second base body caused by rotation of the second base body.

4. The control device for the mobile body according to claim 3,
wherein the plurality of motion parameters include an up-and-down direction motion parameter as one motion parameter which defines a time series of desired inertial force and desired displacement in an up-and-down direction of the base body, the up-and-down direction motion parameter including a time series of the height of the center of gravity of the base body,
wherein the second rotational motion component becomes smaller as an instantaneous value of the desired displacement at a prescribed time in the time series of the desired displacement defined by the up-and-down direction motion parameter becomes larger.

5. The control device for the mobile body according to claim 3,
wherein the plurality of motion parameters include an up-and-down direction motion parameter as one motion parameter which defines a time series of desired inertial force and desired displacement in an up-and-down direction of the base body, the up-and-down direction motion parameter including a time series of the height of the center of gravity of the base body,
wherein the first rotational motion component becomes smaller as an instantaneous value of the desired displacement at a prescribed time in the time series of the desired displacement defined by the up-and-down direction motion parameter becomes larger.

* * * * *